(12) United States Patent
Liu et al.

(10) Patent No.: US 11,159,236 B2
(45) Date of Patent: Oct. 26, 2021

(54) COMMUNICATION METHOD AND RELATED DEVICE

(71) Applicant: Huawei Technologies Co., Ltd., Shenzhen (CN)

(72) Inventors: Yongjun Liu, Beijing (CN); Rongdao Yu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/886,271

(22) Filed: May 28, 2020

(65) Prior Publication Data

US 2020/0295830 A1 Sep. 17, 2020

Related U.S. Application Data

(63) Continuation of application No. PCT/CN2018/117936, filed on Nov. 28, 2018.

(30) Foreign Application Priority Data

Dec. 4, 2017 (CN) .......................... 201711259781.6

(51) Int. Cl.
*H04B 10/00* (2013.01)
*H04B 10/116* (2013.01)
(Continued)

(52) U.S. Cl.
CPC ......... *H04B 10/116* (2013.01); *H04B 10/502* (2013.01); *H04B 10/564* (2013.01); *H04B 7/0413* (2013.01)

(58) Field of Classification Search
CPC .. H04B 10/116; H04B 10/502; H04B 10/564; H04B 7/0413; H04B 10/1143;
(Continued)

(56) References Cited

U.S. PATENT DOCUMENTS

| 4,559,452 A | * | 12/1985 | Igaki | .......................... B07C 5/10 |
| | | | | 250/222.1 |
| 2009/0066631 A1 | * | 3/2009 | Lianza | ................. G09G 3/3426 |
| | | | | 345/102 |

(Continued)

FOREIGN PATENT DOCUMENTS

| CN | 104506235 A | 4/2015 |
| CN | 105657187 A | 6/2016 |

(Continued)

OTHER PUBLICATIONS

Li, Y., et al., "VICO: A framework for configuring indoor visible light communication networks," 9th International Conference on Mobile ADHOC and Sensor Systems, Oct. 8, 2012, pp. 136-144, XP032375657.

(Continued)

*Primary Examiner* — Hibret A Woldekidan
(74) *Attorney, Agent, or Firm* — Conley Rose, P.C.

(57) ABSTRACT

A communication method includes obtaining, by a first device, first target information, determining, by the first device based on the first target information, a data transmit array element from light emitting diodes (LEDs) of the first device, where each data transmit array element of the first device includes at least one LED, and sending, by the first device, to-be-sent data to a data receive array element of a second device using the data transmit array element, where each data receive array element of the second device includes at least one LED of the second device.

20 Claims, 19 Drawing Sheets

(51) Int. Cl.
*H04B 10/50* (2013.01)
*H04B 10/564* (2013.01)
*H04B 7/0413* (2017.01)

(58) Field of Classification Search
CPC ............ G01J 1/4228; G01J 3/10; G01J 3/501; G01N 2021/8816; G01N 21/8806; G09G 2320/0233; G09G 2320/064; G09G 2320/0693; G09G 2360/145; G09G 3/3426
USPC ......... 398/118, 123, 128, 130, 137, 93, 172, 398/195, 209
See application file for complete search history.

(56) References Cited

U.S. PATENT DOCUMENTS

2013/0266327 A1 10/2013 Bae et al.
2018/0073919 A1* 3/2018 Waszak .............. G01N 21/8806

FOREIGN PATENT DOCUMENTS

| CN | 105897337 A | 8/2016 |
| CN | 108155942 A | 6/2018 |
| EP | 2658150 A1 | 10/2013 |

OTHER PUBLICATIONS

Li, S., et al., "LED-Based Color Sensing and Control," IEEE Sensors Journal, vol. 15, No. 11, Nov. 2015, pages 6116-6124.

\* cited by examiner

COMMUNICATION METHOD AND RELATED DEVICE

CROSS-REFERENCE TO RELATED APPLICATIONS

This application is a continuation of International Patent Application No. PCT/CN2018/117936, filed on Nov. 28, 2018, which claims priority to Chinese Patent Application No. 201711259781.6, filed on Dec. 4, 2017, both of which are hereby incorporated by reference in their entireties.

TECHNICAL FIELD

This application relates to the field of communications technologies, and in particular, to a communication method and a related device.

BACKGROUND

Existing terminals (such as mobile phones, wearable devices, television sets, and computers) share data mainly through BLUETOOTH, WI-FI, near field communication (NFC), and the like. BLUETOOTH provides a data rate of 2 megabits per second (Mb/s), NFC provides a data rate of several hundreds of kilobits per second (kbps), and the data rates are relatively low. WI-FI provides a data rate of about 1 gigabit per second (Gbps), which however still cannot meet a communication connection requirement imposed by a future growth in terminal data.

In an emerging visible light communications (VLC) technology, a light source such as a light-emitting diode (LED) is used to send a signal, and a light detection device such as a photodiode (PD) or an avalanche photodiode (APD) is used to receive a signal. There are many specific modulation schemes, for example, simple switch keying, where presence of light emission indicates "1", and absence of light emission indicates "0", or pulse amplitude modulation, where a luminous intensity is used to indicate a sent symbol, or color shift keying, where light of different colors is used to indicate different sent symbols. VLC potentially provides a high communication rate. However, to apply VLC to a terminal, a dedicated light source and light detection device need to be integrated. A camera has become a standard accessory for nearly all smartphones. Therefore, the camera may be used as a receiving device for VLC based on a light sensing function of the camera, and a terminal screen may be used as a transmit end of a VLC signal.

A receiving rate of a camera is relatively low due to impact of a frame rate. Generally, a camera of a mainstream mobile phone has a frame rate less than 100 frames/second such that a camera-based VLC rate is usually less than 1 Mb/s. Therefore, how to increase a VLC transmission rate is an urgent problem to be resolved currently.

SUMMARY

Embodiments of this application provide a communication method and a related device, to increase a VLC transmission rate.

According to a first aspect, an embodiment of this application provides a communication method. The method includes obtaining, by a first device, first target information, determining, by the first device based on the first target information, a data transmit array element from LEDs of the first device, where each data transmit array element of the first device includes at least one LED, and sending, by the first device, to-be-sent data to a data receive array element of a second device using the data transmit array element, where each data receive array element of the second device includes at least one LED of the second device.

It is found from practice that a communication rate between a single data transmit array element and a single data receive array element is 10 Mb/s, and in other approaches, a communication rate between a screen and a camera is less than 1 Mb/s. Therefore, implementation of the method described in the first aspect helps increase a VLC transmission rate.

Optionally, the data transmit array element of the first device includes a first data transmit array element and a second data transmit array element, the data receive array element of the second device includes a first data receive array element and a second data receive array element, the to-be-sent data includes first data and second data, and a specific implementation of sending, by the first device, the to-be-sent data to the data receive array element of the second device using the data transmit array element is as follows sending, by the first device, the first data to the first data receive array element of the second device using the first data transmit array element, and sending, by the first device, the second data to the second data receive array element of the second device using the second data transmit array element.

In other words, the first device may include at least two data transmit array elements, and the second device may include at least two data receive array elements. The first device may send different data to different data receive array elements of the second device using different data transmit array elements. It can be learned that, with this implementation implemented, multi input-multi output (MIMO) communication can be formed, that is, a plurality of channels of data can be sent in parallel, thereby greatly increasing a communication rate.

Optionally, a specific implementation of determining, by the first device based on the first target information, the data transmit array element from the LEDs of the first device is as follows determining, by the first device based on the first target information, the data transmit array element from LEDs included in a camera flash of the first device.

Optionally, a specific implementation of determining, by the first device based on the first target information, the data transmit array element from the LEDs of the first device is as follows determining, by the first device based on the first target information, the data transmit array element from LEDs included in a screen of the first device.

Optionally, the screen of the first device is a flat screen, a screen of the second device is a flat screen or a curved surface screen, the first target information includes a screen distance between the first device and the second device, the screen distance is a shortest distance between a first screen and a second screen, the first screen is the flat screen of the first device, the second screen is the flat screen of the second device or the second screen is a virtual flat screen constituted by all projection points of a vertical projection of the curved surface screen of the second device on an intersecting second target plane, and the curved surface screen of the second device has a largest projection area on the second target plane, and a specific implementation of determining, by the first device based on the first target information, the data transmit array element from the LEDs included in the screen of the first device is as follows determining, by the first device, a first array element spacing based on the screen distance and a first power angle of the LEDs of the first screen on a first plane, where the first array element spacing is a minimum spacing between two adjacent data transmit array elements in the first screen along a first direction of LED arrangement, determining, by the first device, a second array element spacing based on the screen distance and a second power angle of the LEDs of the first screen on a second plane, where the second array element spacing is a minimum spacing between two adjacent data transmit array elements in the first screen along a second direction of LED arrangement, the first plane is perpendicular to the second plane, the first plane and the second plane each are perpendicular to the first screen, and the first direction is perpendicular to the second direction, and determining, by the first device along the first direction based on a data transmit array element size and the first array element spacing, the data transmit array element from the LEDs included in the first screen, and determining, along the second direction based on the data transmit array element size and the second array element spacing, the data transmit array element from the LEDs included in the first screen.

Optionally, the first array element spacing determined by the first device based on the first power angle and the screen distance may be D1=2L*tgθ1, where D1 is the first array element spacing, L is the screen distance between the first device and the second device, and θ1 is the first power angle.

Optionally, the second array element spacing determined by the first device based on the second power angle and the screen distance may be D2=2L*tgθ2, where D2 is the second array element spacing, L is the screen distance between the first device and the second device, and θ2 is the second power angle.

With this implementation implemented, a data transmit array element spacing and a data receive array element spacing for avoiding signal aliasing can be calculated such that the data transmit array element and the data receive array element are determined based on the spacings, to avoid signal aliasing.

Optionally, the screen of the first device is a curved surface screen, a screen of the second device is a flat screen or a curved surface screen, the first target information includes a screen distance between the first device and the second device, the screen distance is a shortest distance between a first screen and a second screen, the first screen is a virtual flat screen constituted by all projection points of a vertical projection of the curved surface screen of the first device on an intersecting first target plane, the curved surface screen of the first device has a largest projection area on the first target plane, the second screen is the flat screen of the second device or the second screen is a virtual flat screen constituted by all projection points of a vertical projection of the curved surface screen of the second device on an intersecting second target plane, and the curved surface screen of the second device has a largest projection area on the second target plane, and a specific implementation of determining, by the first device based on the first target information, the data transmit array element from the LEDs included in the screen of the first device is as follows determining, by the first device, a first array element spacing based on the screen distance and a first power angle of the LEDs of the first screen on a first plane, where the first array element spacing is a minimum spacing between two adjacent data transmit array elements in the first screen along a first direction of LED arrangement, determining, by the first device, a second array element spacing based on the screen distance and a second power angle of the LEDs of the first screen on a second plane, where the second array element spacing is a minimum spacing between two adjacent data transmit array elements in the first screen along a second direction of LED arrangement, the first plane is perpendicular to the second plane, the first plane and the second plane each are perpendicular to the first screen, and the first direction is perpendicular to the second direction, determining, by the first device along the first direction based on a data transmit array element size and the first array element spacing, the data transmit array element from the LEDs included in the first screen, and determining, along the second direction based on the data transmit array element size and the second array element spacing, the data transmit array element from the LEDs included in the first screen, and projecting, by the first device, the determined data transmit array element onto the curved surface screen of the first device, to obtain a data transmit array element included in the curved surface screen of the first device.

With this implementation implemented, a data transmit array element can be accurately determined on a curved surface screen, and this helps avoid signal aliasing.

Optionally, the first device may further obtain the data transmit array element size before determining, along the first direction based on the data transmit array element size and the first array element spacing, the data transmit array element from the LEDs included in the first screen, and determining, along the second direction based on the data transmit array element size and the second array element spacing, the data transmit array element from the LEDs included in the first screen.

Optionally, before the first device determines, based on the first target information, the data transmit array element from the LEDs included in the screen of the first device, the first device may further establish a screen communication connection to the second device, and a specific implementation of obtaining, by the first device, the data transmit array element size is as follows determining, by the first device, first optical transmit power, where the first optical transmit power is minimum optical transmit power required by the first screen to correctly send data in a first modulation and coding scheme, and the first modulation and coding scheme is a modulation and coding scheme used to send data after the screen communication connection is established, determining, by the first device, second transmit power, where the second optical transmit power is optical transmit power of the LEDs of the first screen, determining, by the first device based on the first optical transmit power and the second optical transmit power, a quantity of LEDs included in the data transmit array element, where $$M \geq \frac{Pt}{Ps},$$

M is the quantity of LEDs included in the data transmit array element, Pt is the first optical transmit power, and Ps is the second optical transmit power, and determining, by the first device, the data transmit array element size based on M and an LED size.

With this implementation implemented, the data transmit array element size can be determined, and the data transmit array element determined by the first device based on the data transmit array element size can successfully transmit data to a data receive array element.

Optionally, before the first device determines, based on the first target information, the data transmit array element from the LEDs included in the screen of the first device, the first device may establish a screen communication connection to the second device, and a specific implementation of obtaining, by the first device, the data transmit array element size is as follows determining, by the first device, a first signal-to-noise ratio, where the first signal-to-noise ratio is a signal-to-noise ratio for actual signal receiving of the second screen in a process of performing the screen communication connection, determining, by the first device, a second signal-to-noise ratio, where the second signal-to-noise ratio is a minimum signal-to-noise ratio required by the second screen to correctly receive data in a first modulation and coding scheme, and the first modulation and coding scheme is a modulation and coding scheme used by the first screen to send data after the screen communication connection is established, determining, by the first device, a transmit power difference, where the transmit power difference is a difference between optical transmit power of the first screen when the communication connection is being performed and optical transmit power for data sending of the first screen after the communication connection is established, determining, by the first device, a first area, where the first area is an area of the transmit array element during the communication connection, and determining, by the first device, a data transmit array element area based on the first signal-to-noise ratio, the second signal-to-noise ratio, the transmit power difference, and the first area.

Optionally, at a screen communication connection stage, the first device may receive the first signal-to-noise ratio sent by the second device. The first signal-to-noise ratio may be attached to a connection request or a connection response, or may be sent using a separate command.

For example, it is assumed that in the process of the communication connection, the signal-to-noise ratio for actual signal receiving of the second screen is Q decibel (dB), that is, the first signal-to-noise ratio is Q (dB), the modulation and coding scheme used by the first screen to send data after the communication connection is established is the first modulation and coding scheme, the minimum signal-to-noise ratio required by the second screen to correctly receive data in the first modulation and coding scheme is Q1 (dB), that is, the second signal-to-noise ratio is Q1 (dB), and the transmit power difference is $\Delta Q$ (dB). The data transmit array element size S1 meets the following relationship $10*\lg(S0/S1) < Q - Q1 - \Delta Q$, where S0 is an area of the transmit array element during the communication connection. For example, if the entire screen is used for single-channel sending and receiving during the communication connection, S0 is an area of the screen.

With this implementation implemented, the data transmit array element size can be determined, and the data transmit array element determined by the first device based on the data transmit array element size can successfully transmit data to a data receive array element.

Optionally, a specific implementation of obtaining, by the first device, the first target information is as follows receiving, by the first device, feedback information sent by the second device, where the feedback information includes first information and/or second information, the first information is used to indicate a sequence transmit array element that is not a data transmit array element or is used to indicate a sequence transmit array element that is a data transmit array element, the second information is used to indicate a sequence transmit array element that needs to be combined into a data transmit array element, the feedback information is obtained by the second device based on received sequence information, the sequence information is received by the second device after a plurality of sequence transmit array elements of the first device send local sequence information to the second device, and each of the plurality of sequence transmit array elements includes at least one LED of the first device, and a specific implementation of determining, by the first device based on the first target information, the data transmit array element from the LEDs included in the screen of the first device is as follows determining, by the first device, the data transmit array element from the plurality of sequence transmit array elements based on the feedback information.

With this implementation implemented, the first device may send the local sequence information to the second device such that the second device determines, based on the received sequence information, the sequence transmit array element that is a data transmit array element in the first device or the sequence transmit array element that needs to be combined into a data transmit array element in the first device. With this implementation implemented, the first device can determine an appropriate data transmit array element such that the data can be correctly sent to the first device using the determined data transmit array element.

Optionally, before the first device receives the feedback information sent by the second device, the first device may further perform the following parts determining, by the first device, a preset first target spacing, obtaining, by the first device, a sequence transmit array element size, determining, by the first device based on the first target spacing and the sequence transmit array element size, the plurality of sequence transmit array elements from the LEDs included in the screen of the first device, and sending, by the first device, the local sequence information to the second device using the plurality of sequence transmit array elements such that a plurality of sequence receive array elements of the second device receive the sequence information, where each of the plurality of sequence receive array elements includes at least one LED of the second device.

With this implementation implemented, a plurality of sequence receive array elements can be determined.

Optionally, before the first device determines the preset first array element spacing, the first device receives a screen driver type of the second device sent by the second device, and a specific implementation of determining, by the first device, the preset first target spacing may be as follows selecting by the first device, the first target spacing from a plurality of preset transmit array element spacings based on the screen driver type of the second device.

With this implementation implemented, an appropriate array element spacing can be selected.

Optionally, a first time period includes a first data sending period and a first content display period, the first data sending period is used to send to-be-sent data, the first content display period is used to display content, and the first device determines, in the first content display period based on a primary color intensity of the data transmit array element of the first device in the first data sending period and a time ratio of the first content display period to the first data sending period, a primary color intensity for transmitting a display signal.

It can be learned that, with this implementation implemented, impact caused by data transmission of the data transmit array element to a display color and display brightness can be avoided.

Optionally, the first device sends first time information to the second device, where the first time information includes a start moment of the first time period, duration of the first time period, a start moment of the first data sending period, and duration of the first data sending period.

With this implementation implemented, the second device can calculate, based on the four pieces of time information, a time for sending data by the first device in each period such that the data sent by the first device is received at a corresponding time.

Optionally, the first device may further determine a data receive array element from the LEDs of the first device, where each data receive array element of the first device includes at least one LED, and the first device receives data from a data transmit array element of the second device using the data receive array element, where each data transmit array element of the second device includes at least one LED of the second device. For a manner of determining the data receive array element, refer to a method for determining a data receive array element by a second device in a second aspect. Details are not described herein.

It can be learned that, with this implementation implemented, the first device and the second device can receive data using LEDs, and can also transmit data using LEDs.

Optionally, LEDs included in a data transmit array element and a data receive array element of the first device do not overlap.

With this implementation implemented, a space division duplex mode can be used to distinguish between the data transmit array element and the data receive array element, to ensure that data sending of the data transmit array element does not collide with data receiving of the data receive array element.

Optionally, the first device has a first data transmit array element and a first data receive array element whose LEDs overlap, and a data sending time of the first data transmit array element does not overlap a data receiving time of the first data receive array element. The LEDs of the first data transmit array element and the first data receive array element may partially or completely overlap.

In other words, even if the first data transmit array element and the first data receive array element have a same LED, the data sending time of the first data transmit array element is different from the data receiving time of the first data receive array element. It can be learned that, with this implementation implemented, a time division duplex mode can be used to distinguish between a data sending time period of the data transmit array element and a data receiving time period of the data receive array element, to ensure that data sending of the data transmit array element does not collide with data receiving of the data receive array element.

Optionally, the first device has a first data transmit array element and a first data receive array element whose LEDs overlap, and a data sending time of the first data transmit array element overlaps a data receiving time of the first data receive array element. The LEDs of the first data transmit array element and the first data receive array element may partially or completely overlap. The data sending time of the first data transmit array element and the data receiving time of the first data receive array element may partially or completely overlap.

It is found from research that an LED can sense light at a reverse bias voltage. In addition, the LED has a relatively weak light sensing capability and a light emitting capability at a relatively low forward bias voltage (for example, 0.7 volts (V)-1.1 V). Based on this characteristic, a full-duplex function of the LED for simultaneous sending and receiving can be implemented.

Optionally, the first device has a first data transmit array element and a first data receive array element whose LEDs overlap, and a data sending time of the first data transmit array element overlaps a data receiving time of the first data receive array element. If a pin that is used to receive data and that is of a target LED and a pin that is used to send data and that is of the target LED are a same pin, the target LED is an LED included in both the first data transmit array element and the first data receive array element.

Optionally, the first device has a first data transmit array element and a first data receive array element whose LEDs overlap, and a data sending time of the first data transmit array element overlaps a data receiving time of the first data receive array element. If a pin that is used to receive data and that is of a target LED and a pin that is used to send data and that is of the target LED are different pins, and both the pin used to receive data and the pin used to send data are connected to an anode of the target LED or connected to a cathode of the target LED, the target LED is an LED included in both the first data transmit array element and the first data receive array element.

Optionally, the first device has a first data transmit array element and a first data receive array element whose LEDs overlap, and a data sending time of the first data transmit array element overlaps a data receiving time of the first data receive array element. If a pin that is used to receive data and that is of a target LED and a pin that is used to send data and that is of the target LED are different pins, the pin used to receive data is connected to an anode of the LED, and the pin used to send data is connected to a cathode of the LED, or the pin used to receive data is connected to a cathode of the LED, and the pin used to send data is connected to an anode of the LED, the target LED is an LED included in both the first data transmit array element and the first data receive array element.

Optionally, the first device determines, based on a transmit signal of the first data transmit array element, a signal received by the first data receive array element.

Because a device can know its own transmit signal, a received signal r can be calculated based on a relationship among the transmit signal t, the received signal r, and a signal y of a data receiving pin $y=f(t, r)$. A switch keying modulation signal is used as an example. A forward bias voltage is relatively high when information "1" is transmitted. In this case, if an optical signal with information "0" modulated is received, an induced current is relatively weak and is denoted as V10, or if an optical signal with information "1" modulated is received, an induced current is relatively strong and is denoted as V11, where V11>V10. A forward bias voltage is relatively low when information "0" is transmitted. In this case, if an optical signal with information "0" modulated is received, an induced current is relatively weak and is denoted as V00, where V00>V10, or if an optical signal with information "1" modulated is received, an induced current is relatively strong and is denoted as V01, where V01>V00 and V01>V11. Therefore, only two decision thresholds need to be set for receiving. A threshold A is between V11 and V10, and a threshold B is between V01 and V00. A threshold is selected based on transmitted information. The threshold A is selected when information "1" is transmitted, or the threshold B is selected when information "0" is transmitted. When a threshold is exceeded, a decision is "1", otherwise, a decision is "0".

Optionally, the first device may further receive second time information sent by the second device, where the second time information includes a start moment of a second time period, duration of the second time period, a start moment of a second data sending period, and duration of the second data sending period, the first time period includes the second data sending period and a second content display period, the second data sending period is used by the second device to send data, and the content display period is used by the second device to display content, and a specific implementation of receiving, by the first device, the data from the data transmit array element of the second device using the data receive array element of the first device is as follows receiving, by the first device in the second data sending period, the data from the data transmit array element of the second device using the data receive array element of the first device.

It can be learned that, the first device can calculate, based on the four pieces of time information, a time for sending data by the second device in each period, and can receive, at a corresponding time, the data sent by the second device.

Optionally, before the first device determines the data transmit array element from the LEDs, the first device may further receive a quantity of LED primary colors and LED primary color types of the second device that are sent by the second device, and if the quantity of LED primary colors of the second device is the same as a quantity of LED primary colors of the first device, and the LED primary color types of the second device are the same as LED primary color types of the first device, the first device establishes a screen communication connection to the second device.

If the quantity of LED primary colors of the second device is different from the quantity of LED primary colors of the first device, or the LED primary color types of the second device are different from the LED primary color types of the first device, the first device cannot communicate with the second device using an LED. Therefore, before performing the screen communication connection, the first device needs to first determine whether the quantity of LED primary colors of the second device is the same as the quantity of LED primary colors of the first device and whether the LED primary color types of the second device are the same as the LED primary color types of the first device.

According to a second aspect, an embodiment of this application further provides a communication method. The method includes obtaining, by a second device, second target information, determining, by the second device based on the second target information, a data receive array element from LEDs of the second device, where each data receive array element of the second device includes at least one LED, and receiving, by the second device, data from a data transmit array element of a first device using the data receive array element, where each data transmit array element of the first device includes at least one LED of the first device.

It is found from practice that a communication rate between a single data transmit array element and a single data receive array element is 10 Mb/s, and in other approaches, a communication rate between a screen and a camera is less than 1 Mb/s. Therefore, implementation of the method described in the second aspect helps increase a VLC transmission rate.

Optionally, the data receive array element of the second device includes a first data receive array element and a second data receive array element, the data transmit array element of the first device includes a first data transmit array element and a second data transmit array element, the data from the data transmit array element of the first device includes first data and second data, and a specific implementation of receiving, by the first device, the data from the transmit array element of the second device using the receive array element is as follows receiving, by the second device, the first data from the first data transmit array element of the first device using the first data receive array element, and receiving, by the second device, the second data from the second data transmit array element of the first device using the second data receive array element.

It can be learned that, with this implementation implemented, MIMO communication can be formed, that is, a plurality of channels of data can be sent in parallel, thereby greatly increasing a communication rate.

Optionally, a specific implementation of determining, by the second device based on the second target information, the data receive array element from the LEDs of the second device is as follows determining, by the second device based on the second target information, the data receive array element from LEDs included in a camera flash of the second device.

Optionally, a specific implementation of determining, by the second device based on the second target information, the data receive array element from the LEDs of the second device is as follows determining, by the second device based on the second target information, the data receive array element from LEDs included in a screen of the second device.

Optionally, the screen of the second device is a flat screen, a screen of the first device is a flat screen or a curved surface screen, the second target information includes a screen distance between the first device and the second device, the screen distance is a shortest distance between a first screen and a second screen, the second screen is the flat screen of the second device, the first screen is the flat screen of the first device or the first screen is a virtual flat screen constituted by all projection points of a vertical projection of the curved surface screen of the first device on an intersecting first target plane, and the curved surface screen of the first device has a largest projection area on the first target plane, and a specific implementation of determining, by the second device based on the second target information, the data receive array element from the LEDs included in the screen of the second device is as follows determining, by the second device, a third array element spacing based on the screen distance, a first power angle of LEDs of the first screen on a first plane, a data receive array element size, and a first included angle between the first screen and the second screen on the first plane, where the third array element spacing is a minimum spacing between two adjacent data receive array elements in the second screen along a first direction of LED arrangement, determining, by the second device, a fourth array element spacing based on the screen distance, a second power angle of the LEDs of the first screen on a second plane, the data receive array element size, and a second included angle between the first screen and the second screen on the second plane, where the fourth array element spacing is a minimum spacing between two adjacent data receive array elements in the second screen along a second direction of LED arrangement, the first plane is perpendicular to the second plane, the first plane and the second plane each are perpendicular to the first screen, and the first direction is perpendicular to the second direction, and determining, by the second device along the first direction based on the data receive array element size and the third array element spacing, the data receive array element from the LEDs in the second screen, and determining, along the second direction based on the data receive array element size and the fourth array element spacing, the data receive array element from the LEDs in the second screen.

Optionally, the third array element spacing determined by the second device based on the first power angle, the screen distance, the data receive array element size, and the first included angle may be $D3=2(L*tg\theta1+r)*\cos\theta1/\cos(\alpha1+\theta1)$, where D3 is the third array element spacing, $\theta1$ is the first power angle, $\alpha1$ is the first included angle, L is the screen distance, and r is a data receive array element radius obtained based on the data receive array element size. The description of the radius herein does not limit an array element shape to a circle or an oval. If the array element has another shape, r is a radius of a minimum circle or a minimum oval that can cover the data receive array element.

Optionally, the fourth array element spacing determined by the second device based on the second power angle, the shortest distance, the data receive array element size, and the second included angle may be D4=2(L*tgθ2+r)*cos θ2/cos (α2+θ2), where D4 is the fourth array element spacing, θ2 is the second power angle, α2 is the second included angle, L is the shortest distance, and r is a data receive array element radius obtained based on the data receive array element size. The description of the radius herein does not limit an array element shape to a circle or an oval. If the array element has another shape, r is a radius of a minimum circle or a minimum oval that can cover the data receive array element.

With this implementation implemented, a data transmit array element spacing and a data receive array element spacing for avoiding signal aliasing can be calculated such that the data transmit array element and the data receive array element are determined based on the spacings, to avoid signal aliasing.

Optionally, the screen of the second device is a curved surface screen, a screen of the first device is a flat screen or a curved surface screen, the second target information includes a screen distance between the first device and the second device, the screen distance is a shortest distance between a first screen and a second screen, the second screen is a virtual flat screen constituted by all projection points of a vertical projection of the curved surface screen of the second device on an intersecting second target plane, the curved surface screen of the second device has a largest projection area on the second target plane, the first screen is the flat screen of the first device or the first screen is a virtual flat screen constituted by all projection points of a vertical projection of the curved surface screen of the first device on an intersecting first target plane, and the curved surface screen of the first device has a largest projection area on the first target plane, and a specific implementation of determining, by the second device based on the second target information, the data receive array element from the LEDs included in the screen of the second device is as follows determining, by the second device, a third array element spacing based on the screen distance, a first power angle of LEDs of the first screen on a first plane, a data receive array element size, and a first included angle between the first screen and the second screen on the first plane, where the third array element spacing is a minimum spacing between two adjacent data receive array elements in the second screen along a first direction of LED arrangement, determining, by the second device, a fourth array element spacing based on the screen distance, a second power angle of the LEDs of the first screen on a second plane, the data receive array element size, and a second included angle between the first screen and the second screen on the second plane, where the fourth array element spacing is a minimum spacing between two adjacent data receive array elements in the second screen along a second direction of LED arrangement, the first plane is perpendicular to the second plane, the first plane and the second plane each are perpendicular to the first screen, and the first direction is perpendicular to the second direction, determining, by the second device along the first direction based on the data receive array element size and the third array element spacing, the data receive array element from the LEDs included in the second screen, and determining, along the second direction based on the data receive array element size and the fourth array element spacing, the data receive array element from the LEDs included in the second screen, and projecting, by the second device, the determined data receive array element onto the curved surface screen of the second device, to obtain a data receive array element included in the curved surface screen of the second device.

With this implementation implemented, a data receive array element can be accurately determined on a curved surface screen, and the data receive array element can be prevented from receiving aliased signals.

Optionally, the second device may further obtain the data receive array element size.

Optionally, before the second device determines, based on the second target information, the data receive array element from the LEDs included in the screen, the second device performs a screen communication connection to the first device, and a specific implementation of obtaining, by the second device, the data receive array element size is as follows determining, by the second device, a first signal receive power, where the first signal receive power is actual signal receive power of the second screen during the screen communication connection, determining, by the second device, a first quantity, where the first quantity is a quantity of LEDs for receiving a signal during the screen communication connection, determining, by the second device, second signal receive power, where the second signal receive power is minimum signal receive power required by the second screen to correctly receive data in a first modulation and coding scheme, and the first modulation and coding scheme is a modulation and coding scheme used by the first device to send data after the screen communication connection is complete, and determining, by the second device, the data receive array element size based on the first signal receive power, the first quantity, and first signal receive sensitivity.

Optionally, if the first modulation and coding scheme is a modulation and coding scheme with a highest rate, and receive power corresponding to the first modulation and coding scheme in a correspondence is Y decibel-milliwatt (dBm), the second signal receive power is (Y+X) dBm, that is, the receive power corresponding to the first modulation and coding scheme in the correspondence is added to a headroom (X), and a sum is equal to the second signal receive power. The headroom may be an empirical value, for example, 6 dBm.

Optionally, if $$10^{\frac{-(Pr-Sr)}{10}} < 2,$$

the second device determines that there is only one data receive array element, and the data receive array element includes all LEDs of the screen. Otherwise, $$M2 = M1 * 10^{\frac{-(Pr-Sr)}{10}},$$

where M2 is a quantity of LED units included in each data receive array element, M1 is the first quantity, Pr is the first signal receive power, and Sr is the second signal receive power.

With this implementation implemented, the data receive array element size can be determined, and the data receive array element determined by the second device based on the data receive array element size can successfully receive data sent by a data transmit array element.

Optionally, before the second device determines, based on the second target information, the data receive array element from the LEDs included in the screen, the second device performs a screen communication connection to the first device, and a specific implementation of obtaining, by the second device, the data receive array element size is as follows determining, by the second device, first signal receive power, where the first signal receive power is actual signal receive power of the second screen during the screen communication connection, determining, by the second device, second signal receive power, where the second signal receive power is minimum signal receive power required by the second screen to correctly receive data in a first modulation and coding scheme, and the first modulation and coding scheme is a modulation and coding scheme used by the first screen of the first device to send data after the communication connection is complete, determining, by the second device, a transmit power difference, where the transmit power difference is a difference between transmit power of the first screen when the communication connection is being performed and transmit power for data sending of the first screen after the screen communication connection is established, determining, by the second device, a third area, where the third area is an area of the receive array element during the screen communication connection, and determining, by the second device, a data receive array element area based on the first signal receive power, first signal receive sensitivity, the transmit power difference, and the third area.

Optionally, it is assumed that the first signal receive power is P (dBm), the second signal receive power is P1 (dB), and the transmit power difference is $\Delta Q$ (dB). The data receive array element size S2 meets the following relationship $10*\lg(S0/S2)<P-P1-\Delta Q$, where S0 is an area of the transmit array element during the screen communication connection. For example, if the entire screen is used for single-channel sending and receiving during the screen communication connection, S0 is an area of the screen.

With this implementation implemented, the data receive array element size can be determined, and the data receive array element determined by the second device based on the data receive array element size can successfully receive data sent by a data transmit array element.

Optionally, a specific implementation of obtaining, by the second device, the second target information is as follows receiving, by the second device, sequence information using sequence receive array elements, where the sequence information is received by the second device after a plurality of sequence transmit array elements of the first device send local sequence information to the second device, each of the plurality of sequence receive array elements includes at least one LED of the second device, and each of the plurality of sequence transmit array elements includes at least one LED of the first device, and a specific implementation of determining, by the second device based on the second target information, the data receive array element from the LEDs of the second device is as follows determining, by the second device, the data receive array element from the plurality of sequence receive array elements based on the sequence information.

It can be learned that, with this implementation implemented, the second device can set an appropriate data receive array element, and can correctly receive, using the data receive array element, data sent by a data transmit array element of the first device.

Optionally, the second device may further perform the following part determining, by the second device, feedback information, where the feedback information is determined based on the sequence information, the feedback information includes first information and/or second information, the first information is used to indicate a sequence transmit array element that is not a data transmit array element or is used to indicate a sequence transmit array element that is a data transmit array element, and the second information is used to indicate a sequence transmit array element that needs to be combined into a data transmit array element, and sending, by the second device, the feedback information to the first device.

With this implementation implemented, the second device may feedback the first information and/or the second information to the first device such that the first device determines a data transmit array element from the sequence transmit array elements based on the first information and/or the second information.

Optionally, before the second device receives the sequence information using the plurality of sequence receive array elements, the second device may further perform the following part determining, by the second device, a preset second target spacing, obtaining, by the second device, a sequence receive array element size, and determining, by the second device, the plurality of sequence receive array elements based on the second target spacing and the sequence receive array element size, and a specific implementation of determining, by the second device, the data receive array element from the plurality of sequence receive array elements based on the sequence information is as follows calculating, by the second device, a plurality of correlation values between sequence information received by each of the plurality of sequence receive array elements and a plurality of pieces of local sequence information, where the plurality of pieces of local sequence information are in a one-to-one correspondence with the plurality of correlation values, and if a maximum correlation value in the plurality of correlation values corresponding to the sequence receive array element is greater than a first threshold, a ratio of a second largest correlation value to the maximum correlation value is not greater than a second threshold, and a first sequence transmit array element is not determined as a data transmit array element, determining, by the second device, the sequence receive array element as a data receive array element, and determining the first sequence transmit array element as a data transmit array element, where the first sequence transmit array element is a sequence transmit array element that sends local sequence information corresponding to the maximum correlation value.

It can be learned that, with this implementation implemented, the second device can determine an appropriate data receive array element from the sequence receive array elements.

Optionally, if the maximum correlation value in the plurality of correlation values corresponding to the sequence receive array element is greater than the first threshold, the ratio of the second largest correlation value to the maximum correlation value is not greater than the second threshold, and the first sequence transmit array element has been determined as a data transmit array element, the second device does not determine the sequence receive array element as a data receive array element, or the second device combines the sequence receive array element with a first sequence receive array element, where the first sequence transmit array element is the sequence transmit array element that sends the local sequence information corresponding to the maximum correlation value, the first sequence receive array element is a sequence receive array element that has been determined as a data receive array element, and maximum correlation values corresponding to the sequence receive array element and the first sequence receive array element are the same.

If a maximum correlation value corresponding to a sequence receive array element 1 is greater than the first threshold, and a ratio of a second largest correlation value corresponding to the sequence receive array element 1 to the maximum correlation value is not greater than the second threshold, it indicates that the sequence receive array element 1 may receive data sent by the first sequence transmit array element. However, there is already a sequence receive array element 2 that can receive the data of the first sequence transmit array element. Therefore, the sequence receive array element 1 is not used to receive the data sent by the first sequence transmit array element. Alternatively, the sequence receive array element 1 and the sequence receive array element 2 may be combined to receive the data sent by the first sequence transmit array element.

Optionally, if the maximum correlation value in the plurality of correlation values corresponding to the sequence receive array element is not greater than the first threshold, the second device does not determine the sequence receive array element as a data receive array element. If a maximum correlation value corresponding to a sequence receive array element is not greater than the first threshold, it indicates that the sequence receive array element cannot correctly receive data sent by any sequence transmit array element.

Optionally, if the maximum correlation value in the plurality of correlation values corresponding to the sequence receive array element is greater than the first threshold, the ratio of the second largest correlation value in the plurality of correlation values to the maximum correlation value is greater than the second threshold, and a second sequence transmit array element has been determined as a data transmit array element, the second device does not determine the sequence receive array element as a data receive array element, where the second sequence transmit array element is a sequence transmit array element that sends local sequence information corresponding to the second largest correlation value. If the maximum correlation value corresponding to the sequence receive array element is greater than the first threshold, the ratio of the second largest correlation value to the maximum correlation value is greater than the second threshold, and the second sequence transmit array element has been determined as a data transmit array element, it indicates that the second sequence transmit array element interferes with data received by the sequence receive array element. Therefore, the data received by the sequence receive array element is inaccurate, and the sequence receive array element cannot be determined as a data receive array element.

Optionally, if the maximum correlation value in the plurality of correlation values corresponding to the sequence receive array element is greater than the first threshold, the ratio of the second largest correlation value to the maximum correlation value is greater than the second threshold, the second sequence transmit array element is not determined as a data transmit array element, and the second largest correlation value is less than the first threshold, the second device does not determine the second sequence transmit array element as a data transmit array element, where the second sequence transmit array element is the sequence transmit array element that sends the local sequence information corresponding to the second largest correlation value.

If the maximum correlation value corresponding to the sequence receive array element is greater than the first threshold, the ratio of the second largest correlation value to the maximum correlation value is greater than the second threshold, the second sequence transmit array element is not determined as a data transmit array element, and the second largest correlation value is less than the first threshold, it indicates that the second sequence transmit array element interferes with the data received by the sequence receive array element. Therefore, the second sequence transmit array element cannot be determined as a data transmit array element.

Optionally, if the maximum correlation value in the plurality of correlation values corresponding to the sequence receive array element is greater than the first threshold, the ratio of the second largest correlation value to the maximum correlation value is greater than the second threshold, the second sequence transmit array element is not determined as a data transmit array element, and the second largest correlation value is greater than the first threshold, the second device determines to combine the second sequence transmit array element with the first sequence transmit array element, where the first sequence transmit array element is the sequence transmit array element that sends the local sequence information corresponding to the maximum correlation value, and the second sequence transmit array element is the sequence transmit array element that sends the local sequence information corresponding to the second largest correlation value.

If the maximum correlation value corresponding to the sequence receive array element is greater than the first threshold, the ratio of the second largest correlation value to the maximum correlation value is greater than the second threshold, the second sequence transmit array element is not determined as a data transmit array element, and the second largest correlation value is greater than the first threshold, it indicates that the sequence receive array element can correctly receive data sent by the first sequence transmit array element and the second sequence transmit array element. Therefore, the first sequence transmit array element and the second sequence transmit array element may be combined.

Optionally, the second device determines the first threshold and the second threshold based on a minimum signal-to-noise ratio required by the second screen to correctly receive data in a second modulation and coding scheme, where the second modulation and coding scheme is a modulation and coding scheme used by the first device to send local sequence information.

With this implementation implemented, an appropriate first threshold and an appropriate second threshold can be determined.

Optionally, before the second device determines the preset second target spacing, the second device receives a screen driver type of the first device sent by the first device, and a specific implementation of determining, by the second device, the preset second target spacing is as follows selecting, by the second device, the second target spacing from a plurality of preset receive array element spacings based on the screen driver type of the first device.

With this implementation implemented, an appropriate spacing can be selected.

Optionally, the second device may further receive first time information sent by the first device, where the first time information includes a start moment of a first time period, duration of the first time period, a start moment of a first data sending period, and duration of the first data sending period, the first time period includes the first data sending period and a first content display period, the first data sending period is used by the first device to send data, and the first content display period is used by the first device to display content, and a specific implementation of receiving, by the second device, the data from the data transmit array element of the first device using the data receive array element of the second device is as follows receiving, by the second device in the first data sending period, the data from the data transmit array element of the first device using the data receive array element of the second device.

With this implementation implemented, the second device can calculate, based on the four pieces of time information, a time for sending data by the first device in each period in order to receive, at a corresponding time, the data sent by the first device.

Optionally, the second device may further perform the following part determining, by the second device, a data transmit array element from the LEDs of the second device, where each data receive array element of the second device includes at least one LED, and sending, by the second device, to-be-sent data to a data receive array element of the first device using the data transmit array element of the second device, where each data transmit array element of the first device includes at least one LED of the first device. For a manner of determining the data transmit array element, refer to the method for determining a data transmit array element by the first device in the first aspect. Details are not described herein again.

With this implementation implemented, the first device and the second device can receive data using LEDs, and can also transmit data using LEDs.

Optionally, LEDs included in a data transmit array element and a data receive array element of the second device do not overlap.

With this implementation implemented, a space division duplex mode can be used to distinguish between the data transmit array element and the data receive array element, to ensure that data sending of the data transmit array element does not collide with data receiving of the data receive array element.

Optionally, the second device has a first data transmit array element and a first data receive array element whose LEDs overlap, and a data sending time of the first data transmit array element does not overlap a data receiving time of the first data receive array element. The LEDs of the first data transmit array element and the first data receive array element may partially or completely overlap.

In other words, even if the first data transmit array element and the first data receive array element have a same LED, the data sending time of the first data transmit array element is different from the data receiving time of the first data receive array element. It can be learned that, with this implementation implemented, a time division duplex mode can be used to distinguish between a data sending time period of the data transmit array element and a data receiving time period of the data receive array element, to ensure that data sending of the data transmit array element does not collide with data receiving of the data receive array element.

Optionally, the second device has a first data transmit array element and a first data receive array element whose LEDs overlap, and a data sending time of the first data transmit array element overlaps a data receiving time of the first data receive array element. The LEDs of the first data transmit array element and the first data receive array element may partially or completely overlap. The data sending time of the first data transmit array element and the data receiving time of the first data receive array element may partially or completely overlap.

It is found from research that, an LED can sense light at a reverse bias voltage. In addition, the LED has a relatively weak light sensing capability and a light emitting capability at a relatively low forward bias voltage (for example, 0.7 V-1.1 V). Based on this characteristic, a full-duplex function of the LED for simultaneous sending and receiving can be implemented.

Optionally, the second device has a first data transmit array element and a first data receive array element whose LEDs overlap, and a data sending time of the first data transmit array element overlaps a data receiving time of the first data receive array element. If a pin that is used to receive data and that is of a target LED and a pin that is used to send data and that is of the target LED are a same pin, the target LED is an LED included in both the first data transmit array element and the first data receive array element.

Optionally, the second device has a first data transmit array element and a first data receive array element whose LEDs overlap, and a data sending time of the first data transmit array element overlaps a data receiving time of the first data receive array element. If a pin that is used to receive data and that is of a target LED and a pin that is used to send data and that is of the target LED are different pins, and both the pin used to receive data and the pin used to send data are connected to an anode of the target LED or connected to a cathode of the target LED, the target LED is an LED included in both the first data transmit array element and the first data receive array element.

Optionally, the second device has a first data transmit array element and a first data receive array element whose LEDs overlap, and a data sending time of the first data transmit array element overlaps a data receiving time of the first data receive array element. If a pin that is used to receive data and that is of a target LED and a pin that is used to send data and that is of the target LED are different pins, the pin used to receive data is connected to an anode of the LED, and the pin used to send data is connected to a cathode of the LED, or the pin used to receive data is connected to a cathode of the LED, and the pin used to send data is connected to an anode of the LED, the target LED is an LED included in both the first data transmit array element and the first data receive array element.

Optionally, the second device determines, based on a transmit signal of the first data transmit array element, a signal received by the first data receive array element.

Because a device can know its own transmit signal, a received signal r can be calculated based on a relationship among the transmit signal t, the received signal r, and a signal y of a data receiving pin $y=f(t, r)$. A switch keying modulation signal is used as an example. A forward bias voltage is relatively high when information "1" is transmitted. In this case, if an optical signal with information "0" modulated is received, an induced current is relatively weak and is denoted as V10, or if an optical signal with information "1" modulated is received, an induced current is relatively strong and is denoted as V11, where V11>V10. A forward bias voltage is relatively low when information "0" is transmitted. In this case, if an optical signal with information "0" modulated is received, an induced current is relatively weak and is denoted as V00, where V00>V10, or if an optical signal with information "1" modulated is received, an induced current is relatively strong and is denoted as V01, where V01>V00 and V01>V11. Therefore, only two decision thresholds need to be set for receiving. A threshold A is between V11 and V10, and a threshold B is between V01 and V00. A threshold is selected based on transmitted information. The threshold A is selected when information "1" is transmitted, or the threshold B is selected when information "0" is transmitted. When a threshold is exceeded, a decision is "1", otherwise, a decision is "0".

Optionally, a second time period includes a second data sending period and a second content display period, the second data sending period is used by the second device to send data, and the second content display period is used by the second device to display content. The second device determines, in the second content display period based on a primary color intensity of the data transmit array element of the second device in the second data sending period and a time ratio of the second content display period to the second data sending period, a primary color intensity for transmitting a display signal.

It can be learned that, with this implementation implemented, impact caused by data transmission of the data transmit array element to a display color and display brightness can be avoided.

Optionally, the second device sends second time information to the first device, where the second time information includes a start moment of the second time period, duration of the second time period, a start moment of the second data sending period, and duration of the second data sending period.

With this implementation implemented, the first device can calculate, based on the four pieces of time information, a time for sending data by the second device in each period, and can receive, at a corresponding time, the data sent by the second device.

Optionally, before the first device determines the data receive array element from the LEDs, the second device may receive a quantity of LED primary colors and LED primary color types of the first device that are sent by the first device, and if a quantity of LED primary colors of the second device is the same as the quantity of LED primary colors of the first device, and LED primary color types of the second device are the same as the LED primary color types of the first device, the second device establishes a screen communication connection to the first device.

If the quantity of LED primary colors of the second device is different from the quantity of LED primary colors of the first device, or the LED primary color types of the second device are different from the LED primary color types of the first device, the first device cannot communicate with the second device using an LED. Therefore, before performing the communication connection, the second device needs to first determine whether the quantity of LED primary colors of the second device is the same as the quantity of LED primary colors of the first device and whether the LED primary color types of the second device are the same as the LED primary color types of the first device.

According to a third aspect, a communications device is provided. The communications device includes an obtaining module configured to obtain first target information, a processing module configured to determine, based on the first target information, a data transmit array element from LEDs of the communications device, where each data transmit array element of the communications device includes at least one LED, and a communications module configured to send to-be-sent data to a data receive array element of a second device using the data transmit array element, where each data receive array element of the second device includes at least one LED of the second device.

Optionally, the data transmit array element of the communications device includes a first data transmit array element and a second data transmit array element, the data receive array element of the second device includes a first data receive array element and a second data receive array element, the to-be-sent data includes first data and second data, and a specific manner of sending, by the communications module, the to-be-sent data to the data receive array element of the second device using the data transmit array element is as follows sending the first data to the first data receive array element of the second device using the first data transmit array element, and sending the second data to the second data receive array element of the second device using the second data transmit array element.

Optionally, a specific manner of determining, by the processing module based on the first target information, the data transmit array element from the LEDs of the communications device is as follows determining, based on the first target information, the data transmit array element from LEDs included in a camera flash of the communications device.

Optionally, a specific manner of determining, by the processing module based on the first target information, the data transmit array element from the LEDs of the communications device is as follows determining, based on the first target information, the data transmit array element from LEDs included in a screen of the communications device.

Optionally, the screen of the communications device is a flat screen, a screen of the second device is a flat screen or a curved surface screen, the first target information includes a screen distance between the communications device and the second device, the screen distance is a shortest distance between a first screen and a second screen, the first screen is the flat screen of the communications device, the second screen is the flat screen of the second device or the second screen is a virtual flat screen constituted by all projection points of a vertical projection of the curved surface screen of the second device on an intersecting second target plane, and the curved surface screen of the second device has a largest projection area on the second target plane, and a specific manner of determining, by the processing module based on the first target information, the data transmit array element from the LEDs included in the screen of the communications device is as follows determining a first array element spacing based on the screen distance and a first power angle of the LEDs of the first screen on a first plane, where the first array element spacing is a minimum spacing between two adjacent data transmit array elements in the first screen along a first direction of LED arrangement, determining a second array element spacing based on the screen distance and a second power angle of the LEDs of the first screen on a second plane, where the second array element spacing is a minimum spacing between two adjacent data transmit array elements in the first screen along a second direction of LED arrangement, the first plane is perpendicular to the second plane, the first plane and the second plane each are perpendicular to the first screen, and the first direction is perpendicular to the second direction, and determining, along the first direction based on a data transmit array element size and the first array element spacing, the data transmit array element from the LEDs included in the first screen, and determining, along the second direction based on the data transmit array element size and the second array element spacing, the data transmit array element from the LEDs included in the first screen.

Optionally, the screen of the communications device is a curved surface screen, a screen of the second device is a flat screen or a curved surface screen, the first target information includes a screen distance between the communications device and the second device, the screen distance is a shortest distance between a first screen and a second screen, the first screen is a virtual flat screen constituted by all projection points of a vertical projection of the curved surface screen of the communications device on an intersecting first target plane, the curved surface screen of the communications device has a largest projection area on the first target plane, the second screen is the flat screen of the second device or the second screen is a virtual flat screen constituted by all projection points of a vertical projection of the curved surface screen of the second device on an intersecting second target plane, and the curved surface screen of the second device has a largest projection area on the second target plane, and a specific manner of determining, by the processing module based on the first target information, the data transmit array element from the LEDs included in the screen of the communications device is as follows determining a first array element spacing based on the screen distance and a first power angle of the LEDs of the first screen on a first plane, where the first array element spacing is a minimum spacing between two adjacent data transmit array elements in the first screen along a first direction of LED arrangement, determining a second array element spacing based on the screen distance and a second power angle of the LEDs of the first screen on a second plane, where the second array element spacing is a minimum spacing between two adjacent data transmit array elements in the first screen along a second direction of LED arrangement, the first plane is perpendicular to the second plane, the first plane and the second plane each are perpendicular to the first screen, and the first direction is perpendicular to the second direction, determining, along the first direction based on a data transmit array element size and the first array element spacing, the data transmit array element from the LEDs included in the first screen, and determining, along the second direction based on the data transmit array element size and the second array element spacing, the data transmit array element from the LEDs included in the first screen, and projecting the determined data transmit array element onto the curved surface screen of the communications device, to obtain a data transmit array element included in the curved surface screen of the communications device.

Optionally, the obtaining module is further configured to obtain the data transmit array element size before the processing module determines, along the first direction based on the data transmit array element size and the first array element spacing, the data transmit array element from the LEDs included in the first screen, and determines, along the second direction based on the data transmit array element size and the second array element spacing, the data transmit array element from the LEDs included in the first screen.

Optionally, before the processing module determines, based on the first target information, the data transmit array element from the LEDs included in the screen of the communications device, the communications device is further configured to establish a screen communication connection to the second device, and a specific implementation of obtaining, by the obtaining module, the data transmit array element size is as follows determining first optical transmit power, where the first optical transmit power is minimum optical transmit power required by the first screen to correctly send data in a first modulation and coding scheme, and the first modulation and coding scheme is a modulation and coding scheme used to send data after the screen communication connection is established, determining second transmit power, where the second optical transmit power is optical transmit power of the LEDs of the first screen, determining, based on the first optical transmit power and the second optical transmit power, a quantity of LEDs included in the data transmit array element, where $$M \geq \frac{Pt}{Ps},$$

M is the quantity of LEDs included in the data transmit array element, Pt is the first optical transmit power, and Ps is the second optical transmit power, and determining the data transmit array element size based on M and an LED size.

With this implementation implemented, the data transmit array element size can be determined, and the data transmit array element determined by the communications device based on the data transmit array element size can successfully transmit data to a data receive array element.

Optionally, before the processing module determines, based on the first target information, the data transmit array element from the LEDs included in the screen of the communications device, the communications module is further configured to establish a screen communication connection to the second device, and a specific implementation of obtaining, by the obtaining module, the data transmit array element size is as follows determining a first signal-to-noise ratio, where the first signal-to-noise ratio is a signal-to-noise ratio for actual signal receiving of the second screen in a process of performing the screen communication connection, determining a second signal-to-noise ratio, where the second signal-to-noise ratio is a minimum signal-to-noise ratio required by the second screen to correctly receive data in a first modulation and coding scheme, and the first modulation and coding scheme is a modulation and coding scheme used by the first screen to send data after the screen communication connection is established, determining a transmit power difference, where the transmit power difference is a difference between optical transmit power of the first screen when the screen communication connection is being performed and optical transmit power for data sending of the first screen after the screen communication connection is established, determining a first area, where the first area is an area of the transmit array element during the communication connection, and determining a data transmit array element area based on the first signal-to-noise ratio, the second signal-to-noise ratio, the transmit power difference, and the first area.

Optionally, at a communication connection stage, the communications device may receive the first signal-to-noise ratio sent by the second device. The first signal-to-noise ratio may be attached to a connection request or a connection response, or may be sent using a separate command.

For example, it is assumed that in the process of the communication connection, the signal-to-noise ratio for actual signal receiving of the second screen is Q (dB), that is, the first signal-to-noise ratio is Q (dB), the modulation and coding scheme used by the first screen to send data after the screen communication connection is established is the first modulation and coding scheme, the minimum signal-to-noise ratio required by the second screen to correctly receive data in the first modulation and coding scheme is Q1 (dB), that is, the second signal-to-noise ratio is Q1 (dB), and the transmit power difference is ΔQ (dB). The data transmit array element size S1 meets the following relationship 10*lg(S0/S1)<Q−Q1−ΔQ, where S0 is an area of the transmit array element during the screen communication connection. For example, if the entire screen is used for single-channel sending and receiving during the screen communication connection, S0 is an area of the screen.

With this implementation implemented, the data transmit array element size can be determined, and the data transmit array element determined by the communications device based on the data transmit array element size can successfully transmit data to a data receive array element.

Optionally, a specific manner of obtaining, by the obtaining module, the first target information is as follows receiving feedback information sent by the second device, where the feedback information includes first information and/or second information, the first information is used to indicate a sequence transmit array element that is not a data transmit array element or is used to indicate a sequence transmit array element that is a data transmit array element, the second information is used to indicate a sequence transmit array element that needs to be combined into a data transmit array element, the feedback information is obtained by the second device based on received sequence information, the sequence information is received by the second device after a plurality of sequence transmit array elements of the communications device send local sequence information to the second device, and each of the plurality of sequence transmit array elements includes at least one LED of the communications device, and a specific manner of determining, by the processing module based on the first target information, the data transmit array element from the LEDs included in the screen of the communications device is as follows determining the data transmit array element from the plurality of sequence transmit array elements based on the feedback information.

Optionally, before the obtaining module receives the feedback information sent by the second device, the processing module is further configured to determine a preset first target spacing, the obtaining module is further configured to obtain a sequence transmit array element size, the processing module is further configured to determine, based on the first target spacing and the sequence transmit array element size, the plurality of sequence transmit array elements from the LEDs included in the screen of the communications device, and the communications module is further configured to send the local sequence information to the second device using the plurality of sequence transmit array elements such that a plurality of sequence receive array elements of the second device receive the sequence information, where each of the plurality of sequence receive array elements includes at least one LED of the second device.

Optionally, before the processing module determines the preset first target spacing, the communications module is further configured to receive a screen driver type of the second device sent by the second device, and a specific manner of determining, by the processing module, the preset first target spacing is as follows selecting the first target spacing from a plurality of preset transmit array element spacings based on the screen driver type of the second device.

Optionally, a first time period includes a first data sending period and a first content display period, the first data sending period is used to send to-be-sent data, the first content display period is used to display content, and the processing module is further configured to determine, in the first content display period based on a primary color intensity of the data transmit array element of the communications device in the first data sending period and a time ratio of the first content display period to the first data sending period, a primary color intensity for transmitting a display signal.

Optionally, the communications module is further configured to send first time information to the second device, where the first time information includes a start moment of the first time period, duration of the first time period, a start moment of the first data sending period, and duration of the first data sending period.

Optionally, the processing module is further configured to determine a data receive array element from the LEDs of the communications device, where each data receive array element of the communications device includes at least one LED, and the communications module is further configured to receive data from a data transmit array element of the second device using the data receive array element, where each data transmit array element of the second device includes at least one LED of the second device.

Optionally, LEDs included in a data transmit array element and a data receive array element of the communications device do not overlap.

With this implementation implemented, a space division duplex mode can be used to distinguish between the data transmit array element and the data receive array element, to ensure that data sending of the data transmit array element does not collide with data receiving of the data receive array element.

Optionally, the communications device has a first data transmit array element and a first data receive array element whose LEDs overlap, and a data sending time of the first data transmit array element does not overlap a data receiving time of the first data receive array element. The LEDs of the first data transmit array element and the first data receive array element may partially or completely overlap.

In other words, even if the first data transmit array element and the first data receive array element have a same LED, the data sending time of the first data transmit array element is different from the data receiving time of the first data receive array element. It can be learned that, with this implementation implemented, a time division duplex mode can be used to distinguish between a data sending time period of the data transmit array element and a data receiving time period of the data receive array element, to ensure that data sending of the data transmit array element does not collide with data receiving of the data receive array element.

Optionally, the communications device has a first data transmit array element and a first data receive array element whose LEDs overlap, and a data sending time of the first data transmit array element overlaps a data receiving time of the first data receive array element. The LEDs of the first data transmit array element and the first data receive array element may partially or completely overlap. The data sending time of the first data transmit array element and the data receiving time of the first data receive array element may partially or completely overlap.

It is found from research that, an LED can sense light at a reverse bias voltage. In addition, the LED has a relatively weak light sensing capability and a light emitting capability at a relatively low forward bias voltage (for example, 0.7 V-1.1 V). Based on this characteristic, a full-duplex function of the LED for simultaneous sending and receiving can be implemented.

Optionally, the communications device has a first data transmit array element and a first data receive array element whose LEDs overlap, and a data sending time of the first data transmit array element overlaps a data receiving time of the first data receive array element. If a pin that is used to receive data and that is of a target LED and a pin that is used to send data and that is of the target LED are a same pin, the target LED is an LED included in both the first data transmit array element and the first data receive array element.

Optionally, the communications device has a first data transmit array element and a first data receive array element whose LEDs overlap, and a data sending time of the first data transmit array element overlaps a data receiving time of the first data receive array element. If a pin that is used to receive data and that is of a target LED and a pin that is used to send data and that is of the target LED are different pins, and both the pin used to receive data and the pin used to send data are connected to an anode of the target LED or connected to a cathode of the target LED, the target LED is an LED included in both the first data transmit array element and the first data receive array element.

Optionally, the communications device has a first data transmit array element and a first data receive array element whose LEDs overlap, and a data sending time of the first data transmit array element overlaps a data receiving time of the first data receive array element. If a pin that is used to receive data and that is of a target LED and a pin that is used to send data and that is of the target LED are different pins, the pin used to receive data is connected to an anode of the LED, and the pin used to send data is connected to a cathode of the LED, or the pin used to receive data is connected to a cathode of the LED, and the pin used to send data is connected to an anode of the LED, the target LED is an LED included in both the first data transmit array element and the first data receive array element.

Optionally, the processing module is further configured to determine, based on a transmit signal of the first data transmit array element, a signal received by the first data receive array element.

Because a device can know its own transmit signal, a received signal r can be calculated based on a relationship among the transmit signal t, the received signal r, and a signal y of a data receiving pin y=f(t, r). A switch keying modulation signal is used as an example. A forward bias voltage is relatively high when information "1" is transmitted. In this case, if an optical signal with information "0" modulated is received, an induced current is relatively weak and is denoted as V10, or if an optical signal with information "1" modulated is received, an induced current is relatively strong and is denoted as V11, where V11>V10. A forward bias voltage is relatively low when information "0" is transmitted. In this case, if an optical signal with information "0" modulated is received, an induced current is relatively weak and is denoted as V00, where V00>V10, or if an optical signal with information "1" modulated is received, an induced current is relatively strong and is denoted as V01, where V01>V00 and V01>V11. Therefore, only two decision thresholds need to be set for receiving. A threshold A is between V11 and V10, and a threshold B is between V01 and V00. A threshold is selected based on transmitted information. The threshold A is selected when information "1" is transmitted, or the threshold B is selected when information "0" is transmitted. When a threshold is exceeded, a decision is "1", otherwise, a decision is "0".

Optionally, the communications module may further receive second time information sent by the second device, where the second time information includes a start moment of a second time period, duration of the second time period, a start moment of a second data sending period, and duration of the second data sending period, the first time period includes the second data sending period and a second content display period, the second data sending period is used by the second device to send data, and the content display period is used by the second device to display content, and a specific implementation of receiving, by the communications module, the data from the data transmit array element of the second device using the data receive array element of the communications device is as follows receiving, by the communications module in the second data sending period, the data from the data transmit array element of the second device using the data receive array element of the communications device.

It can be learned that, the communications device can calculate, based on the four pieces of time information, a time for sending data by the second device in each period, and can receive, at a corresponding time, the data sent by the second device.

Optionally, before the obtaining module obtains the first target information, the communications module is further configured to receive a quantity of LED primary colors and LED primary color types of the second device that are sent by the second device, and if the quantity of LED primary colors of the second device is the same as a quantity of LED primary colors of the communications device, and the LED primary color types of the second device are the same as LED primary color types of the communications device, the communications module is triggered to establish a screen communication connection to the second device.

According to a fourth aspect, a communications device is provided. The communications device includes an obtaining module configured to obtain second target information, a processing module configured to determine, based on the second target information, a data receive array element from LEDs of the communications device, where each data receive array element of the communications device includes at least one LED, and a communications module configured to receive data from a data transmit array element of a first device using the data receive array element, where each data transmit array element of the first device includes at least one LED of the first device.

Optionally, the data receive array element of the communications device includes a first data receive array element and a second data receive array element, the data transmit array element of the first device includes a first data transmit array element and a second data transmit array element, the data from the data transmit array element of the first device includes first data and second data, and a specific manner of receiving, by the communications module, the data from the transmit array element of the first device using the receive array element is as follows receiving the first data from the first data transmit array element of the first device using the first data receive array element, and receiving the second data from the second data transmit array element of the first device using the second data receive array element.

Optionally, a specific manner of determining, by the processing module based on the second target information, the data receive array element from the LEDs of the communications device is as follows determining, by the processing module based on the second target information, the data receive array element from LEDs included in a camera flash of the communications device.

Optionally, a specific manner of determining, by the processing module based on the second target information, the data receive array element from the LEDs of the communications device is as follows determining, by the processing module based on the second target information, the data receive array element from LEDs included in a screen of the communications device.

Optionally, the screen of the communications device is a flat screen, a screen of the first device is a flat screen or a curved surface screen, the second target information includes a screen distance between the first device and the communications device, the screen distance is a shortest distance between a first screen and a second screen, the second screen is the flat screen of the communications device, the first screen is the flat screen of the first device or the first screen is a virtual flat screen constituted by all projection points of a vertical projection of the curved surface screen of the first device on an intersecting first target plane, and the curved surface screen of the first device has a largest projection area on the first target plane, and a specific manner of determining, by the processing module based on the second target information, the data receive array element from the LEDs included in the screen of the communications device is as follows determining a third array element spacing based on the screen distance, a first power angle of LEDs of the first screen on a first plane, a data receive array element size, and a first included angle between the first screen and the second screen on the first plane, where the third array element spacing is a minimum spacing between two adjacent data receive array elements in the second screen along a first direction of LED arrangement, determining a fourth array element spacing based on the screen distance, a second power angle of the LEDs of the first screen on a second plane, the data receive array element size, and a second included angle between the first screen and the second screen on the second plane, where the fourth array element spacing is a minimum spacing between two adjacent data receive array elements in the second screen along a second direction of LED arrangement, the first plane is perpendicular to the second plane, the first plane and the second plane each are perpendicular to the first screen, and the first direction is perpendicular to the second direction, and determining, along the first direction based on the data receive array element size and the third array element spacing, the data receive array element from the LEDs in the second screen, and determining, along the second direction based on the data receive array element size and the fourth array element spacing, the data receive array element from the LEDs in the second screen.

Optionally, the screen of the communications device is a curved surface screen, a screen of the first device is a flat screen or a curved surface screen, the second target information includes a screen distance between the first device and the communications device, the screen distance is a shortest distance between a first screen and a second screen, the second screen is a virtual flat screen constituted by all projection points of a vertical projection of the curved surface screen of the communications device on an intersecting second target plane, the curved surface screen of the communications device has a largest projection area on the second target plane, the first screen is the flat screen of the first device or the first screen is a virtual flat screen constituted by all projection points of a vertical projection of the curved surface screen of the first device on an intersecting first target plane, and the curved surface screen of the first device has a largest projection area on the first target plane, and a specific manner of determining, by the processing module based on the second target information, the data receive array element from the LEDs included in the screen of the communications device is as follows determining a third array element spacing based on the screen distance, a first power angle of LEDs of the first screen on a first plane, a data receive array element size, and a first included angle between the first screen and the second screen on the first plane, where the third array element spacing is a minimum spacing between two adjacent data receive array elements in the second screen along a first direction of LED arrangement, determining a fourth array element spacing based on the screen distance, a second power angle of the LEDs of the first screen on a second plane, the data receive array element size, and a second included angle between the first screen and the second screen on the second plane, where the fourth array element spacing is a minimum spacing between two adjacent data receive array elements in the second screen along a second direction of LED arrangement, the first plane is perpendicular to the second plane, the first plane and the second plane each are perpendicular to the first screen, and the first direction is perpendicular to the second direction, determining, along the first direction based on the data receive array element size and the third array element spacing, the data receive array element from the LEDs included in the second screen, and determining, along the second direction based on the data receive array element size and the fourth array element spacing, the data receive array element from the LEDs included in the second screen, and projecting the determined data receive array element onto the curved surface screen of the communications device, to obtain a data receive array element included in the curved surface screen of the communications device.

Optionally, the obtaining module may further obtain the data receive array element size.

Optionally, before the processing module determines, based on the second target information, the data receive array element from the LEDs included in the screen, the communications module is further configured to perform a screen communication connection to the first device, and a specific implementation of obtaining, by the obtaining module, the data receive array element size is as follows determining first signal receive power, where the first signal receive power is actual signal receive power of the second screen during the screen communication connection, determining a first quantity, where the first quantity is a quantity of LEDs for receiving a signal during the screen communication connection, determining second signal receive power, where the second signal receive power is minimum signal receive power required by the second screen to correctly receive data in a first modulation and coding scheme, and the first modulation and coding scheme is a modulation and coding scheme used by the first device to send data after the screen communication connection is complete, and determining the data receive array element size based on the first signal receive power, the first quantity, and first signal receive sensitivity.

Optionally, if the first modulation and coding scheme is a modulation and coding scheme with a highest rate, and receive power corresponding to the first modulation and coding scheme in a correspondence is Y dBm, the second signal receive power is (Y+X) dBm, that is, the receive power corresponding to the first modulation and coding scheme in the correspondence is added to a headroom (X), and a sum is equal to the second signal receive power. The headroom may be an empirical value, for example, 6 dBm.

Optionally, if $$10^{\frac{-(Pr-Sr)}{10}} < 2,$$

the obtaining module determines that there is only one data receive array element, and the data receive array element includes all LEDs of the screen. Otherwise, $$M2 = M1 * 10^{\frac{-(Pr-Sr)}{10}},$$

where M2 is a quantity of LED units included in each data receive array element, M1 is the first quantity, Pr is the first signal receive power, and Sr is the second signal receive power.

With this implementation implemented, the data receive array element size can be determined, and the data receive array element determined by the communications device based on the data receive array element size can successfully receive data sent by a data transmit array element.

Optionally, before the processing module determines, based on the second target information, the data receive array element from the LEDs included in the screen, the communications module is further configured to perform a screen communication connection to the first device, and a specific implementation of obtaining, by the obtaining module, the data receive array element size is as follows determining first signal receive power, where the first signal receive power is actual signal receive power of the second screen during the screen communication connection, determining second signal receive power, where the second signal receive power is minimum signal receive power required by the second screen to correctly receive data in a first modulation and coding scheme, and the first modulation and coding scheme is a modulation and coding scheme used by the first screen of the first device to send data after the screen communication connection is complete, determining a transmit power difference, where the transmit power difference is a difference between transmit power of the first screen when the screen communication connection is being performed and transmit power for data sending of the first screen after the screen communication connection is established, determining a third area, where the third area is an area of the receive array element during the screen communication connection, and determining a data receive array element area based on the first signal receive power, first signal receive sensitivity, the transmit power difference, and the third area.

Optionally, it is assumed that the first signal receive power is P (dBm), the second signal receive power is P1 (dB), and the transmit power difference is ΔQ (dB). The data receive array element size S2 meets the following relationship 10*lg(S0/S2)<P−P1−ΔQ, where S0 is an area of the transmit array element during the screen communication connection. For example, if the entire screen is used for single-channel sending and receiving during the screen communication connection, S0 is an area of the screen.

With this implementation implemented, the data receive array element size can be determined, and the data receive array element determined by the first device based on the data receive array element size can successfully receive data sent by a data transmit array element.

Optionally, a specific manner of obtaining, by the obtaining module, the second target information is as follows receiving sequence information using a plurality of sequence receive array elements, where the sequence information is received by the communications device after a plurality of sequence transmit array elements of the first device send local sequence information, each of the plurality of sequence receive array elements includes at least one LED of the communications device, and each of the plurality of sequence transmit array elements includes at least one LED of the first device, and a specific manner of determining, by the processing module based on the second target information, the data receive array element from the LEDs of the communications device is as follows determining the data receive array element from the plurality of sequence receive array elements based on the sequence information.

Optionally, the processing module is further configured to determine feedback information, where the feedback information is determined based on the received sequence information, the feedback information includes first information and/or second information, the first information is used to indicate a sequence transmit array element that is not a data transmit array element or is used to indicate a sequence transmit array element that is a data transmit array element, and the second information is used to indicate a sequence transmit array element that needs to be combined into a data transmit array element, and the communications module is further configured to send the feedback information to the first device.

Optionally, before the obtaining module receives the sequence information using the plurality of sequence receive array elements, the processing module is further configured to determine a preset second target spacing, the obtaining module is further configured to obtain a sequence receive array element size, and the processing module is further configured to determine the plurality of sequence receive array elements based on the second target spacing and the sequence receive array element size, and a specific manner of determining, by the processing module, the data receive array element from the plurality of sequence receive array elements based on the sequence information is as follows calculating a plurality of correlation values between sequence information received by each of the plurality of sequence receive array elements and a plurality of pieces of local sequence information, where the plurality of pieces of local sequence information are in a one-to-one correspondence with the plurality of correlation values, and if a maximum correlation value in the plurality of correlation values corresponding to the sequence receive array element is greater than a first threshold, a ratio of a second largest correlation value to the maximum correlation value is not greater than a second threshold, and a first sequence transmit array element is not determined as a data transmit array element, determining the sequence receive array element as a data receive array element, and determining the first sequence transmit array element as a data transmit array element, where the first sequence transmit array element is a sequence transmit array element that sends local sequence information corresponding to the maximum correlation value.

Optionally, if the maximum correlation value in the plurality of correlation values corresponding to the sequence receive array element is greater than the first threshold, the ratio of the second largest correlation value to the maximum correlation value is not greater than the second threshold, and the first sequence transmit array element has been determined as a data transmit array element, the processing module does not determine the sequence receive array element as a data receive array element, or the communications device combines the sequence receive array element with a first sequence receive array element, where the first sequence transmit array element is the sequence transmit array element that sends the local sequence information corresponding to the maximum correlation value, the first sequence receive array element is a sequence receive array element that has been determined as a data receive array element, and maximum correlation values corresponding to the sequence receive array element and the first sequence receive array element are the same.

Optionally, if the maximum correlation value in the plurality of correlation values corresponding to the sequence receive array element is not greater than the first threshold, the processing module does not determine the sequence receive array element as a data receive array element.

Optionally, if the maximum correlation value in the plurality of correlation values corresponding to the sequence receive array element is greater than the first threshold, the ratio of the second largest correlation value in the plurality of correlation values to the maximum correlation value is greater than the second threshold, and a second sequence transmit array element has been determined as a data transmit array element, the processing module does not determine the sequence receive array element as a data receive array element, where the second sequence transmit array element is a sequence transmit array element that sends local sequence information corresponding to the second largest correlation value.

Optionally, if the maximum correlation value in the plurality of correlation values corresponding to the sequence receive array element is greater than the first threshold, the ratio of the second largest correlation value to the maximum correlation value is greater than the second threshold, the second sequence transmit array element is not determined as a data transmit array element, and the second largest correlation value is less than the first threshold, the processing module does not determine the second sequence transmit array element as a data transmit array element, where the second sequence transmit array element is the sequence transmit array element that sends the local sequence information corresponding to the second largest correlation value.

Optionally, if the maximum correlation value in the plurality of correlation values corresponding to the sequence receive array element is greater than the first threshold, the ratio of the second largest correlation value to the maximum correlation value is greater than the second threshold, the second sequence transmit array element is not determined as a data transmit array element, and the second largest correlation value is greater than the first threshold, the processing module determines to combine the second sequence transmit array element with the first sequence transmit array element, where the first sequence transmit array element is the sequence transmit array element that sends the local sequence information corresponding to the maximum correlation value, and the second sequence transmit array element is the sequence transmit array element that sends the local sequence information corresponding to the second largest correlation value.

Optionally, before the processing module determines the preset second target spacing, the communications module is further configured to receive a screen driver type of the first device sent by the first device, and a specific manner of determining, by the processing module, the preset second target spacing is as follows selecting the second target spacing from a plurality of preset receive array element spacings based on the screen driver type of the first device.

Optionally, the communications module is further configured to receive first time information sent by the first device, where the first time information includes a start moment of a first time period, duration of the first time period, a start moment of a first data sending period, and duration of the first data sending period, the first time period includes the first data sending period and a first content display period, the first data sending period is used by the first device to send data, and the first content display period is used by the first device to display content, and a specific manner of receiving, by the communications module, the data from the data transmit array element of the first device using the data receive array element of the communications device is as follows receiving, in the first data sending period, the data from the data transmit array element of the first device using the data receive array element of the communications device.

Optionally, the processing module is further configured to determine a data transmit array element from the LEDs of the communications device, where each data receive array element of the communications device includes at least one LED, and the communications module is further configured to send to-be-sent data to a data receive array element of the first device using the data transmit array element of the communications device, where each data transmit array element of the first device includes at least one LED of the first device.

With this implementation implemented, the first device and the communications device can receive data using LEDs, and can also transmit data using LEDs.

Optionally, LEDs included in a data transmit array element and a data receive array element of the communications device do not overlap.

With this implementation implemented, a space division duplex mode can be used to distinguish between the data transmit array element and the data receive array element, to ensure that data sending of the data transmit array element does not collide with data receiving of the data receive array element.

Optionally, the communications device has a first data transmit array element and a first data receive array element whose LEDs overlap, and a data sending time of the first data transmit array element does not overlap a data receiving time of the first data receive array element. The LEDs of the first data transmit array element and the first data receive array element may partially or completely overlap.

In other words, even if the first data transmit array element and the first data receive array element have a same LED, the data sending time of the first data transmit array element is different from the data receiving time of the first data receive array element. It can be learned that, with this implementation implemented, a time division duplex mode can be used to distinguish between a data sending time period of the data transmit array element and a data receiving time period of the data receive array element, to ensure that data sending of the data transmit array element does not collide with data receiving of the data receive array element.

Optionally, the communications device has a first data transmit array element and a first data receive array element whose LEDs overlap, and a data sending time of the first data transmit array element overlaps a data receiving time of the first data receive array element. The LEDs of the first data transmit array element and the first data receive array element may partially or completely overlap. The data sending time of the first data transmit array element and the data receiving time of the first data receive array element may partially or completely overlap.

It is found from research that, an LED can sense light at a reverse bias voltage. In addition, the LED has a relatively weak light sensing capability and a light emitting capability at a relatively low forward bias voltage (for example, 0.7 V-1.1 V). Based on this characteristic, a full-duplex function of the LED for simultaneous sending and receiving can be implemented.

Optionally, the communications device has a first data transmit array element and a first data receive array element whose LEDs overlap, and a data sending time of the first data transmit array element overlaps a data receiving time of the first data receive array element. If a pin that is used to receive data and that is of a target LED and a pin that is used to send data and that is of the target LED are a same pin, the target LED is an LED included in both the first data transmit array element and the first data receive array element.

Optionally, the communications device has a first data transmit array element and a first data receive array element whose LEDs overlap, and a data sending time of the first data transmit array element overlaps a data receiving time of the first data receive array element. If a pin that is used to receive data and that is of a target LED and a pin that is used to send data and that is of the target LED are different pins, and both the pin used to receive data and the pin used to send data are connected to an anode of the target LED or connected to a cathode of the target LED, the target LED is an LED included in both the first data transmit array element and the first data receive array element.

Optionally, the communications device has a first data transmit array element and a first data receive array element whose LEDs overlap, and a data sending time of the first data transmit array element overlaps a data receiving time of the first data receive array element. If a pin that is used to receive data and that is of a target LED and a pin that is used to send data and that is of the target LED are different pins, the pin used to receive data is connected to an anode of the LED, and the pin used to send data is connected to a cathode of the LED, or the pin used to receive data is connected to a cathode of the LED, and the pin used to send data is connected to an anode of the LED, the target LED is an LED included in both the first data transmit array element and the first data receive array element.

Optionally, the processing module is further configured to determine, based on a transmit signal of the first data transmit array element, a signal received by the first data receive array element.

Because a device can know its own transmit signal, a received signal r can be calculated based on a relationship among the transmit signal t, the received signal r, and a signal y of a data receiving pin $y=f(t, r)$. A switch keying modulation signal is used as an example. A forward bias voltage is relatively high when information "1" is transmitted. In this case, if an optical signal with information "0" modulated is received, an induced current is relatively weak and is denoted as V10, or if an optical signal with information "1" modulated is received, an induced current is relatively strong and is denoted as V11, where V11>V10. A forward bias voltage is relatively low when information "0" is transmitted. In this case, if an optical signal with information "0" modulated is received, an induced current is relatively weak and is denoted as V00, where V00>V10, or if an optical signal with information "1" modulated is received, an induced current is relatively strong and is denoted as V01, where V01>V00 and V01>V11. Therefore, only two decision thresholds need to be set for receiving. A threshold A is between V11 and V10, and a threshold B is between V01 and V00. A threshold is selected based on transmitted information. The threshold A is selected when information "1" is transmitted, or the threshold B is selected when information "0" is transmitted. When a threshold is exceeded, a decision is "1", otherwise, a decision is "0".

Optionally, a second time period includes a second data sending period and a second content display period, the second data sending period is used by the communications device to send data, and the second content display period is used by the communications device to display content. The processing module is further configured to determine, in the second content display period based on a primary color intensity of the data transmit array element of the communications device in the second data sending period and a time ratio of the second content display period to the second data sending period, a primary color intensity for transmitting a display signal.

It can be learned that, with this implementation implemented, impact caused by data transmission of the data transmit array element to a display color and display brightness can be avoided.

Optionally, the communications module is further configured to send second time information to the first device, where the second time information includes a start moment of the second time period, duration of the second time period, a start moment of the second data sending period, and duration of the second data sending period.

With this implementation implemented, the first device can calculate, based on the four pieces of time information, a time for sending data by the communications device in each period, and can receive, at a corresponding time, the data sent by the communications device.

Optionally, before the processing module determines the data receive array element from the LEDs, the communications module is further configured to receive a quantity of LED primary colors and LED primary color types of the first device that are sent by the first device, and if a quantity of LED primary colors of the communications device is the same as the quantity of LED primary colors of the first device, and LED primary color types of the communications device are the same as the LED primary color types of the first device, the communications module is triggered to establish a screen communication connection to the first device.

If the quantity of LED primary colors of the communications device is different from the quantity of LED primary colors of the first device, or the LED primary color types of the communications device are different from the LED primary color types of the first device, the first device cannot communicate with the communications device using an LED. Therefore, before performing the communication connection, the communications device needs to first determine whether the quantity of LED primary colors of the communications device is the same as the quantity of LED primary colors of the first device and whether the LED primary color types of the communications device are the same as the LED primary color types of the first device.

According to a fifth aspect, a communications device is provided. The communications device includes a processor, a memory, and an LED. The LED is connected to the processor, and the processor is connected to the memory. The LED is configured to communicate with another device. One or more programs are stored in the memory. The processor invokes the program stored in the memory to implement the solution in the first aspect, the second aspect, the possible implementations of the first aspect, or the possible implementations of the second aspect. For problem-resolving implementations and benefits of the communications device, refer to the implementations and the benefits of the first aspect, the second aspect, the possible implementations of the first aspect, or the possible implementations of the second aspect. No repeated description is provided.

According to a sixth aspect, a computer program product is provided. When the computer program product runs on a computer, the computer is enabled to perform the method in the first aspect, the second aspect, the possible implementations of the first aspect, or the possible implementations of the second aspect.

According to a seventh aspect, a chip product of a communications device is provided, to perform the first aspect, the second aspect, the possible implementations of the first aspect, or the possible implementations of the second aspect.

According to an eighth aspect, a computer-readable storage medium is provided. The computer-readable storage medium stores an instruction, and when the instruction runs on a computer, the computer is enabled to perform the first aspect, the second aspect, the possible implementations of the first aspect, or the possible implementations of the second aspect.

DESCRIPTION OF EMBODIMENTS

The following further describes specific embodiments of this application in detail with reference to accompanying drawings.

Embodiments of this application provide a communication method and a related device, to increase a VLC transmission rate.

For better understanding of the embodiments of this application, the following describes a communications system to which the embodiments of this application are applicable.

Figure 1:
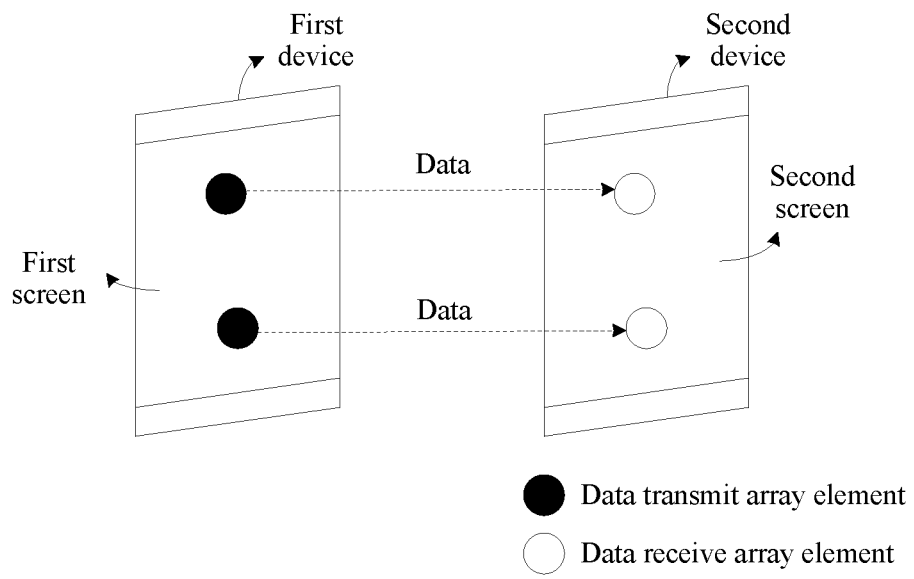
FIG. 1 is a schematic diagram of a communications system according to an embodiment of this application.

FIG. 1 is a schematic diagram of a communications system according to an embodiment of this application. As shown in FIG. 1, the communications system includes a first device and a second device. The first device and the second device each may be a device that has an LED, for example, a mobile phone, a wearable device (for example, a smartwatch), a tablet computer, a personal computer (PC), a personal digital assistant (PDA), or a vehicle-mounted computer.

As shown in FIG. 1, the first device may send data to a data receive array element of the second device using a data transmit array element of the first device. The data transmit array element and the data receive array element each include an LED. The data transmit array element and the data receive array element each may include an LED of a camera flash, or an LED of a screen, or an LED of another component. An example in which the data transmit array element and the data receive array element each include an LED of a screen is used in FIG. 1.

For example, when the data transmit array element of the first device emits light, it indicates that "1" is sent, or when the data transmit array element of the first device does not emit light, it indicates that "0" is sent. Alternatively, data is sent based on a luminous intensity of the data transmit array element of the first device. Alternatively, the second device determines sent data based on light of different colors emitted by the data transmit array element of the first device.

The following describes a principle of sending data by a data transmit array element.

Generally, when an anode voltage of an LED is higher than a cathode voltage, the LED has a forward bias voltage. When the LED has the forward bias voltage, the LED emits light. In addition, a higher forward bias voltage indicates greater brightness of the LED. For example, if a cathode voltage of an LED is 1 V and an anode voltage of the LED is 5 V, the LED has a forward bias voltage, and the forward bias voltage is 4 V. In this case, the LED emits light.

When the anode voltage of the LED is lower than the cathode voltage, the LED has a reverse bias voltage. When the anode voltage of the LED is equal to the cathode voltage, the LED has a bias voltage of 0 V. When the LED has the reverse bias voltage or the bias voltage is 0 V, the LED does not emit light. For example, if a cathode voltage of an LED is 5 V and an anode voltage of the LED is 2 V, the LED has a reverse bias voltage, and the reverse bias voltage is 3 V. In this case, the LED does not emit light.

For example, data is sent in a switch keying manner. When an LED of a data transmit array element has a forward bias voltage, the LED emits light, and in this case, the data transmit array element sends information "1". When the LED of the data transmit array element has a reverse bias voltage, the LED does not emit light, and in this case, the data transmit array element sends information "0". Alternatively, when the LED of the data transmit array element is off, it indicates that the data transmit array element sends information "1", or when the LED of the data transmit array element is on, it indicates that the data transmit array element sends information "0".

For another example, data is sent at a luminous intensity of a data transmit array element. To avoid reverse bias of an LED of the data transmit array element, the following may be specified. A lowest voltage at an anode of the LED of the data transmit array element is not lower than a highest voltage at a cathode of the LED of the data transmit array element. For example, an anode voltage is 1-3 V, and a cathode voltage is 0-1 V. In this case, a bias voltage range of the LED of the data transmit array element is 0-3 V. For example, when a bias voltage of the LED of the data transmit array element is 1 V, data sent by the data transmit array element is "00", when the bias voltage of the LED of the data transmit array element is 0 V, data sent by the data transmit array element is "01", when the bias voltage of the LED of the data transmit array element is 3 V, data sent by the data transmit array element is "10", or when the bias voltage of the LED of the data transmit array element is 2 V, data sent by the data transmit array element is "11". In other words, different forward bias voltages may be used to control sending of different data, because different forward bias voltages lead to different luminous intensities of the LED. Therefore, this manner is referred to as a manner of sending data based on a luminous intensity of the data transmit array element.

Therefore, different data may be sent by controlling the LED of the data transmit array element to have a forward bias voltage, a reverse bias voltage, or a 0 V bias voltage.

The following describes an LED of a screen.

LED screens of the first device and the second device each may be an organic light-emitting diode (OLED) screen, a quantum dot light emitting diode (QLED) screen, a μ LED screen, or the like. Each pixel of an LED screen is constituted by a group of LEDs, and the entire screen may be considered as a huge LED array. A group of LEDs may be LEDs of different colors, which are most common red, green, and blue tri-primary-color LEDs. However, there may also be LEDs of more primary colors. For example, each group includes one LED for each of four primary colors red, yellow, cyan, and blue. An advantage of using LEDs of more primary colors lies in richer display colors. A size of an LED is very small, for example, a size of a micro (μ) LED is only in a 10 micrometers (μm)*10 μm order of magnitude. Therefore, tens of thousands and even several millions of LED units are integrated in a small-sized screen of several square centimeters.

Figure 2:
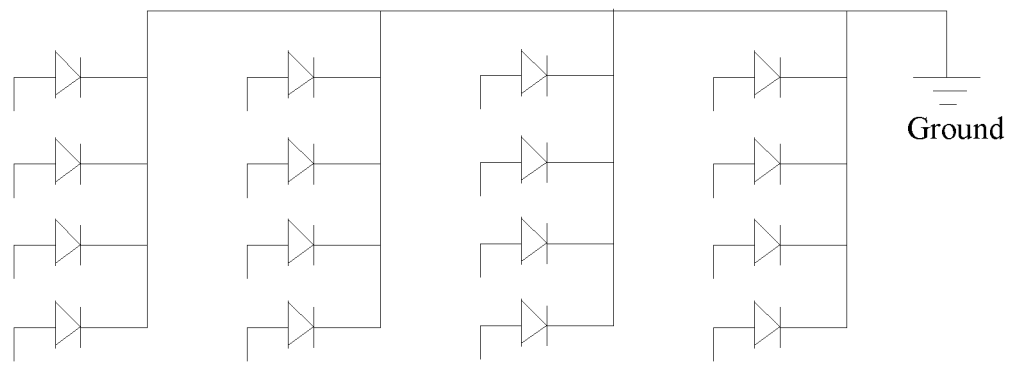
FIG. 2 is a schematic diagram of a circuit of a screen independently driven by LEDs according to an embodiment of this application.

There are a plurality of driving manners for an LED of a screen, including an independent driving manner and a matrix driving manner. FIG. 2 is a schematic diagram of a circuit of a screen independently driven by LEDs. As shown in FIG. 2, for a screen independently driven by LEDs, cathodes of the LEDs are grounded, and corresponding voltages are input to anodes of the LEDs. In an embodiment, for the screen independently driven by LEDs, each LED can independently control the LED to be on or off, and independently control its own brightness.

Figure 3:
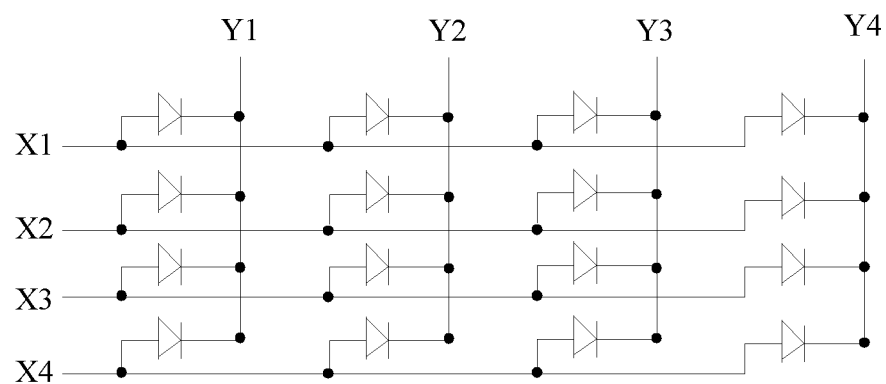
FIG. 3 is a schematic diagram of a circuit of a screen driven by an LED matrix according to an embodiment of this application.

FIG. 3 is a schematic diagram of a circuit of a screen in an LED matrix driving manner. As shown in FIG. 3, LEDs in a same row share one anode, and LEDs in a same column share one cathode. For example, anodes of LEDs in the first row each are X1, and cathodes of LEDs in the first column each are Y1. An advantage of such driving lies in a significant decrease in a quantity of pins. It is assumed that a screen includes M rows and N columns of LEDs. In this case, at least M*N pins originally need to be independently controlled, and only (M+N) pins need to be independently controlled now.

For example, the LEDs may be scanned by row, and the first row is scanned first. In FIG. 3, X1 is set to 5 V, and Y1, Y2, Y3, and Y4 are respectively set to 5 V, 0 V, 0 V, and 5 V. In this case, the second and third LEDs in the first row are turned on. Then, the second row is scanned. In FIG. 3, X2 is set to 5 V, and Y1, Y2, Y3, and Y4 are respectively set to 0 V, 0 V, 0 V, and 5 V. In this case, the first, second, and third LEDs in the first row are turned on.

For another example, scanning may not be performed by row, and X1 is set to 5 V, X2 is set to 5 V, X3 is set to 0 V, X4 is set to 0 V, and Y1, Y2, Y3, and Y4 each are set to 0 V. Because LEDs in the first and second rows have forward bias voltages, all the LEDs in the first and second rows are on. Because LEDs in the third and fourth rows have bias voltages of 0 V, all the LEDs in the third and fourth rows are off.

The following describes a principle of receiving data by a data receive array element.

When an LED has a reverse bias voltage (a cathode voltage is higher than an anode voltage) or a 0 V bias voltage (a cathode voltage is to an anode voltage), the LED has a light sensing function and generates an induced current. An intensity of the induced current varies with a luminous intensity sensed by an LED unit. A stronger luminous intensity sensed by the LED unit indicates a stronger induced current. A weaker luminous intensity sensed by the LED unit indicates a weaker induced current. A luminous intensity depends on a transmit signal. Therefore, data sent by a transmit end can be obtained using an induced current of an LED. Therefore, using the feature that an LED has the light sensing function at a reverse bias voltage or a 0 V bias voltage, the LED may be used to send a visible light signal and may also be used to receive a visible light signal.

Figure 4:
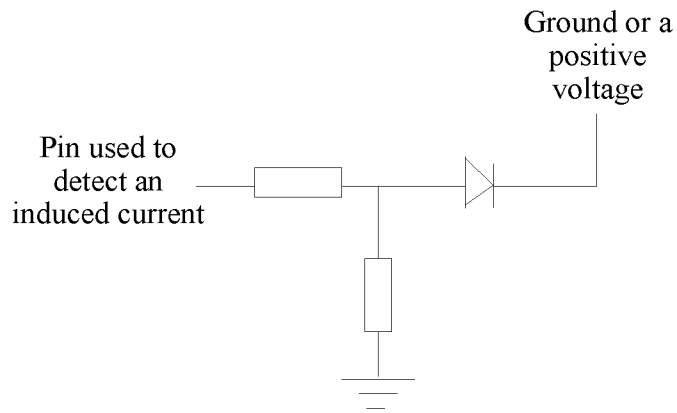
FIG. 4 is a schematic diagram of a circuit diagram related to an LED according to an embodiment of this application.
Figure 5:
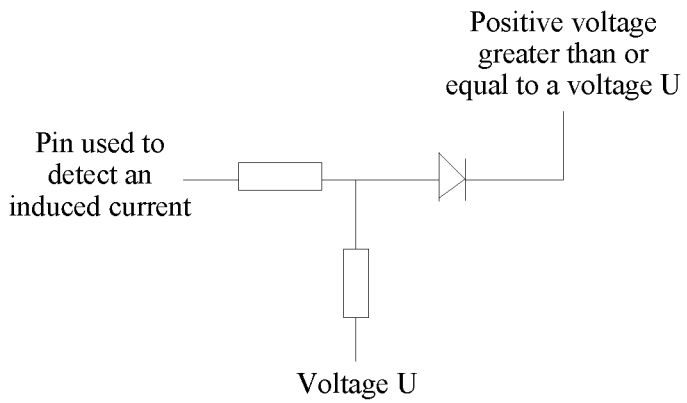
FIG. 5 is a schematic diagram of a circuit diagram related to an LED according to an embodiment of this application.

As shown in FIG. 4, there are many manners of enabling an LED unit to have a reverse bias voltage or a 0 V bias voltage. For example, the following may be specified. A cathode of an LED is grounded or the cathode of the LED is set to a 0 V voltage or a positive voltage, such as 5 V. An anode of the LED may be grounded using a resistor, and a loaded voltage is 0 V. As shown in FIG. 5, if the anode is also loaded with a positive voltage U, a voltage loaded to the cathode is not less than U. In the embodiments of this application, a cathode or an anode of an LED at a receive end may be connected to a pin used to detect an induced current of the LED. The receive end obtains received data based on an intensity of a detected induced current. For example, as shown in FIG. 4 and FIG. 5, the receive end may detect an induced current of the LED using a pin at the anode. When the transmit end transmits "1", an LED emits light, and the induced current of the LED at the receive end is relatively strong. When the transmit end transmits "0", the LED does not emit light, and the induced current of the LED at the receive end is relatively weak. Therefore, the receive end may determine, based on an intensity of the induced current, whether received data is "0" or "1". If the transmit end uses a more complex modulation scheme, a same principle is used for receiving. For example, if different data is represented using different luminous intensities, a luminous intensity corresponding to transmitted data also causes an induced current at the receive end to present a corresponding intensity, thereby implementing receiving.

When one data receive array element includes a plurality of LEDs, data received by the data receive array element is determined based on a sum of induced currents of the plurality of LEDs. For example, for a matrix driving screen, as shown in FIG. 3, if all of four LEDs in the first row belong to a data receive array element 1, the receive end can detect, at the pin X1, a sum of induced currents of all the LEDs. The receive end determines, based on the sum of induced currents detected at the pin X1, data received by the data receive array element 1. If all of four LEDs in the first column belong to a data receive array element 1, the receive end detects, at the pin Y1, a sum of induced currents of all the LEDs. The receive end determines, based on the sum of induced currents detected at the pin Y1, data received by the data receive array element 1. A principle of independent driving of LEDs is the same.

The following describes a data transmit array element obtained by dividing LEDs.

Figure 6:
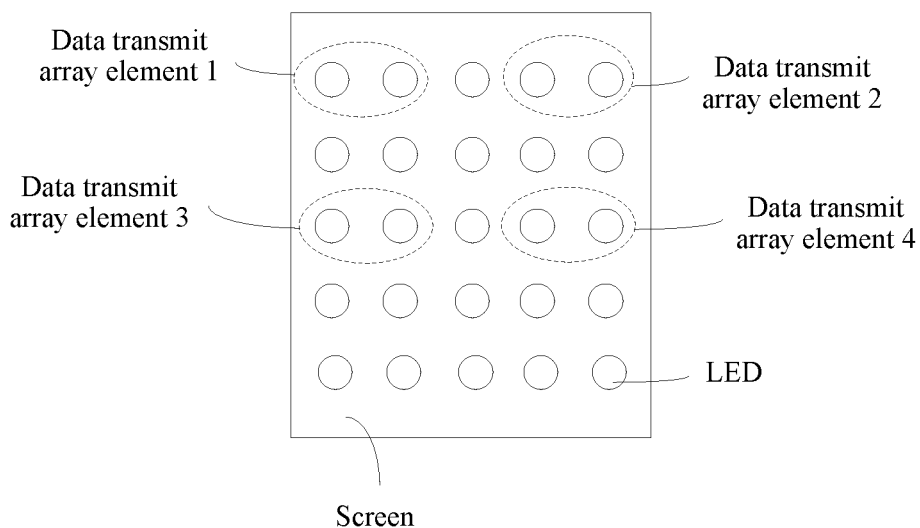
FIG. 6 is a schematic diagram of division of data transmit array elements according to an embodiment of this application.

One or more LED units may form one data transmit array element. One camera flash or screen may include one or more data transmit array elements. For example, a data transmit array element of a screen is used as an example. As shown in FIG. 6, a data transmit array element 1 includes the first and second LEDs in the first row, a data transmit array element 2 includes the fourth and fifth LEDs in the first row, a data transmit array element 3 includes the first and second LEDs in the third row, and a data transmit array element 4 includes the fourth and fifth LEDs in the third row.

LEDs in a same data transmit array element send same data. For example, if data sent by the data transmit array element 1 is "1", an LED 1 and an LED 2 in the data transmit array element 1 are both on, or if the data sent by the data transmit array element is "0", the LED 1 and the LED 2 in the data transmit array element 1 are both off.

Different data transmit array elements may send same data. For example, the data transmit array element 1 and the data transmit array element 2 may send same data. This can increase signal sending energy, thereby increasing a data receiving success rate.

Certainly, different data transmit array elements may alternatively send different data. For example, the data transmit array element 1 sends a first channel of data, and the data transmit array element 2 sends a second channel of data. This can increase a quantity of concurrent channels of data, thereby increasing a data transmission rate.

For a matrix driving screen, LEDs in one row generally belong to only one data transmit array element. Alternatively, LEDs in one column belong to only one data transmit array element. For example, as shown in FIG. 3, the data transmit array element 1 includes LEDs in the first row, the data transmit array element 2 includes LEDs in the second row, the data transmit array element 3 includes LEDs in the third row, and the data transmit array element 4 includes LEDs in the fourth row.

Only some LEDs in one row of the screen may be used to send data. Alternatively, only some LEDs in one column of the screen may be used to send data. For example, as shown in FIG. 3, the first, second, and third LEDs in the first row belong to the data transmit array element 1. The fourth LED does not belong to the data transmit array element 1, and therefore the fourth LED is not used to send data. A bias voltage of an LED not used to send data may be set to a reverse bias voltage or a 0 V bias voltage. In this way, the LED not used to send data does not emit light.

The following describes a data receive array element obtained by dividing LEDs.

Figure 7:
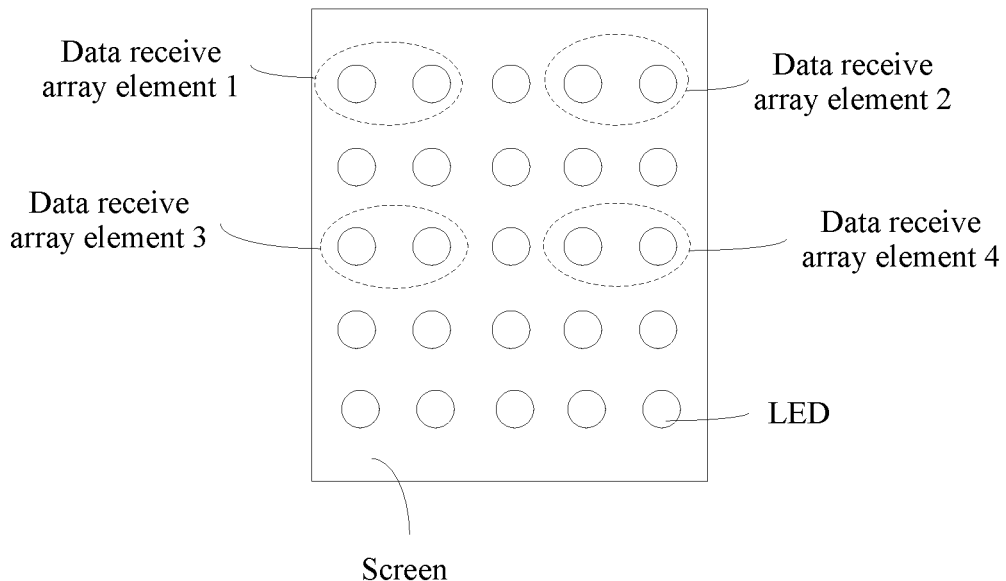
FIG. 7 is a schematic diagram of division of data receive array elements according to an embodiment of this application.

One or more LED units may form one data receive array element. One camera flash or screen may include one or more data receive array elements. For example, a data receive array element of a screen is used as an example. As shown in FIG. 7, a data receive array element 1 includes the first and second LEDs in the first row, a data receive array element 2 includes the fourth and fifth LEDs in the first row, a data receive array element 3 includes the first and second LEDs in the third row, and a data receive array element 4 includes the fourth and fifth LEDs in the third row. LEDs in a same data transmit array element receive same data.

Different data receive array elements may receive same data. For example, the data receive array element 1 and the data receive array element 2 may receive same data. This can increase a data receiving success rate.

Certainly, different data receive array elements may alternatively receive different data. For example, the data receive array element 1 receives a first channel of data, and the data receive array element 2 receives a second channel of data. This can increase a quantity of concurrent channels of data, thereby increasing a data transmission rate.

For a matrix driving screen, LEDs in one row generally belong to only one data receive array element. Alternatively, LEDs in one column belong to only one data receive array element. For example, as shown in FIG. 3, the data receive array element 1 includes LEDs in the first row, the data receive array element 2 includes LEDs in the second row, the data receive array element 3 includes LEDs in the third row, and the data receive array element 4 includes LEDs in the fourth row.

Only some LEDs in one row of the screen may be used to receive data. Alternatively, only some LEDs in one column of the screen may be used to receive data. For example, as shown in FIG. 3, the first, second, and third LEDs in the first row belong to the data receive array element 1. The fourth LED does not belong to the data receive array element 1, and therefore the fourth LED is not used to receive data. A bias voltage of an LED not used to receive data may be set to a forward bias voltage, and this forward bias voltage may be very low, for example, 0.1 V, and allows the LED to emit only very weak light. This can avoid a corresponding LED from generating an interfering current and further avoid impact on display.

The following describes a possible structure of an LED unit.

1. A schematic structural diagram of the LED unit may be shown in FIG. 2 and FIG. 3. In an embodiment, the LED unit is not connected to a capacitor, or the LED unit is not connected to an electronic switch.

For a transmit end, a pin connected to an anode of an LED or a pin connected to a cathode of an LED may be used to transmit data. A corresponding voltage may be applied to the pin used to transmit data, to control the LED to have a forward bias voltage or a reverse bias voltage or a 0 V bias voltage to send corresponding data.

For a receive end, a pin connected to an anode of an LED or a pin connected to a cathode of an LED may be used to detect an induced current, that is used to receive data. A corresponding voltage may be applied to the pin used to receive data, to control the LED to have a reverse bias voltage or a 0 V bias voltage to receive data.

Figure 8:
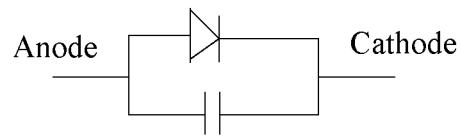
FIG. 8 is a schematic diagram of a circuit diagram related to an LED according to an embodiment of this application.

2. The LED unit is connected to a capacitor. FIG. 8 is a schematic structural diagram of an LED unit. As shown in FIG. 8, the LED unit is connected to a capacitor. The capacitor is charged when the LED is gated. Subsequently, even if a bias voltage is 0 V or is a reverse bias voltage, the capacitor can still maintain a voltage for the LED to emit light. Therefore, the LED may be continually on for a period of time before becoming off. Such driving is referred to as "active driving". The driving manner without a capacitor in FIG. 2 and FIG. 3 is referred to as "passive driving". The active driving manner helps avoid blinking.

Figure 9:
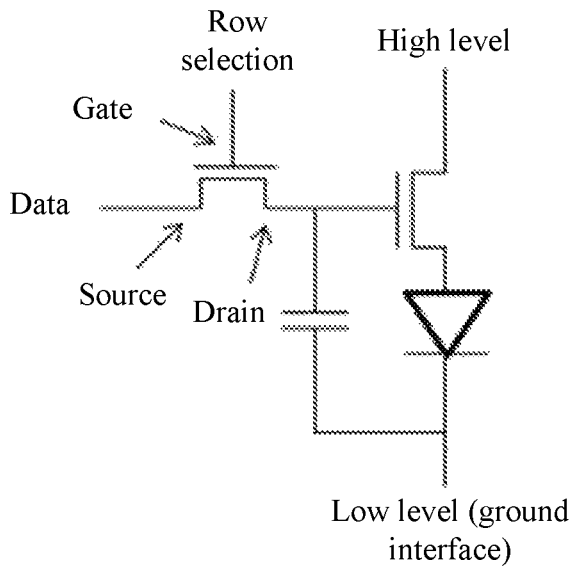
FIG. 9 is a schematic diagram of a circuit diagram related to an LED according to an embodiment of this application.

3. The LED unit is connected to an electronic switch. FIG. 9 is a schematic structural diagram of an LED unit. As shown in FIG. 9, the LED unit is connected to an electronic switch. The electronic switch may be implemented by a field effect transistor. When a gate is set to a high voltage, a source and a drain become connected to each other, otherwise, the source and the drain are disconnected. In this way, a cathode of the LED is connected to a low voltage, an anode is connected to the source or the drain, and the drain or the source is connected to a high voltage. When the LED needs to emit light, if the gate is set to a high voltage, the electronic switch is connected such that the anode of the LED is connected to the high voltage, thereby implementing a light emitting state at a forward bias voltage. When the LED does not need to emit light, the gate is set to a low voltage, the electronic switch is disconnected, and the LED is in a disconnected state and does not emit light. The LED is light-sensitive when the LED does not emit light. FIG. 9 shows a typical structure of the LED unit. Each LED unit uses two electronic switches and one capacitor. When a high voltage is set for row selection, an electronic switch on the left is connected, and voltage magnitude of data can control connection and disconnection of an electronic switch on the right. The row selection is a row pin, as shown in any one of X1 to X4 in FIG. 3. If the data is "1", a high voltage of the data makes the LED connect to the high voltage, and the LED emits light. If the data is "0", a low voltage of the data makes the LED disconnect from the high voltage, and the LED does not emit light. Magnitude of a data voltage also affects a current intensity of the LED, and therefore brightness of the LED can be controlled. A function of the capacitor herein is consistent with that in the foregoing description. In an embodiment, when another row is selected, electricity stored by the capacitor maintains connection of the electronic switch on the right such that the LED continues emitting light.

The following describes in detail a communication method and a related device provided in this application.

Figure 10:
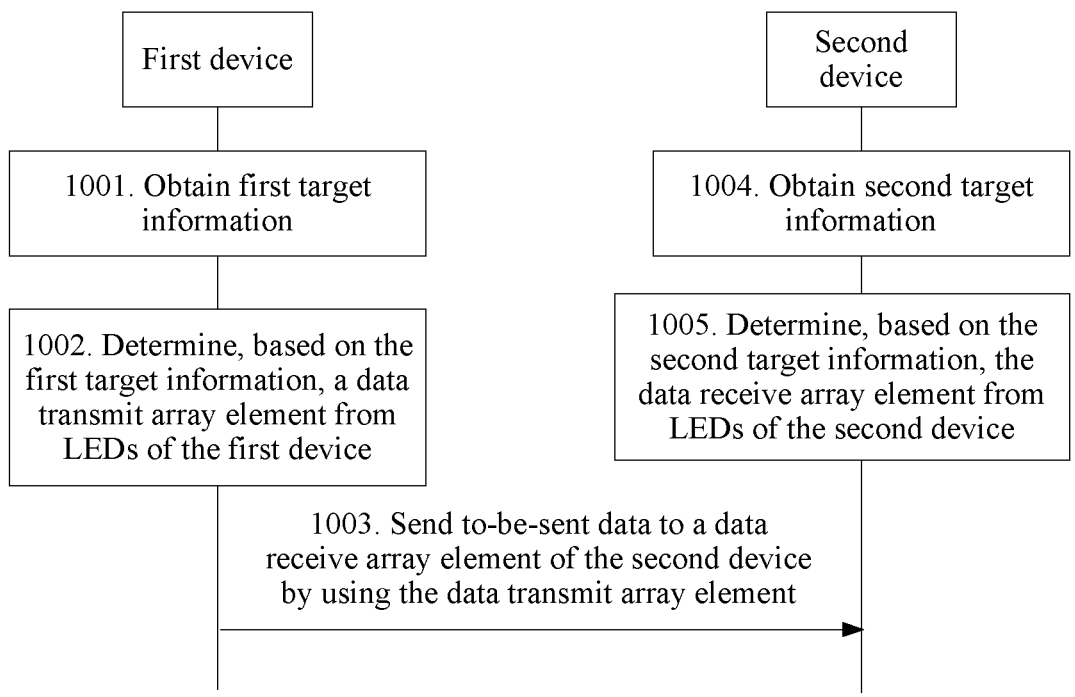
FIG. 10 is a schematic flowchart of a communication method according to an embodiment of this application.

FIG. 10 is a schematic flowchart of a communication method according to an embodiment of this application. As shown in FIG. 10, the communication method includes the following parts 1001-1004.

1001. A first device obtains first target information.

1002. The first device determines, based on the first target information, a data transmit array element from LEDs of the first device.

Each data transmit array element of the first device includes at least one LED. There may be one or more determined data transmit array elements.

Specifically, the data transmit array element may be determined from LEDs included in a camera flash of the first device. Alternatively, the data transmit array element is determined from LEDs included in a screen of the first device. Alternatively, the data transmit array element is determined from other LEDs of the first device.

1003. The first device sends to-be-sent data to a data receive array element of a second device using the data transmit array element.

1004. The second device obtains second target information.

1005. The second device determines, based on the second target information, a data receive array element from LEDs of the second device.

Each data receive array element of the second device includes at least one LED. There may be one or more determined data receive array elements.

Specifically, the data receive array element may be determined from LEDs included in a camera flash of the second device. Alternatively, the data receive array element is determined from LEDs included in a screen of the second device. Alternatively, the data receive array element is determined from other LEDs of the second device.

In this embodiment of this application, after the second device determines the data receive array element from the LEDs, the second device may receive data from the data transmit array element of the first device using the data receive array element.

Figure 11:
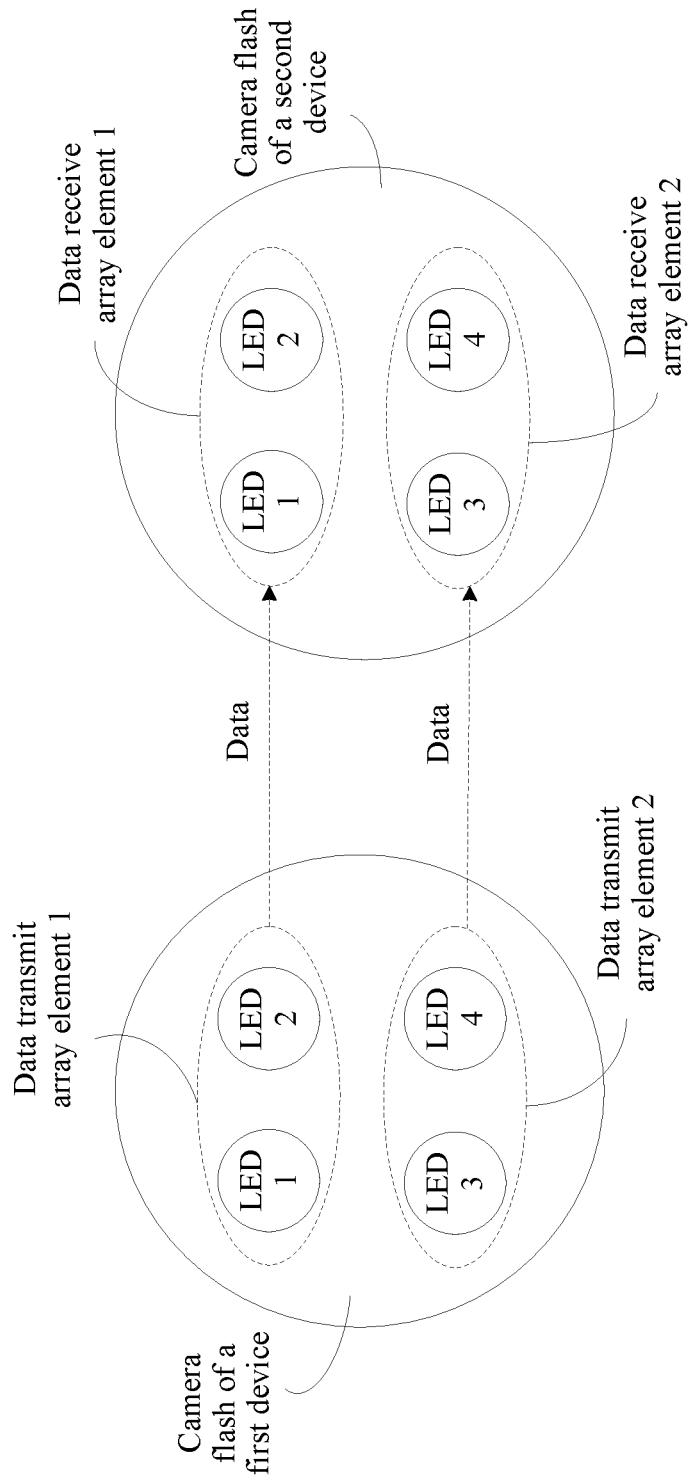
FIG. 11 is a schematic diagram of data transmit array elements and data receive array elements of a camera flash according to an embodiment of this application.

For example, as shown in FIG. 11, the data transmit array element and the data receive array element are determined from the LEDs of the camera flash. The camera flash of the first device includes an LED 1 to an LED 4, and the first device determines a data transmit array element 1 and a data transmit array element 2 from the LED 1 to the LED 4. The data transmit array element 1 includes the LED 1 and the LED 2. The data transmit array element 2 includes the LED 3 and the LED 4. The camera flash of the second device includes an LED 1 to an LED 4, and the second device determines a data receive array element 1 and a data receive array element 2 from the LED 1 to the LED 4. The data receive array element 1 includes the LED 1 and the LED 2. The data receive array element 2 includes the LED 3 and the LED 4. The data receive array element 1 may receive data transmitted by the data transmit array element 1. The data receive array element 2 may receive data transmitted by the data transmit array element 2.

Figure 12:
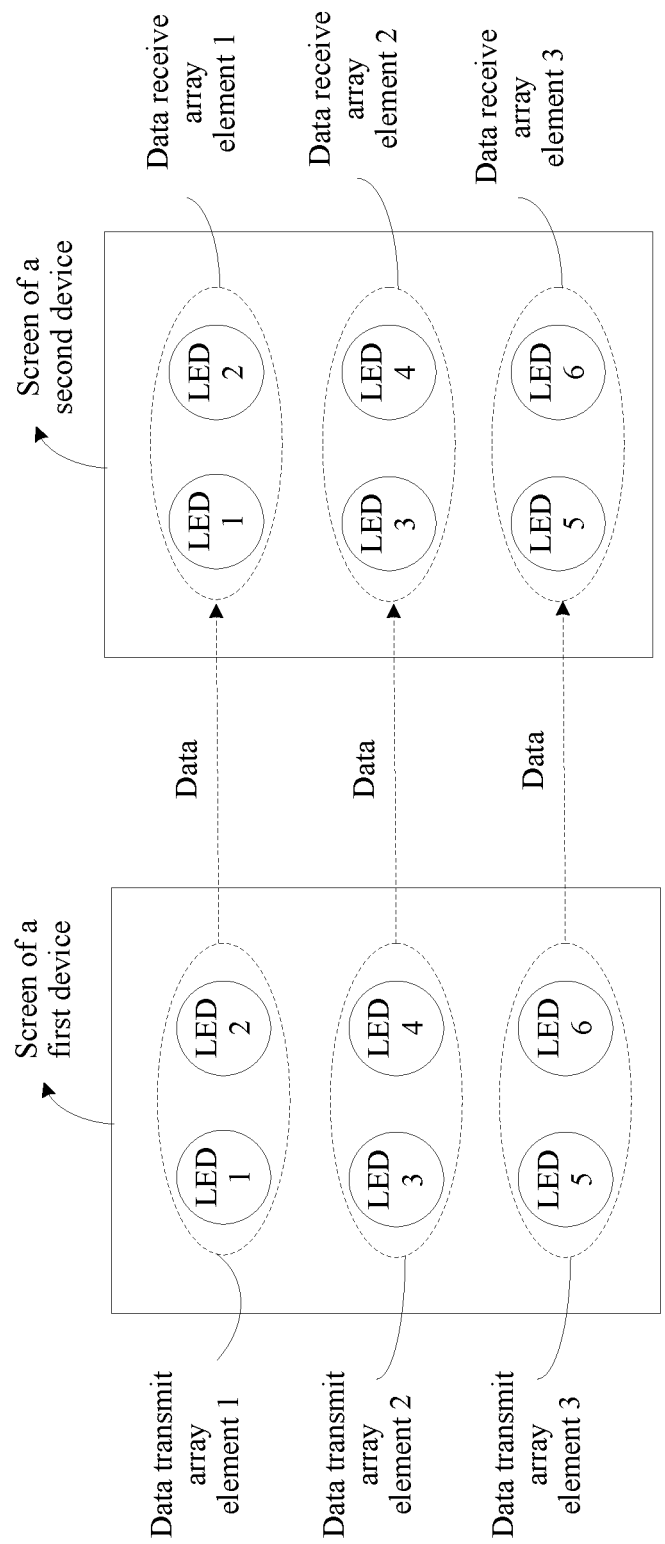
FIG. 12 is a schematic diagram of data transmit array elements and data receive array elements of a screen according to an embodiment of this application.

For another example, as shown in FIG. 12, the data transmit array element and the data receive array element are determined from the LEDs of the screen. The screen of the first device includes an LED 1 to an LED 6, and the first device determines a data transmit array element 1, a data transmit array element 2, and a data transmit array element 3 from the LED 1 to the LED 6. The data transmit array element 1 includes the LED 1 and the LED 2. The data transmit array element 2 includes the LED 3 and the LED 4. The data transmit array element 3 includes the LED 5 and the LED 6. The screen of the second device includes an LED 1 to an LED 6, and the second device determines a data receive array element 1, a data receive array element 2, and a data receive array element 3 from the LED 1 to the LED 6. The data receive array element 1 includes the LED 1 and the LED 2. The data receive array element 2 includes the LED 3 and the LED 4. The data receive array element 3 includes the LED 5 and the LED 6. The data receive array element 1 may receive data transmitted by the data transmit array element 1. The data receive array element 2 may receive data transmitted by the data transmit array element 2. The data receive array element 3 may receive data transmitted by the data transmit array element 3.

It is found from practice that a communication rate between a single data transmit array element and a single data receive array element is 10 Mb/s, and in other approaches, a communication rate between a screen and a camera is less than 1 Mb/s. Therefore, implementation of the method described in FIG. 6 helps increase a VLC transmission rate.

Optionally, the data transmit array element of the first device includes a first data transmit array element and a second data transmit array element, the data receive array element of the second device includes a first data receive array element and a second data receive array element, the to-be-sent data includes first data and second data, and a specific implementation of sending, by the first device, the to-be-sent data to the data receive array element of the second device using the data transmit array element is as follows sending, by the first device, the first data to the first data receive array element of the second device using the first data transmit array element, and sending, by the first device, the second data to the second data receive array element of the second device using the second data transmit array element.

Correspondingly, a specific implementation of receiving, by the second device, the data from the data transmit array element of the first device using the data receive array element is as follows receiving, by the second device, the first data from the first data transmit array element of the first device using the first data receive array element, and receiving, by the second device, the second data from the second data transmit array element of the first device using the second data receive array element.

In other words, the first device may include at least two data transmit array elements, and the second device may include at least two data receive array elements. The first device may send different data to different data receive array elements of the second device using different data transmit array elements. For example, as shown in FIG. 11 and FIG. 12, the data transmit array element 1 may send the first data to the data receive array element 1, and the data transmit array element 2 may send the second data to the data receive array element 2. As shown in FIG. 12, the data transmit array element 3 may further send third data to the data receive array element 3.

It can be learned that, with this implementation implemented, MIMO communication can be formed, that is, a plurality of channels of data can be sent in parallel, thereby greatly increasing a communication rate.

Optionally, the screen of the first device is a flat screen, a screen of the second device is a flat screen or a curved surface screen, the first target information includes a screen distance between the first device and the second device, the screen distance is a shortest distance between a first screen and a second screen, the first screen is the flat screen of the first device, the second screen is the flat screen of the second device or the second screen is a virtual flat screen constituted by all projection points of a vertical projection of the curved surface screen of the second device on an intersecting second target plane, and the curved surface screen of the second device has a largest projection area on the second target plane, and a specific implementation of determining, by the first device based on the first target information, the data transmit array element from the LEDs included in the screen of the first device may be as follows determining, by the first device, a first array element spacing based on the screen distance and a first power angle of the LEDs of the first screen on a first plane, where the first array element spacing is a minimum spacing between two adjacent data transmit array elements in the first screen along a first direction of LED arrangement, determining, by the first device, a second array element spacing based on the screen distance and a second power angle of the LEDs of the first screen on a second plane, where the second array element spacing is a minimum spacing between two adjacent data transmit array elements in the first screen along a second direction of LED arrangement, the first plane is perpendicular to the second plane, the first plane and the second plane each are perpendicular to the first screen, and the first direction is perpendicular to the second direction, and determining, by the first device along the first direction based on a data transmit array element size and the first array element spacing, the data transmit array element from the LEDs included in the first screen, and determining, along the second direction based on the data transmit array element size and the second array element spacing, the data transmit array element from the LEDs included in the first screen.

Optionally, the screen of the second device is a flat screen, a screen of the first device is a flat screen or a curved surface screen, the second target information includes a screen distance between the first device and the second device, the screen distance is a shortest distance between a first screen and a second screen, the second screen is the flat screen of the second device, the first screen is the flat screen of the first device or the first screen is a virtual flat screen constituted by all projection points of a vertical projection of the curved surface screen of the first device on an intersecting first target plane, and the curved surface screen of the first device has a largest projection area on the first target plane, and a specific implementation of determining, by the second device based on the second target information, the data receive array element from the LEDs included in the screen of the second device may be as follows determining, by the second device, a third array element spacing based on the screen distance, a first power angle of LEDs of the first screen on a first plane, a data receive array element size, and a first included angle between the first screen and the second screen on the first plane, where the third array element spacing is a minimum spacing between two adjacent data receive array elements in the second screen along a first direction of LED arrangement, determining, by the second device, a fourth array element spacing based on the screen distance, a second power angle of the LEDs of the first screen on a second plane, the data receive array element size, and a second included angle between the first screen and the second screen on the second plane, where the fourth array element spacing is a minimum spacing between two adjacent data receive array elements in the second screen along a second direction of LED arrangement, the first plane is perpendicular to the second plane, the first plane and the second plane each are perpendicular to the first screen, and the first direction is perpendicular to the second direction, and determining, by the second device along the first direction based on the data receive array element size and the third array element spacing, the data receive array element from the LEDs in the second screen, and determining, along the second direction based on the data receive array element size and the fourth array element spacing, the data receive array element from the LEDs in the second screen.

The first power angle is a light emitting power angle of the LEDs in the first screen on the first plane, and the second power angle is a light emitting power angle of the LEDs in the first screen on the second plane. The light emitting power angle is generally used to describe directivity of LED light emission. The first power angle and the second power angle may be half-power angles or other light emitting power angles.

Figure 13:
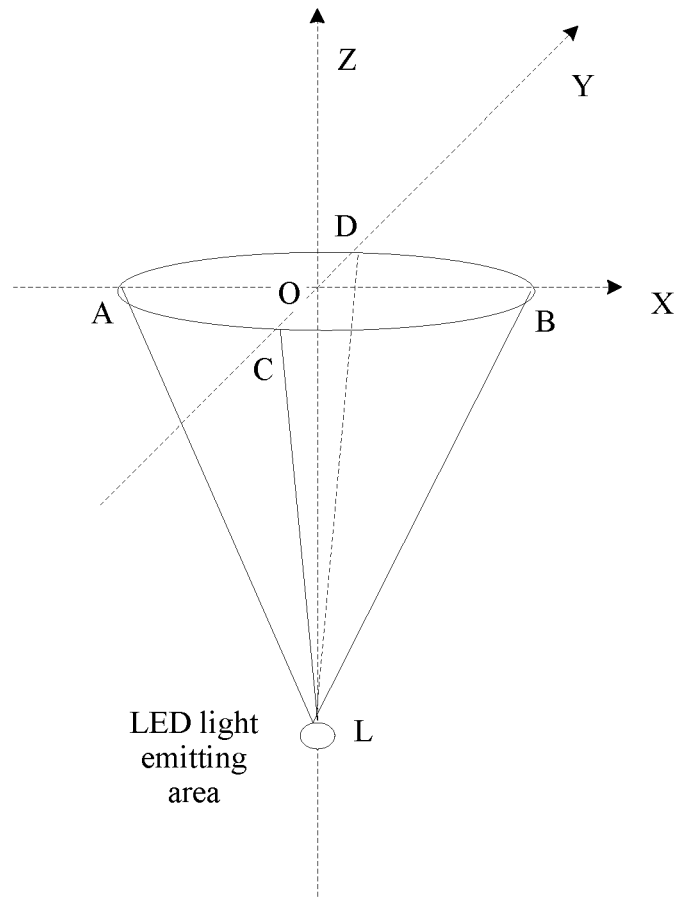
FIG. 13 is a schematic diagram of a power angle according to an embodiment of this application.

The first plane may be an X plane, and the second plane may be a Y plane. As shown in FIG. 13, that a plane on which the LED screen is located is a Z plane is used as an example. The X plane and the Y plane are perpendicular to each other, and each are perpendicular to the Z plane. Light emitting power angles of the LEDs on the X plane and the Y plane are respectively ∠OLA and ∠OLC. The first device may read attribute information of the LEDs, and obtain the first power angle of the LEDs on the X plane and the second power angle of the LEDs on the Y plane from the attribute information of the LEDs.

Figure 14:
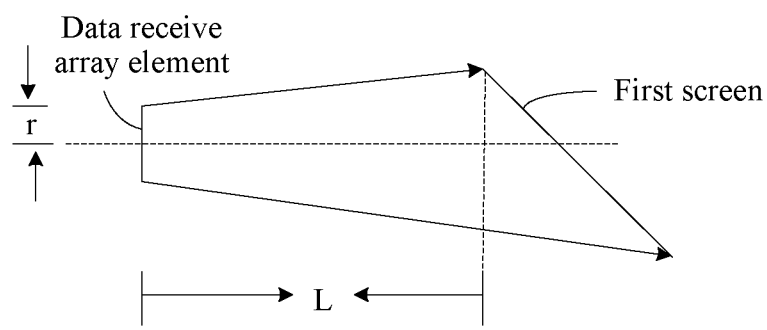
FIG. 14 is a schematic diagram of a shortest distance between a first screen and a second screen according to an embodiment of this application.
Figure 15:
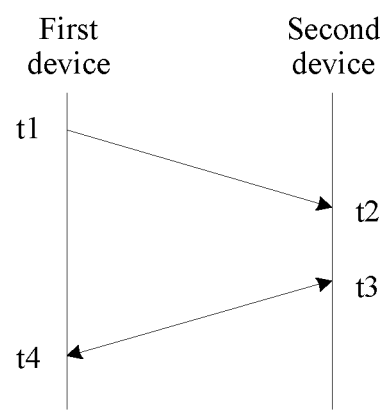
FIG. 15 is a schematic diagram of calculating a shortest distance between screens according to an embodiment of this application.

As shown in FIG. 14, the shortest distance between the first screen and the second screen is L. As shown in FIG. 15, the first device may transmit a probe signal 1 to the second device, and record a local transmit time t1. After receiving the probe signal 1, the second device records a local receive time t2, transmits a probe signal 2, and records a local transmit time t3. After receiving the probe signal 2, the first device records a local receive time t4. In this way, the distance between the first screen and the second screen may be calculated as follows [(t4−t1)−(t3−t2)]/2*c, where c indicates velocity speed of light. Alternatively, another approach may be used to estimate L, for example, measuring a distance with help of a camera.

Figure 16:
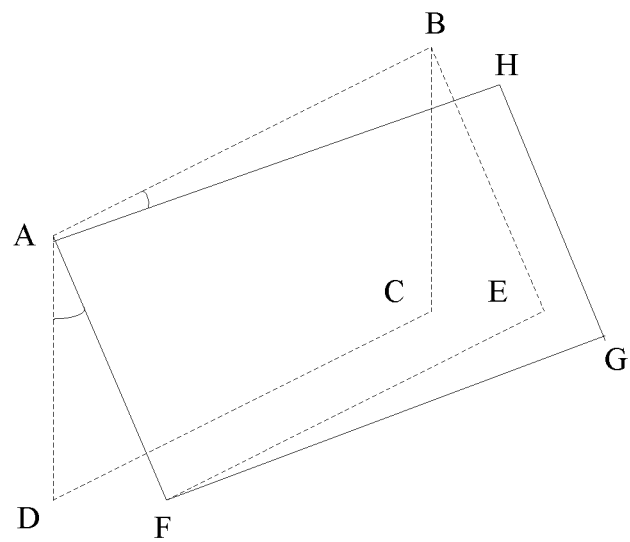
FIG. 16 is a schematic diagram of a screen included angle between a first screen and a second screen according to an embodiment of this application.

In space, an included angle between two LED screens also needs to be described using two angles, that is, there are the first included angle and the second included angle between the first screen and the second screen on the first plane and the second plane, respectively. FIG. 16 is used as an example. It is assumed that there is a reference location plane ABCD, an angle of the screen on the X plane is ∠DAF, and an angle of the screen on the Y plane is ∠BAH. The former angle is an angle obtained by rotating the screen around an upper edge (AB herein) of the plane ABCD, that is, the former angle is an angle obtained by rotating the screen around a Y axis. The latter angle is an angle obtained by rotating the screen around another vertical edge (AF herein) of the plane ABCD, that is, the latter angle is an angle obtained by rotating the screen around an X axis. Both the angles may be measured by a gravity sensor, an acceleration sensor, a rotational acceleration sensor, a gyroscope, or the like. After measuring the two angles using an apparatus such as the gravity sensor, the acceleration sensor, the rotational acceleration sensor, or the gyroscope, the first device may send the two angles to the second device. The included angle between the first screen and the second screen on the X plane may be described as an angle difference obtained by rotating the first screen and the second screen on the plane ABCD around the X axis $\Delta\alpha=\alpha_1-\alpha_2$, where $\alpha_1$ and $\alpha_2$ are angles obtained by rotating the first screen and the second screen around the X axis respectively. The included angle between the first screen and the second screen on the Y plane may be described as an angle difference obtained by rotating the first screen and the second screen on the plane ABCD around the Y axis $\Delta\beta=\beta_1-\beta_2$, where $\beta_1$ and $\beta_2$ are angles obtained by rotating the first screen and the second screen around the Y axis respectively.

Optionally, the first array element spacing determined by the first device based on the first power angle and the shortest distance may be $D1=2L*tg\theta 1$, where D1 is the first array element spacing, L is the shortest distance between the first screen and the second screen, and $\theta 1$ is the first power angle.

Optionally, the second array element spacing determined by the first device based on the second power angle and the shortest distance may be $D2=2L*tg\theta 2$, where D2 is the second array element spacing, L is the shortest distance between the first screen and the second screen, and $\theta 2$ is the second power angle.

Optionally, the third array element spacing determined by the second device based on the first power angle, the shortest distance, the data receive array element size, and the first included angle may be $D3=2(L*tg\theta 1+r)*\cos\theta 1/\cos(\alpha 1+\theta 1)$, where D3 is the third array element spacing, $\theta 1$ is the first power angle, $\alpha 1$ is the first included angle, L is the shortest distance, and r is a data receive array element radius obtained based on the data receive array element size. The description of the radius herein does not limit an array element shape to a circle or an oval. If the array element has another shape, r is a radius of a minimum circle or a minimum oval that can cover the data receive array element.

Optionally, the fourth array element spacing determined by the second device based on the second power angle, the shortest distance, the data receive array element size, and the second included angle may be $D4=2(L*tg\theta 2+r)*\cos\theta 2/\cos(\alpha 2+\theta 2)$, where D4 is the fourth array element spacing, $\theta 2$ is the second power angle, $\alpha 2$ is the second included angle, L is the shortest distance, and r is a data receive array element radius obtained based on the data receive array element size. The description of the radius herein does not limit an array element shape to a circle or an oval. If the array element has another shape, r is a radius of a minimum circle or a minimum oval that can cover the data receive array element.

After the first device calculates the first array element spacing and the second array element spacing, the first device determines the data transmit array element from the LEDs along the first direction of LED arrangement of the first screen based on the data transmit array element size and the first array element spacing, and determines the data transmit array element from the LEDs along the second direction of LED arrangement of the first screen based on the data transmit array element size and the second array element spacing. After the second device calculates the third array element spacing and the fourth array element spacing, the second device determines the data receive array element from the LEDs along the first direction of LED arrangement of the second screen based on the data receive array element size and the third array element spacing, and determines the data receive array element from the LEDs along the second direction of LED arrangement of the second screen based on the data receive array element size and the fourth array element spacing. The first direction may be an X-axis direction of the screen, and the second direction may be a Y-axis direction of the screen.

For example, it is assumed that the first array element spacing is Cx, and the second array element spacing is Cy. Dx is a diameter, along the X-axis direction, of a minimum circle or a minimum oval that can cover the data receive array element. Dy is a diameter, along the Y-axis direction, of a minimum circle or a minimum oval that can cover the data receive array element. The first direction of LED arrangement of the first screen is the X-axis direction, and the second direction of LED arrangement of the first screen is the Y-axis direction.

Figure 17:
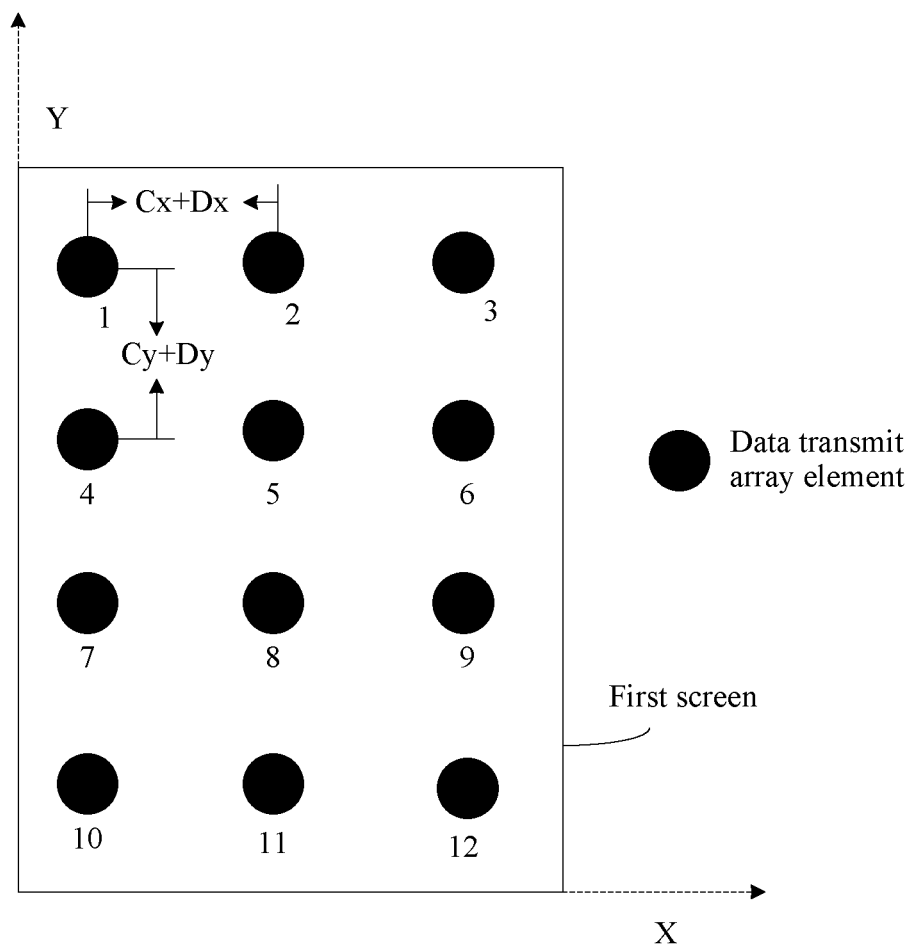
FIG. 17 is a schematic diagram of determining a data transmit array element according to an embodiment of this application.

As shown in FIG. 17, a data transmit array element 1 may be determined first based on the data transmit array element size. If a spacing of the data transmit array element 1 along a positive X-axis direction reaches (Cx+Dx), there is no data transmit array element, and a screen edge is not exceeded, a data transmit array element 2 may be disposed at a (Cx+Dx) place based on the data transmit array element size. If a spacing of the data transmit array element 1 along a negative Y-axis direction reaches (Cy+Dy), there is no data transmit array element, and a screen edge is not exceeded, a data transmit array element 4 may be disposed at a (Cy+Dy) place based on the data transmit array element size. If a spacing of the data transmit array element 2 along the positive X-axis direction reaches (Cx+Dx), there is no data transmit array element, and the screen edge is not exceeded, a data transmit array element 3 may be disposed at a (Cx+Dx) place based on the data transmit array element size. If a spacing of the data transmit array element 2 along the negative Y-axis direction reaches (Cy+Dy), there is no data transmit array element, and the screen edge is not exceeded, a data transmit array element 5 may be disposed at a (Cy+Dy) place based on the data transmit array element size. The rest may be deduced by analogy, until all data transmit array elements are arranged. A manner of determining a data receive array element is similar. Details are not described herein.

In actual application, different screens have different sizes and are not necessarily parallel to each other, a center line of a screen is unnecessarily perpendicular to a screen plane, there may be an obstacle between screens, a new type of screen may be a curved surface screen, or the like. Therefore, a light signal sent by a transmit array element of one screen is not necessarily received by a receive array element of another screen. More seriously, light signals sent by different LED array elements of one screen are received by one LED array element of another screen, causing signal aliasing and greatly deteriorating a MIMO effect. With this implementation implemented, a data transmit array element spacing and a data receive array element spacing for avoiding signal aliasing can be calculated such that the data transmit array element and the data receive array element are determined based on the spacings, to avoid signal aliasing.

Optionally, the screen of the first device is a curved surface screen, a screen of the second device is a flat screen or a curved surface screen, the first target information includes a screen distance between the first device and the second device, the screen distance is a shortest distance between a first screen and a second screen, the first screen is a virtual flat screen constituted by all projection points of a vertical projection of the curved surface screen of the first device on an intersecting first target plane, the curved surface screen of the first device has a largest projection area on the first target plane, the second screen is the flat screen of the second device or the second screen is a virtual flat screen constituted by all projection points of a vertical projection of the curved surface screen of the second device on an intersecting second target plane, and the curved surface screen of the second device has a largest projection area on the second target plane, and a specific implementation of determining, by the first device based on the first target information, the data transmit array element from the LEDs included in the screen of the first device is as follows determining, by the first device, a first array element spacing based on the screen distance and a first power angle of the LEDs of the first screen on a first plane, where the first array element spacing is a minimum spacing between two adjacent data transmit array elements in the first screen along a first direction of LED arrangement, determining, by the first device, a second array element spacing based on the screen distance and a second power angle of the LEDs of the first screen on a second plane, where the second array element spacing is a minimum spacing between two adjacent data transmit array elements in the first screen along a second direction of LED arrangement, the first plane is perpendicular to the second plane, the first plane and the second plane each are perpendicular to the first screen, and the first direction is perpendicular to the second direction, determining, by the first device along the first direction based on a data transmit array element size and the first array element spacing, the data transmit array element from the LEDs included in the first screen, and determining, along the second direction based on the data transmit array element size and the second array element spacing, the data transmit array element from the LEDs included in the first screen, and projecting, by the first device, the determined data transmit array element onto the curved surface screen of the first device, to obtain a data transmit array element included in the curved surface screen of the first device.

Figure 18:
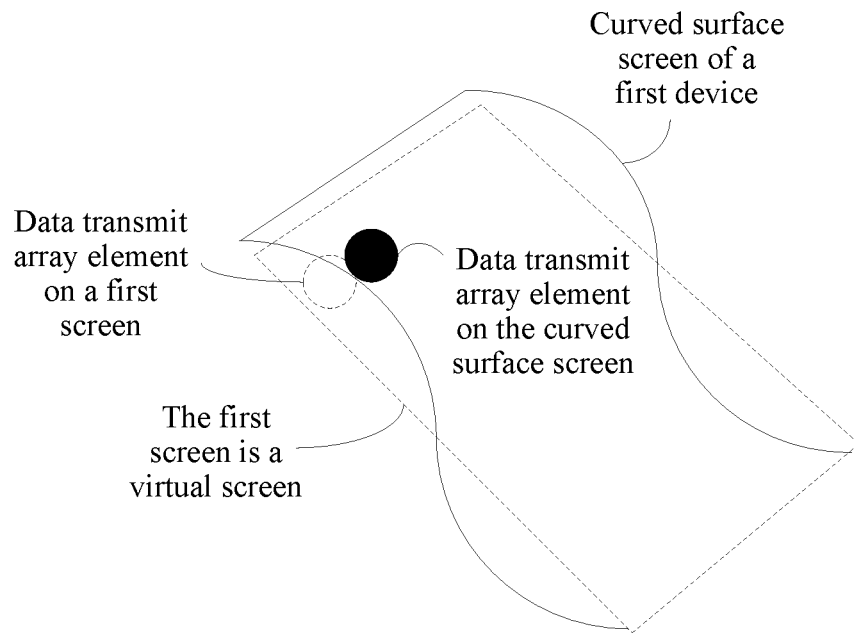
FIG. 18 is a schematic diagram of a virtual screen according to an embodiment of this application.

For example, as shown in FIG. 18, when the first device determines the data transmit array element, the first device first projects the curved surface screen of the first device onto an intersecting virtual plane, that is, the first screen. The first screen is a virtual flat screen. A principle of determining the data transmit array element on the first screen by the first device is the same as the principle applied when the screen of the first device is a flat screen. Details are not described herein. After determining the data transmit array element on the virtual first screen, the first device projects the data transmit array element back to the curved surface screen of the first device.

With this implementation implemented, a data transmit array element can be accurately determined on a curved surface screen, and this helps avoid signal aliasing.

Optionally, the screen of the second device is a curved surface screen, a screen of the first device is a flat screen or a curved surface screen, the second target information includes a screen distance between the first device and the second device, the screen distance is a shortest distance between a first screen and a second screen, the second screen is a virtual flat screen constituted by all projection points of a vertical projection of the curved surface screen of the second device on an intersecting second target plane, the curved surface screen of the second device has a largest projection area on the second target plane, the first screen is the flat screen of the first device or the first screen is a virtual flat screen constituted by all projection points of a vertical projection of the curved surface screen of the first device on an intersecting first target plane, and the curved surface screen of the first device has a largest projection area on the first target plane, and a specific manner of determining, by the second device based on the second target information, the data receive array element from the LEDs included in the screen of the second device is as follows determining, by the second device, a third array element spacing based on the screen distance, a first power angle of LEDs of the first screen on a first plane, a data receive array element size, and a first included angle between the first screen and the second screen on the first plane, where the third array element spacing is a minimum spacing between two adjacent data receive array elements in the second screen along a first direction of LED arrangement, determining, by the second device, a fourth array element spacing based on the screen distance, a second power angle of the LEDs of the first screen on a second plane, the data receive array element size, and a second included angle between the first screen and the second screen on the second plane, where the fourth array element spacing is a minimum spacing between two adjacent data receive array elements in the second screen along a second direction of LED arrangement, the first plane is perpendicular to the second plane, the first plane and the second plane each are perpendicular to the first screen, and the first direction is perpendicular to the second direction, determining, by the second device along the first direction based on the data receive array element size and the third array element spacing, the data receive array element from the LEDs included in the second screen, and determining, along the second direction based on the data receive array element size and the fourth array element spacing, the data receive array element from the LEDs included in the second screen, and projecting, by the second device, the determined data receive array element onto the curved surface screen of the second device, to obtain a data receive array element included in the curved surface screen of the second device.

Figure 19:
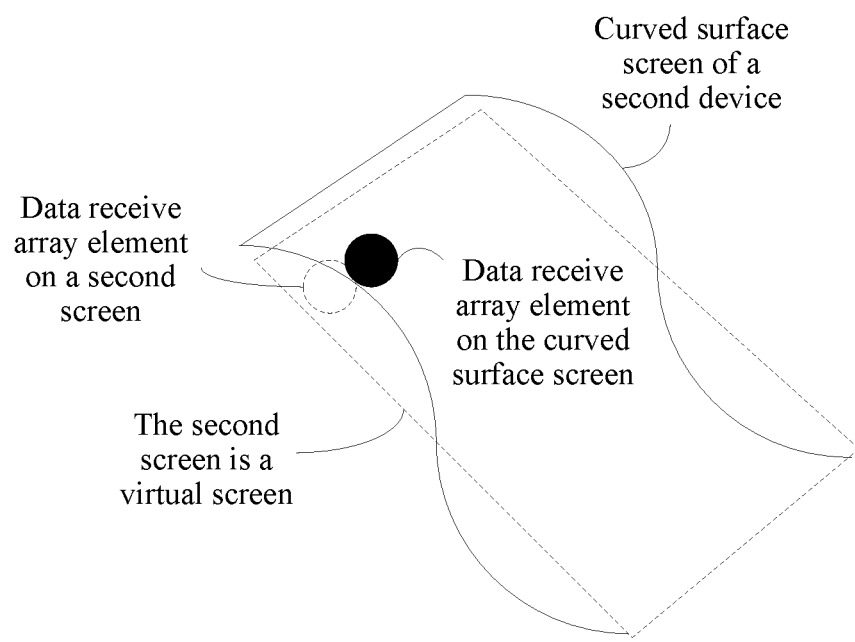
FIG. 19 is a schematic diagram of a virtual screen according to an embodiment of this application.

For example, as shown in FIG. 19, when the second device determines the data receive array element, the second device first projects the curved surface screen of the second device onto an intersecting virtual plane, that is, the second screen. The second screen is a virtual flat screen. A principle of determining the data transmit array element on the second screen by the second device is the same as the principle applied when the screen of the second device is a flat screen. Details are not described herein. After determining the data transmit array element on the virtual second screen, the second device projects the data transmit array element back to the curved surface screen of the second device.

With this implementation implemented, a data receive array element can be accurately determined on a curved surface screen, and the data receive array element can be prevented from receiving aliased signals.

Optionally, the first device may further obtain the data transmit array element size.

Optionally, before the first device determines, based on the first target information, the data transmit array element from the LEDs included in the screen, the first device may further establish a screen communication connection to the second device, and correspondingly, a specific implementation of obtaining, by the first device, the data transmit array element size is as follows determining, by the first device, first optical transmit power, where the first optical transmit power is minimum optical transmit power required by the first screen to correctly send data in a first modulation and coding scheme, and the first modulation and coding scheme is a modulation and coding scheme used to send data after the screen communication connection is established, determining, by the first device, second transmit power, where the second optical transmit power is optical transmit power of the LEDs of the first screen, determining, by the first device based on the first optical transmit power and the second optical transmit power, a quantity of LEDs included in the data transmit array element, where $$M \geq \frac{Pt}{Ps}, M$$

is the quantity of LEDs included in the data transmit array element, Pt is the first optical transmit power, and Ps is the second optical transmit power, and determining, by the first device, the data transmit array element size based on M and an LED size.

A manner of calculating the first optical transmit power (Pt) may be illustrated as follows In a process of the screen communication connection, the first device and the second device transmit signals to each other, for example, a connection request and a connection response. In the communication process, a modulation and coding scheme used by the first device is a modulation and coding scheme 2. The first device may learn through calculation that an actual signal-to-noise ratio for signal receiving of the first screen in the process of the screen communication connection is a signal-to-noise ratio 1. The following is preset, a minimum signal-to-noise ratio required by the first screen to correctly receive data in a modulation and coding scheme 2 is a signal-to-noise ratio 2, where the actual signal-to-noise ratio 1 is higher than the signal-to-noise ratio 2 by S (dB). A preset minimum signal-to-noise ratio required by the first screen to correctly receive data in the first modulation and coding scheme (the modulation and coding scheme used to send data after the screen communication connection is established) is a signal-to-noise ratio 3, where the signal-to-noise ratio 3 is higher than the signal-to-noise ratio 2 by Q (dB). Therefore, Pt=(P−S+Q) (dBm), where P is the actual optical transmit power of the first screen in the process of the screen communication connection.

The first device may directly read attribute information of the LEDs, and obtain optical transmit power from the attribute information of the LEDs, that is, obtain the second optical transmit power (Ps) from the attribute information of the LEDs.

The first device may select any integer value that is greater than or equal to $$\frac{Pt}{Ps}$$

and less than or equal to a total quantity of LEDs in the screen as a quantity of LEDs included in the data transmit array element. For example, if $$\frac{Pt}{Ps}$$

is equal to 3 and the total quantity of LEDs included in the screen is 5, the quantity of LEDs included in the data transmit array element may be 3, 4, or 5.

With this implementation implemented, the data transmit array element size can be determined, and the data transmit array element determined by the first device based on the data transmit array element size can successfully transmit data to a data receive array element.

Optionally, before the first device determines the data transmit array element from the LEDs included in the screen, the first device establishes a screen communication connection to the second device, and correspondingly, a specific implementation of obtaining, by the first device, the data transmit array element size may be as follows determining, by the first device, a first signal-to-noise ratio, where the first signal-to-noise ratio is a signal-to-noise ratio for actual signal receiving of the second screen in a process of performing the screen communication connection, determining, by the first device, a second signal-to-noise ratio, where the second signal-to-noise ratio is a minimum signal-to-noise ratio required by the second screen to correctly receive data in a first modulation and coding scheme, and the first modulation and coding scheme is a modulation and coding scheme used by the first screen to send data after the communication connection is established, determining, by the first device, a transmit power difference, where the transmit power difference is a difference between optical transmit power of the first screen when the screen communication connection is being performed and optical transmit power for data sending of the first screen after the screen communication connection is established, determining, by the first device, a first area, where the first area is an area of the transmit array element during the screen communication connection, and determining, by the first device, a data transmit array element area based on the first signal-to-noise ratio, the second signal-to-noise ratio, the transmit power difference, and the first area.

Optionally, at a communication connection stage, the first device may receive the first signal-to-noise ratio sent by the second device. The first signal-to-noise ratio may be attached to a connection request or a connection response, or may be sent using a separate command.

For example, it is assumed that in the process of the communication connection, the signal-to-noise ratio for actual signal receiving of the second screen is Q (dB), that is, the first signal-to-noise ratio is Q (dB), the modulation and coding scheme used by the first screen to send data after the communication connection is established is the first modulation and coding scheme, the minimum signal-to-noise ratio required by the second screen to correctly receive data in the first modulation and coding scheme is Q1 (dB), that is, the second signal-to-noise ratio is Q1 (dB), and the transmit power difference is ΔQ (dB). The data transmit array element size S1 meets the following relationship 10*lg(S0/S1)<Q−Q1−ΔQ, where S0 is an area of the transmit array element during the screen communication connection. For example, if the entire screen is used for single-channel sending and receiving during the screen communication connection, S0 is an area of the screen. For example, if Q=60 dB, Q1=24 dB, and ΔQ=3 dB, the following is obtained $$\frac{S0}{S1} \leq 1995,$$

that is, $$\frac{S0}{1995} \leq S1.$$

In other words, the first device may select any area that is greater than or equal to $$\frac{S0}{1995}$$

as the data transmit array element area.

With this implementation implemented, the data transmit array element size can be determined, and the data transmit array element determined by the first device based on the data transmit array element size can successfully transmit data to a data receive array element.

Optionally, the second device may further obtain the data receive array element size.

Optionally, before the second device determines the data receive array element from the LEDs included in the screen, the second device performs a screen communication connection to the first device, and correspondingly, a specific implementation of obtaining, by the second device, the data receive array element size may be as follows determining, by the second device, first signal receive power, where the first signal receive power is actual signal receive power of the second screen during the screen communication connection, determining, by the second device, a first quantity, where the first quantity is a quantity of LEDs for receiving a signal during the screen communication connection, determining, by the second device, second signal receive power, where the second signal receive power is minimum signal receive power required by the second screen to correctly receive data in a first modulation and coding scheme, and the first modulation and coding scheme is a modulation and coding scheme used by the first device to send data after the screen communication connection is complete, and determining, by the second device, the data receive array element size based on the first signal receive power, the first quantity, and first signal receive sensitivity.

The second device presets a correspondence between the first modulation and coding scheme and the minimum signal receive power required by the second screen to correctly receive data in the first modulation and coding scheme. Therefore, the second device may obtain the second signal receive power corresponding to the first modulation and coding scheme from the correspondence.

Optionally, if the first modulation and coding scheme is a modulation and coding scheme with a highest rate, and receive power corresponding to the first modulation and coding scheme in the correspondence is Y dBm, the second signal receive power is (Y+X) dBm, that is, the receive power corresponding to the first modulation and coding scheme in the correspondence is added to a headroom (X), and a sum is equal to the second signal receive power. The headroom may be an empirical value, for example, 6 dBm.

Optionally, if $$10^{-\frac{(Pr-Sr)}{10}} < 2,$$

the second device determines that there is only one data receive array element, and the data receive array element includes all LEDs of the screen. Otherwise, $$M2 = M1 * 10^{\frac{-(Pr-Sr)}{10}},$$

where M2 is a quantity of LED units included in each data receive array element, M1 is the first quantity, Pr is the first signal receive power, and Sr is the second signal receive power.

With this implementation implemented, the data receive array element size can be determined, and the data receive array element determined by the first device based on the data receive array element size can successfully receive data sent by a data transmit array element.

Optionally, before the second device determines the data receive array element from the LEDs included in the screen, the second device performs a screen communication connection to the first device, and correspondingly, a specific implementation of obtaining, by the second device, the data receive array element size may be as follows determining, by the second device, first signal receive power, where the first signal receive power is actual signal receive power of the second screen during the screen communication connection, determining, by the second device, second signal receive power, where the second signal receive power is minimum signal receive power required by the second screen to correctly receive data in a first modulation and coding scheme, and the first modulation and coding scheme is a modulation and coding scheme used by the first screen of the first device to send data after the screen communication connection is complete, determining, by the second device, a transmit power difference, where the transmit power difference is a difference between transmit power of the first screen when the screen communication connection is being performed and transmit power for data sending of the first screen after the screen communication connection is established, determining, by the second device, a third area, where the third area is an area of the receive array element during the screen communication connection, and determining, by the second device, a data receive array element area based on the first signal receive power, first signal receive sensitivity, the transmit power difference, and the third area.

Optionally, it is assumed that the first signal receive power is P (dBm), the second signal receive power is P1 (dB), and the transmit power difference is ΔQ (dB). The data receive array element size S2 meets the following relationship 10*lg(S0/S2)<P−P1−ΔQ, where S0 is an area of the transmit array element during the communication connection. For example, if the entire screen is used for single-channel sending and receiving during the communication connection, S0 is an area of the screen. For example, if P=0 dBm, P1=−15 dBm, and ΔQ=3 dB, the following is obtained $$\frac{S0}{S2} \le 15,$$

that is, S2 is greater than $$\frac{S0}{15}.$$

In other words, the second device may select any area that is greater than $$\frac{S0}{15}$$

as the data receive array element area.

With this implementation implemented, the data receive array element size can be determined, and the data receive array element determined by the first device based on the data receive array element size can successfully receive data sent by a data transmit array element.

Figure 20:
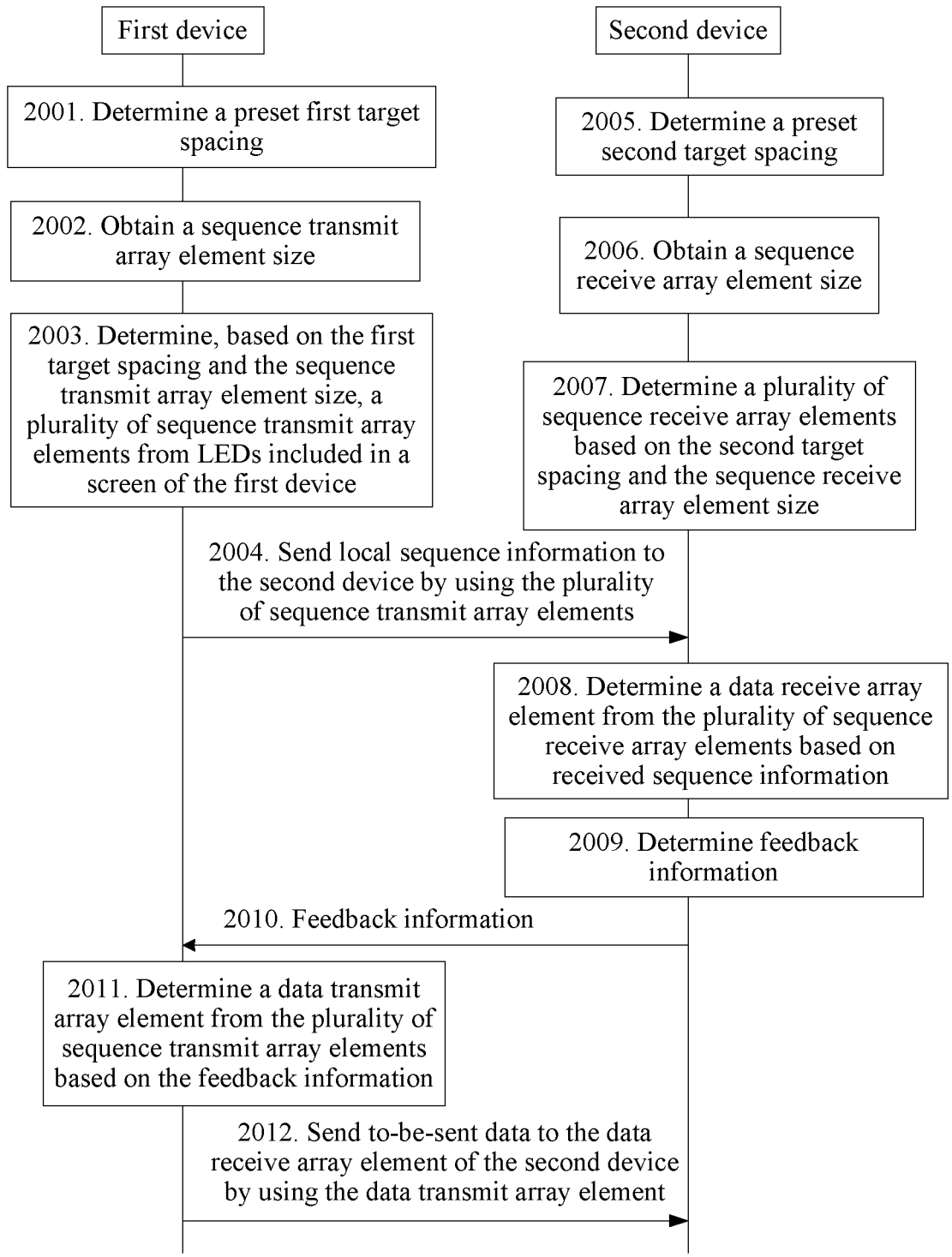
FIG. 20 is a schematic flowchart of a communication method according to an embodiment of this application.

FIG. 20 is a schematic flowchart of another communication method according to an embodiment of this application. As shown in FIG. 20, the communication method includes parts 2001-2012.

2001. A first device determines a preset first target spacing.

The first device may preset one or more groups of spacings. One group of spacings include a minimum spacing between two adjacent data transmit array elements in a first screen along a first direction of LED arrangement, and a minimum spacing between two adjacent data transmit array elements in the first screen along a second direction of LED arrangement.

For example, the first device presets three groups of spacings. A first group of spacings include a spacing 1 and a spacing 2, a second group of spacings include a spacing 3 and a spacing 4, and a first group of spacings include a spacing 5 and a spacing 6. The spacing 1, the spacing 3, and the spacing 5 each are the minimum spacing between two adjacent data transmit array elements in the first screen along the first direction of LED arrangement, and the spacing 2, the spacing 4, and the spacing 6 each are the minimum spacing between two adjacent data transmit array elements in the first screen along the second direction of LED arrangement.

If a plurality of groups of spacings are preset, the first device may obtain any group of spacings from the plurality of groups of preset spacings as the first target spacing. For example, the first group of spacings or the second group of spacings or the third group of spacings may be selected as the first target spacing.

Optionally, before determining the preset first target spacing, the first device may further receive a screen driver type of a second device sent by the second device, and correspondingly, a specific implementation of determining, by the first device, the preset first target spacing is as follows selecting by the first device, the first target spacing from a plurality of transmit array element spacings based on the screen driver type of the second device.

For example, if the screen driver type of the second device is matrix driving, the first target spacing selected by the first device includes a spacing 1 and a spacing 2. The spacing 1 is a minimum spacing between sequence transmit array elements in the first screen along an X-axis direction, and the spacing 2 is a minimum spacing between sequence transmit array elements in the first screen along a Y-axis direction. In addition, the spacing 1 is greater than or equal to Q, and Q is equal to a width of the screen along an X-axis minus a diameter of one LED. Generally, in a screen with matrix driving, LEDs in one row belong to only one data transmit array element. Therefore, this can ensure that LEDs in one row belong to only one data transmit array element.

2002. The first device obtains a sequence transmit array element size.

The sequence transmit array element is used to transmit local sequence information.

The sequence transmit array element size may be preset by the first device. Alternatively, the first device may calculate the sequence transmit array element size in the manner of determining the data transmit array element size described in the foregoing method embodiment.

2003. The first device determines, based on the first target spacing and the sequence transmit array element size, a plurality of sequence transmit array elements from LEDs included in a screen of the first device.

A principle of determining the sequence transmit array element by the first device based on the first target spacing and the sequence transmit array element size is the same as the principle of determining the data transmit array element based on the first array element spacing, the second array element spacing, and the data transmit array element size described in the foregoing method embodiment. Details are not described herein. Each of the plurality of sequence transmit array elements includes at least one LED of the first device.

2004. The first device sends local sequence information to the second device using the plurality of sequence transmit array elements.

Different sequence transmit array elements send different local sequence information.

For example, the first device determines four sequence transmit array elements. Stored local sequence information includes local sequence information 1 (111101011001000), local sequence information 2 (010110010001111), local sequence information 3 (100100011110101), and local sequence information 4 (000111101011001). The first device sends the local sequence information 1 using a sequence transmit array element 1. The first device sends the local sequence information 2 using a sequence transmit array element 2. The first device sends the local sequence information 3 using a sequence transmit array element 3. The first device sends the local sequence information 4 using a sequence transmit array element 4.

2005. The second device determines a preset second target spacing.

The second device may preset one or more groups of spacings. One group of spacings include a minimum spacing between two adjacent data receive array elements in a second screen along a first direction of LED arrangement, and a minimum spacing between two adjacent data receive array elements in the second screen along a second direction of LED arrangement.

If a plurality of groups of spacings are preset, the second device may obtain any group of spacings from the plurality of groups of preset spacings as the second target spacing.

Optionally, before determining the preset second target spacing, the second device receives a screen driver type of the first device sent by the first device, and correspondingly, a specific implementation of determining, by the first device, the preset second target spacing is as follows selecting, by the second device, the second target spacing from a plurality of receive array element spacings based on the screen driver type of the first device.

For example, if the screen driver type of the first device is matrix driving, the second target spacing selected by the first device includes a spacing 1 and a spacing 2. The spacing 1 is a minimum spacing between sequence transmit array elements in the second screen along an X-axis direction, and the spacing 2 is a minimum spacing between sequence transmit array elements in the second screen along a Y-axis direction. In addition, the spacing 1 is greater than or equal to Q, and Q is equal to a width of the screen along an X-axis minus a diameter of one LED. This can ensure that LEDs in one row belong to only one data receive array element.

2006. The second device obtains a sequence receive array element size.

The sequence receive array element is used to receive local sequence information. The sequence receive array element size may be preset by the second device. Alternatively, the second device may calculate the sequence receive array element size in the manner of determining the data receive array element size described in the foregoing method embodiment.

2007. The second device determines a plurality of sequence receive array elements based on the second target spacing and the sequence receive array element size.

A principle of determining the sequence receive array element by the second device based on the second target spacing and the sequence receive array element size is the same as the principle of determining the data receive array element based on the third array element spacing, the fourth array element spacing, and the data receive array element size described in the foregoing method embodiment. Details are not described herein. Each of the plurality of sequence receive array elements includes at least one LED of the second device.

In this embodiment of this application, after the second device determines the plurality of sequence receive array elements, the second device receives sequence information using the plurality of sequence receive array elements, where the sequence information is received by the second device after the plurality of sequence transmit array elements of the first device send local sequence information to the second device.

2008. The second device determines a data receive array element from the plurality of sequence receive array elements based on the received sequence information.

Optionally, a specific implementation of determining, by the second device, the data receive array element from the plurality of sequence receive array elements based on the received sequence information may be as follows calculating, by the second device, a plurality of correlation values between sequence information received by each of the plurality of sequence receive array elements and a plurality of pieces of local sequence information, where the plurality of pieces of local sequence information are in a one-to-one correspondence with the plurality of correlation values, and if a maximum correlation value in the plurality of correlation values corresponding to the sequence receive array element is greater than a first threshold, a ratio of a second largest correlation value to the maximum correlation value is not greater than a second threshold, and a first sequence transmit array element is not determined as a data transmit array element, determining, by the second device, the sequence receive array element as a data receive array element, and determining the first sequence transmit array element as a data transmit array element, where the first sequence transmit array element is a sequence transmit array element that sends local sequence information corresponding to the maximum correlation value.

The second device also stores the plurality of pieces of local sequence information. The plurality of pieces of local sequence information are in a one-to-one correspondence with the plurality of correlation values.

For example, the second device determines sequence receive array elements 1 to 4, and the second device also stores the foregoing local sequence information 1 to 4. Sequence information 1 received by the receive array element 1 of the second device is {0.8, 0.3, 0.4, 0.9, 0.1, 0.5, 0.2, 0.7, 0.8, 0.1, 0.1, 0.8, 0.3, 0.3, 0.2}. The second device calculates a correlation between the sequence information 1 and the local sequence information 1, to obtain a correlation value 1. The second device calculates a correlation between the sequence information 1 and the local sequence information 2, to obtain a correlation value 2. The second device calculates a correlation between the sequence information 1 and the local sequence information 3, to obtain a correlation value 3. The second device calculates a correlation between the sequence information 1 and the local sequence information 4, to obtain a correlation value 4. Because the second device stores the four pieces of local sequence information, the second device calculates four correlation values corresponding to the sequence receive array element 1, the correlation values 1 to 4. Similarly, such a manner is used to calculate corresponding correlation values for the sequence receive array elements 2 to 4. The receive array elements 2 to 4 each correspond to four correlation values.

Optionally, if a received sequence signal is {r1, r2, ..., rm}, local sequence information is {L1, L2, ..., Lm}, and a sequence length is m, a correlation value X is equal to $$\left| \frac{\sum_{i=1}^{m} r_i * L_i}{\sqrt{\left(\sum_{i=1}^{m} r_i^2\right)\left(\sum_{i=1}^{m} L_i^2\right)}} - 0.5 \right| * 2.$$

If the maximum correlation value corresponding to the sequence receive array element is greater than the first threshold, and the ratio of the second largest correlation value corresponding to the sequence receive array element to the maximum correlation value is not greater than the second threshold, it indicates that the sequence receive array element can correctly receive data sent by the first sequence transmit array element, and data sent by another sequence transmit array element causes no severe interference to the data that is received by the sequence receive array element and that is sent by the first sequence transmit array element.

In this embodiment of this application, after the second device determines the sequence receive array element as a data receive array element, and determines the first sequence transmit array element as a data transmit array element, the second device may receive data from the data transmit array element of the first device using the data receive array element.

Optionally, if the maximum correlation value in the plurality of correlation values corresponding to the sequence receive array element is greater than the first threshold, the ratio of the second largest correlation value to the maximum correlation value is not greater than the second threshold, and the first sequence transmit array element has been determined as a data transmit array element, the second device does not determine the sequence receive array element as a data receive array element, or the second device combines the sequence receive array element with a first sequence receive array element. The first sequence transmit array element is a sequence transmit array element that sends the local sequence information corresponding to the maximum correlation value, the first sequence receive array element is a sequence receive array element that has been determined as a data receive array element, and maximum correlation values of the sequence receive array element and the first sequence receive array element are the same.

If a maximum correlation value corresponding to the sequence receive array element 1 is greater than the first threshold, and a ratio of a second largest correlation value corresponding to the sequence receive array element 1 to the maximum correlation value is not greater than the second threshold, it indicates that the sequence receive array element 1 may receive data sent by the first sequence transmit array element. However, there is already the sequence receive array element 2 that can receive the data of the first sequence transmit array element. Therefore, the sequence receive array element 1 is not used to receive the data sent by the first sequence transmit array element. Alternatively, the sequence receive array element 1 and the sequence receive array element 2 may be combined to receive the data sent by the first sequence transmit array element.

Optionally, if the maximum correlation value in the plurality of correlation values corresponding to the sequence receive array element is not greater than the first threshold, the second device does not determine the sequence receive array element as a data receive array element.

If the maximum correlation value corresponding to the sequence receive array element is not greater than the first threshold, it indicates that the sequence receive array element cannot correctly receive data sent by any sequence transmit array element.

Optionally, if the maximum correlation value in the plurality of correlation values corresponding to the sequence receive array element is greater than the first threshold, the ratio of the second largest correlation value in the plurality of correlation values to the maximum correlation value is greater than the second threshold, and a second sequence transmit array element has been determined as a data transmit array element, the second device does not determine the sequence receive array element as a data receive array element, where the second sequence transmit array element is a sequence transmit array element that sends local sequence information corresponding to the second largest correlation value.

If the maximum correlation value corresponding to the sequence receive array element is greater than the first threshold, the ratio of the second largest correlation value to the maximum correlation value is greater than the second threshold, and the second sequence transmit array element has been determined as a data transmit array element, it indicates that the second sequence transmit array element interferes with data received by the sequence receive array element. Therefore, the data received by the sequence receive array element is inaccurate, and the sequence receive array element cannot be determined as a data receive array element.

Optionally, if the maximum correlation value in the plurality of correlation values corresponding to the sequence receive array element is greater than the first threshold, the ratio of the second largest correlation value to the maximum correlation value is greater than the second threshold, the second sequence transmit array element is not determined as a data transmit array element, and the second largest correlation value is less than the first threshold, the second device does not determine the second sequence transmit array element as a data transmit array element, where the second sequence transmit array element is the sequence transmit array element that sends the local sequence information corresponding to the second largest correlation value.

If the maximum correlation value corresponding to the sequence receive array element is greater than the first threshold, the ratio of the second largest correlation value to the maximum correlation value is greater than the second threshold, the second sequence transmit array element is not determined as a data transmit array element, and the second largest correlation value is less than the first threshold, it indicates that the second sequence transmit array element interferes with the data received by the sequence receive array element. Therefore, the second sequence transmit array element cannot be determined as a data transmit array element.

Optionally, if the maximum correlation value in the plurality of correlation values corresponding to the sequence receive array element is greater than the first threshold, the ratio of the second largest correlation value to the maximum correlation value is greater than the second threshold, the second sequence transmit array element is not determined as a data transmit array element, and the second largest correlation value is greater than the first threshold, the second device determines to combine the second sequence transmit array element with the first sequence transmit array element, where the first sequence transmit array element is the sequence transmit array element that sends the local sequence information corresponding to the maximum correlation value, and the second sequence transmit array element is the sequence transmit array element that sends the local sequence information corresponding to the second largest correlation value.

If the maximum correlation value corresponding to the sequence receive array element is greater than the first threshold, the ratio of the second largest correlation value to the maximum correlation value is greater than the second threshold, the second sequence transmit array element is not determined as a data transmit array element, and the second largest correlation value is greater than the first threshold, it indicates that the sequence receive array element can correctly receive data sent by the first sequence transmit array element and the second sequence transmit array element. Therefore, the first sequence transmit array element and the second sequence transmit array element may be combined.

2009. The second device determines feedback information.

The feedback information is determined based on the sequence information. The feedback information includes first information and/or second information. The first information is used to indicate a sequence transmit array element that is not a data transmit array element or is used to indicate a sequence transmit array element that is a data transmit array element, and. The second information is used to indicate a sequence transmit array element that needs to be combined into a data transmit array element.

2010. The second device sends the feedback information to the first device.

The following further describes the foregoing 2001-2010 based on an actual example, in an embodiment, further describes how to determine the sequence receive array element and the sequence transmit array element based on the plurality of correlation values corresponding to the sequence receive array element.

The first device determines six sequence transmit array elements sequence transmit array elements 1 to 6. The second device determines six sequence receive array elements sequence receive array elements 1 to 6. The second device separately calculates correlation values corresponding to each sequence receive array element based on sequence information received by the sequence receive array elements 1 to 6, to obtain a correlation value matrix $$M = \begin{pmatrix} 0.9 & 0.1 & 0.2 & 0.1 & 0.3 & 0.3 \\ 0.9 & 0.2 & 0.3 & 0.2 & 0.4 & 0.4 \\ 0.6 & 0.7 & 0.8 & 0.4 & 0.3 & 0.1 \\ 0.3 & 0.4 & 0.6 & 0.9 & 0.4 & 0.1 \\ 0.1 & 0.1 & 0.3 & 0.9 & 0.5 & 0.4 \\ 0.2 & 0.1 & 0.3 & 0.5 & 0.8 & 0.9 \end{pmatrix}.$$

Six correlation values corresponding to the sequence receive array element 1 are data in the first row of the correlation value matrix M. Six correlation values corresponding to the sequence receive array element 2 are data in the second row of the correlation value matrix M. Six correlation values corresponding to the sequence receive array element 3 are data in the third row of the correlation value matrix M. Six correlation values corresponding to the sequence receive array element 4 are data in the fourth row of the correlation value matrix M. Six correlation values corresponding to the sequence receive array element 5 are data in the fifth row of the correlation value matrix M. Six correlation values corresponding to the sequence receive array element 6 are data in the sixth row of the correlation value matrix M.

The first column of the correlation value matrix M is correlation values between sequence signals received by the sequence receive array elements and local sequence information 1. The second column of the correlation value matrix M is correlation values between the sequence signals received by the sequence receive array elements and local sequence information 2. The third column of the correlation value matrix M is correlation values between the sequence signals received by the sequence receive array elements and local sequence information 3. The fourth column of the correlation value matrix M is correlation values between the sequence signals received by the sequence receive array elements and local sequence information 4. The fifth column of the correlation value matrix M is correlation values between the sequence signals received by the sequence receive array elements and local sequence information 5. The sixth column of the correlation value matrix M is correlation values between the sequence signals received by the sequence receive array elements and local sequence information 6.

The sequence transmit array element 1 sends the local sequence information 1. The sequence transmit array element 2 sends the local sequence information 2. The sequence transmit array element 3 sends the local sequence information 3. The sequence transmit array element 4 sends the local sequence information 4. The sequence transmit array element 5 sends the local sequence information 5. The sequence transmit array element 6 sends the local sequence information 6.

It is assumed that signal receiving energy vectors of the sequence receive array elements 1 to 6 are {3, 4, 6, 8, 8, 6}, signal transmitting energy vectors of the sequence transmit array elements 1 to 6 are {3, 4, 6, 8, 8, 6}, the first threshold is 0.6, and the second threshold is 0.5. The first row is observed first. A maximum correlation value (0.9) in the first row exceeds the first threshold, a ratio of a second largest correlation value (0.3) in the first row to 0.9 does not exceed the second threshold (0.5), and it has not been determined whether the sequence transmit array element 1 (that is, a sequence transmit array element corresponding to the first column) that sends the local sequence information 1 corresponding to the maximum correlation value is a data transmit array element. Therefore, the first device determines a sequence receive array element (that is, the sequence receive array element 1) corresponding to the first row as a data receive array element, and determines the sequence transmit array element 1 (that is, a sequence transmit array element corresponding to the first column) that sends the local sequence information 1 corresponding to the maximum correlation value as a data transmit array element.

Remaining rows are further observed. The first column of the second row is a maximum correlation value, the maximum correlation value in the second row exceeds the first threshold, a ratio of a second largest correlation value in the second row to the maximum correlation value does not exceed the second threshold, and a sequence transmit array element corresponding to the first column has been determined as a data transmit array element. Therefore, the second row is deleted (that is, the second row is set to a special value −1), and the sequence receive array element 2 is set to not be a data receive array element. The correlation value matrix is changed to $$M = \begin{pmatrix} 0.9 & 0.1 & 0.2 & 0.1 & 0.3 & 0.3 \\ -1 & -1 & -1 & -1 & -1 & -1 \\ 0.6 & 0.7 & 0.8 & 0.4 & 0.3 & 0.1 \\ 0.3 & 0.4 & 0.6 & 0.9 & 0.4 & 0.1 \\ 0.1 & 0.1 & 0.3 & 0.9 & 0.5 & 0.4 \\ 0.2 & 0.1 & 0.3 & 0.5 & 0.8 & 0.9 \end{pmatrix}.$$

Alternatively, the sequence receive array element 1 and the sequence receive array element 2 may be combined, and it is further observed whether a combination of the sequence receive array element 1 and the sequence receive array element 2 can be a data receive array element. If the sequence receive array element 1 and the sequence receive array element 2 are combined, the second row in the matrix is updated to a result obtained by combining values of elements in the two rows. A formula for combining correlation values C1 and C2 is $$\frac{C_1 \sqrt{P_1} + C_2 \sqrt{P_2}}{\sqrt{P_1 + P_2}},$$

where P1 and P2 are signal receiving energy vectors respectively corresponding to C1 and C2.

Then, the third row is observed. A maximum correlation value (0.8) in the third row exceeds the first threshold, a ratio of a second largest correlation value (0.7) in the third row to the maximum correlation value (0.8) exceeds the second threshold, the second largest correlation value (0.7) exceeds the first threshold, and it has not been determined whether the sequence transmit array element 2 that sends the local sequence information 2 corresponding to the second largest correlation value is a data transmit array element. Therefore, corresponding sequence transmit array elements in the second column and the third column are combined, in an embodiment, the sequence transmit array element 2 and the sequence transmit array element 3 are combined. The first device combines correlation values in the second column and the third column, and an obtained new correlation value in the third column is $$\frac{C_1 \sqrt{Q_1} + C_2 \sqrt{Q_2}}{\sqrt{Q_1 + Q_2}},$$

where C1 is the correlation value in the second column, C2 is the original correlation value in the third column, and Q1 and Q2 are signal transmitting energy vectors respectively corresponding to C1 and C2. For example, after the correlation values in the second column and the third column are combined, an obtained correlation value matrix is $$M = \begin{pmatrix} 0.9 & -1 & 0.2 & 0.1 & 0.3 & 0.3 \\ -1 & -1 & -1 & -1 & -1 & -1 \\ 0.6 & -1 & 0.8 & 0.4 & 0.3 & 0.1 \\ 0.3 & -1 & 0.7 & 0.9 & 0.4 & 0.1 \\ 0.1 & -1 & 0.2 & 0.9 & 0.5 & 0.4 \\ 0.2 & -1 & 0.2 & 0.5 & 0.8 & 0.9 \end{pmatrix}.$$

Then, observation on the third row continues. In this case, the sequence transmit array element 1 that sends the local sequence information 1 corresponding to the second largest correlation value (0.6) in the third row has been determined as a data transmit array element, and the ratio of the second largest correlation value (0.6) to the maximum correlation value (0.8) exceeds the second threshold. Therefore, the sequence receive array element 3 corresponding to the third row is not determined as a data receive array element, and correlation values in the third row are deleted (that is, the third row is set to the special value −1). An updated correlation value matrix is $$M = \begin{pmatrix} 0.9 & -1 & 0.2 & 0.1 & 0.3 & 0.3 \\ -1 & -1 & -1 & -1 & -1 & -1 \\ -1 & -1 & -1 & -1 & -1 & -1 \\ 0.3 & -1 & 0.7 & 0.9 & 0.4 & 0.1 \\ 0.1 & -1 & 0.2 & 0.9 & 0.5 & 0.4 \\ 0.2 & -1 & 0.2 & 0.5 & 0.8 & 0.9 \end{pmatrix}.$$

Next, the fourth row is observed. A maximum correlation value (0.9) in the fourth row exceeds the first threshold, a ratio of a second largest correlation value (0.7) to the maximum correlation value (0.9) exceeds the threshold 2, the second largest correlation value (0.7) exceeds the first threshold, and it has not been determined whether the sequence transmit array element 3 (that is, a sequence transmit array element that sends local sequence information corresponding to the second largest correlation value) corresponding to the third column is a data transmit array element. Therefore, the sequence transmit array element 3 corresponding to the third column and the sequence transmit array element 4 corresponding to the fourth column are combined. Actually, the sequence transmit array element 2, the sequence transmit array element 3, and the sequence transmit array element 4 are combined. In addition, correlation values in the third column and the fourth column are combined, and an updated maw $$M = \begin{pmatrix} 0.9 & -1 & -1 & 0.2 & 0.3 & 0.3 \\ -1 & -1 & -1 & -1 & -1 & -1 \\ -1 & -1 & -1 & -1 & -1 & -1 \\ 0.3 & -1 & -1 & 0.7 & 0.4 & 0.1 \\ 0.1 & -1 & -1 & 0.6 & 0.5 & 0.4 \\ 0.2 & -1 & -1 & 0.4 & 0.8 & 0.9 \end{pmatrix}.$$

A ratio of a correlation value 0.4 in the fifth column to 0.7 exceeds the threshold 2, it has not been determined whether the sequence transmit array element 5 corresponding to the fifth column is a data transmit array element, and 0.4 does not exceed the threshold 1. Therefore, the sequence transmit array element 5 is not determined as a data transmit array element. In addition, correlation values in the fifth column are deleted (that is, the fifth column is set to the special value −1), and an updated matrix is $$M = \begin{pmatrix} 0.9 & -1 & -1 & 0.2 & -1 & 0.3 \\ -1 & -1 & -1 & -1 & -1 & -1 \\ -1 & -1 & -1 & -1 & -1 & -1 \\ 0.3 & -1 & -1 & 0.7 & -1 & 0.1 \\ 0.1 & -1 & -1 & 0.6 & -1 & 0.4 \\ 0.2 & -1 & -1 & 0.4 & -1 & 0.9 \end{pmatrix}.$$

Then, observation on the fourth row continues. A maximum correlation value 0.7 in the fourth row exceeds the first threshold, a ratio of a second largest correlation value (0.3) to the maximum correlation value (0.7) does not exceed the threshold 2, and it has not been determined whether the sequence transmit array element 4 corresponding to the fourth column is a data transmit array element. Therefore, the sequence receive array element 4 corresponding to the fourth row is determined as a data receive array element.

Then, the fifth row is observed. Because a maximum correlation value (0.6) in the fifth row does not exceed the first threshold, the sequence receive array element 5 corresponding to the fifth row is not determined as a data receive array element. In addition, correlation values in the fifth row are deleted (that is, the fifth row is set to the special value −1), and an updated matrix is $$M = \begin{pmatrix} 0.9 & -1 & -1 & 0.2 & -1 & 0.3 \\ -1 & -1 & -1 & -1 & -1 & -1 \\ -1 & -1 & -1 & -1 & -1 & -1 \\ 0.3 & -1 & -1 & 0.7 & -1 & 0.1 \\ -1 & -1 & -1 & -1 & -1 & -1 \\ 0.2 & -1 & -1 & 0.4 & -1 & 0.9 \end{pmatrix}.$$

Then, the sixth row is observed. A maximum correlation value (0.9) in the sixth row exceeds the first threshold, a ratio of a second largest correlation value (0.4) in the sixth row to the maximum correlation value (0.9) does not exceed the second threshold (0.5), and it has not been determined whether the sequence transmit array element 6 that sends the local sequence information 6 corresponding to the maximum correlation value is a data transmit array element. Therefore, the first device determines a sequence receive array element (that is, the sequence receive array element 6) corresponding to the sixth row as a data receive array element, and determines a sequence transmit array element (that is, the sequence transmit array element 6) corresponding to the sixth column as a data transmit array element.

In conclusion, the first device eventually determines three data transmit array elements. A data transmit array element 1 is the sequence transmit array element 1. A data transmit array element 2 includes the sequence transmit array element 2, the sequence transmit array element 3, and the sequence transmit array element 4. A data transmit array element 3 is the sequence transmit array element 6.

The first device eventually determines three data receive array elements. A data receive array element 1 is the sequence receive array element 1. A data receive array element 2 is the sequence receive array element 4. A data receive array element 3 is the sequence receive array element 6. Therefore, 3*3 MIMO communication can be formed between the first device and the second device.

The feedback information determined by the first device includes the first information and the second information. The first information is used to indicate that the sequence transmit array element 5 is not a data transmit array element. The second information is used to indicate that the sequence transmit array element 2, the sequence transmit array element 3, and the sequence transmit array element 4 are combined into one data transmit array element.

Optionally, the second device may determine the first threshold and the second threshold based on a minimum signal-to-noise ratio required by the second screen to correctly receive data in a second modulation and coding scheme, where the second modulation and coding scheme is a modulation and coding scheme used by the first device to send local sequence information.

The second device may preset a correspondence between a signal-to-noise ratio and the first threshold and the second threshold. For example, the following is preset. A signal-to-noise ratio 1 corresponds to a first threshold 1 and a second threshold 1, and a signal-to-noise ratio 2 corresponds to a first threshold 2 and a second threshold 2. If the minimum signal-to-noise ratio required by the second screen to correctly receive data in the second modulation and coding scheme is the signal-to-noise ratio 2, the second device selects the first threshold 2 and the second threshold 2.

With this implementation implemented, an appropriate first threshold and an appropriate second threshold can be determined.

2011. The first device determines the data transmit array element from the plurality of sequence transmit array elements based on the feedback information.

After receiving the feedback information sent by the second device, the first device determines the data transmit array element from the plurality of sequence transmit array elements based on the feedback information.

Optionally, if the first information is used to indicate a sequence transmit array element that is not a data transmit array element, the first information may be an identifier of first local sequence information, and a sequence transmit array element that transmits the first local sequence information is not a data transmit array element. The second information may be an identifier of second local sequence information, and a sequence transmit array element that sends the second local sequence information is a sequence transmit array element that needs to be combined into a data transmit array element. If the first information is used to indicate a sequence transmit array element that is a data transmit array element, the first information may be an identifier of third local sequence information, and a sequence transmit array element that transmits the third local sequence information is a data transmit array element. The first device may receive only the first information, or the first device may receive only the second information, or the first device may receive both the first information and the second information.

Figure 21:
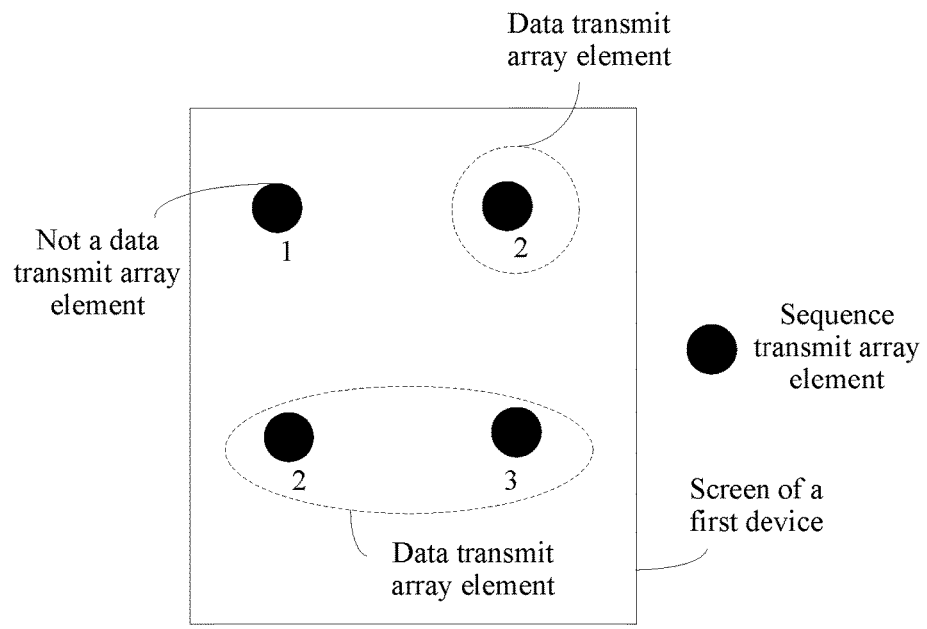
FIG. 21 is a schematic diagram of determining a data receive array element according to an embodiment of this application.

For example, the first device sends the local sequence information 1 using the sequence transmit array element 1. The first device sends the local sequence information 2 using the sequence transmit array element 2. The first device sends the local sequence information 3 using the sequence transmit array element 3. The first device sends the local sequence information 4 using the sequence transmit array element 4. If the first information is used to indicate a sequence transmit array element that is not a data transmit array element, the first device receives the first information, and the first information is an identifier of the local sequence information 1, the first device does not determine the sequence transmit array element 1 that sends the local sequence information 1 as a data transmit array element. If the first device receives the second information, and the second information is identifiers of the local sequence information 2 and the local sequence information 3, the first device combines the sequence transmit array element 2 that sends the local sequence information 2 and the sequence transmit array element 3 that sends the local sequence information 3, and determines a transmit array element obtained through combination as a data transmit array element. Because an identifier of the local sequence information 4 is not received, the sequence transmit array element 4 may be directly determined as a data transmit array element. As shown in FIG. 21, two data transmit array elements may be eventually obtained.

Optionally, if the first information is used to indicate a sequence transmit array element that is not a data transmit array element, and received first information is empty, the first device determines all sequence transmit array elements as data transmit array elements. If received second information is empty, the first device determines that no sequence transmit array element needs to be combined. For example, if the first device receives the first information and the second information, and both the first information and the second information are empty, the first device determines the sequence transmit array element 1 as a data transmit array element 1, the sequence transmit array element 2 as a data transmit array element 2, the sequence transmit array element 3 as a data transmit array element 3, and the sequence transmit array element 4 as a data transmit array element 4.

2012. The first device sends to-be-sent data to a data receive array element of the second device using the data transmit array element.

A specific implementation principle of 2012 is the same as the specific implementation principle of 1003 above. Refer to the description corresponding to 1003. Details are not described herein.

It can be learned that, with the method described in FIG. 20 implemented, the first device and the second device can set an appropriate data transmit array element and an appropriate data receive array element.

Optionally, a first time period includes a first data sending period and a first content display period, the first data sending period is used by the first device to send to-be-sent data, the first content display period is used by the first device to display content, and the first device determines, in the first content display period based on a primary color intensity of the data transmit array element in the first data sending period and a time ratio of the first content display period to the first data sending period, a primary color intensity for transmitting a display signal.

Figure 22:
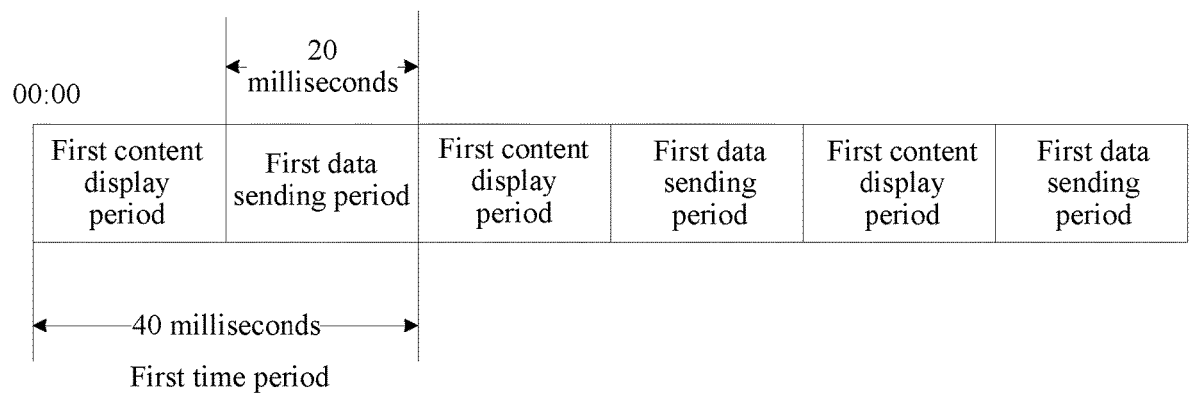
FIG. 22 is a schematic diagram of time period division according to an embodiment of this application.

In other words, as shown in FIG. 22, in this implementation, the time period may be periodically divided into the first content display period and the first data sending period based on a time division multiplexing mode. In the first content display period, only a display signal can be transmitted, and communication cannot be performed using the data transmit array element. In the first data sending period, the first device may transmit data using the data transmit array element. To avoid blinking, as shown in FIG. 22, a period time of each of the first content display period and the first data sending period cannot exceed a threshold time of persistence of vision of human eyes. The threshold time may be generally set to 50 milliseconds or less. In a content display time period, a transmitted display signal needs to be adjusted based on a communication signal to be transmitted in the current period, to avoid impact caused by data transmission of the data transmit array element to a display color and display brightness. In a multi-primary-color screen, different colors are formed by mixing different primary-color LEDs at different intensities. It is assumed that a time ratio of the first content display period to the first data sending period is 1:T. X3=X1−X2\*T, where X3 is a value of an adjusted intensity of a primary color of an LED in the first content display period, X1 is an intensity at which the primary color originally needs to be displayed in the first content display period, and X2 is an average intensity of the primary color in the first data sending period.

For example, the screen of the first device is a screen with three primary colors red, green, and blue. A color X that originally needs to be displayed in the first content display period requires intensities r1, g1, and b1 for the three primary colors of red, green, and blue. A total intensity (r1+g1+b1) determines brightness. The time ratio of the first content display period to the first data sending period is 1:T, and average intensities required for transmission of red, green, and blue tri-color LEDs in the first data sending period are respectively r2, g2, and b2. In this case, intensities for transmission of red, green, and blue tri-primary-color LEDs in the first content display period need to be adjusted to r3, g3, and b3, and need to meet the following relationships r3=r1−r2\*T, g3=g1−g2\*T, and b3=b1−b2\*T.

It can be learned that, with this implementation implemented, impact caused by data transmission of the data transmit array element to a display color and display brightness can be avoided.

Optionally, the first device sends first time information to the second device, where the first time information includes a start moment of the first time period, duration of the first time period, a start moment of the first data sending period, and duration of the first data sending period.

Correspondingly, the second device may receive the first time information sent by the first device. A specific implementation of receiving, by the second device, the data from the data transmit array element of the first device using the data receive array element is as follows receiving, by the second device in the first data sending period, the data from the data transmit array element of the first device using the data receive array element.

For example, as shown in FIG. 22, the start moment of the first time period is 00:00, the duration of the first time period is 40 milliseconds, the start moment of the first data sending period is 00:00 plus 20 milliseconds, and the duration of the first data sending period is 20 milliseconds. It can be learned that, the second device can calculate, based on the four pieces of time information, a time for sending data by the first device in each period in order to receive, at a corresponding time, the data sent by the first device.

Figure 23:
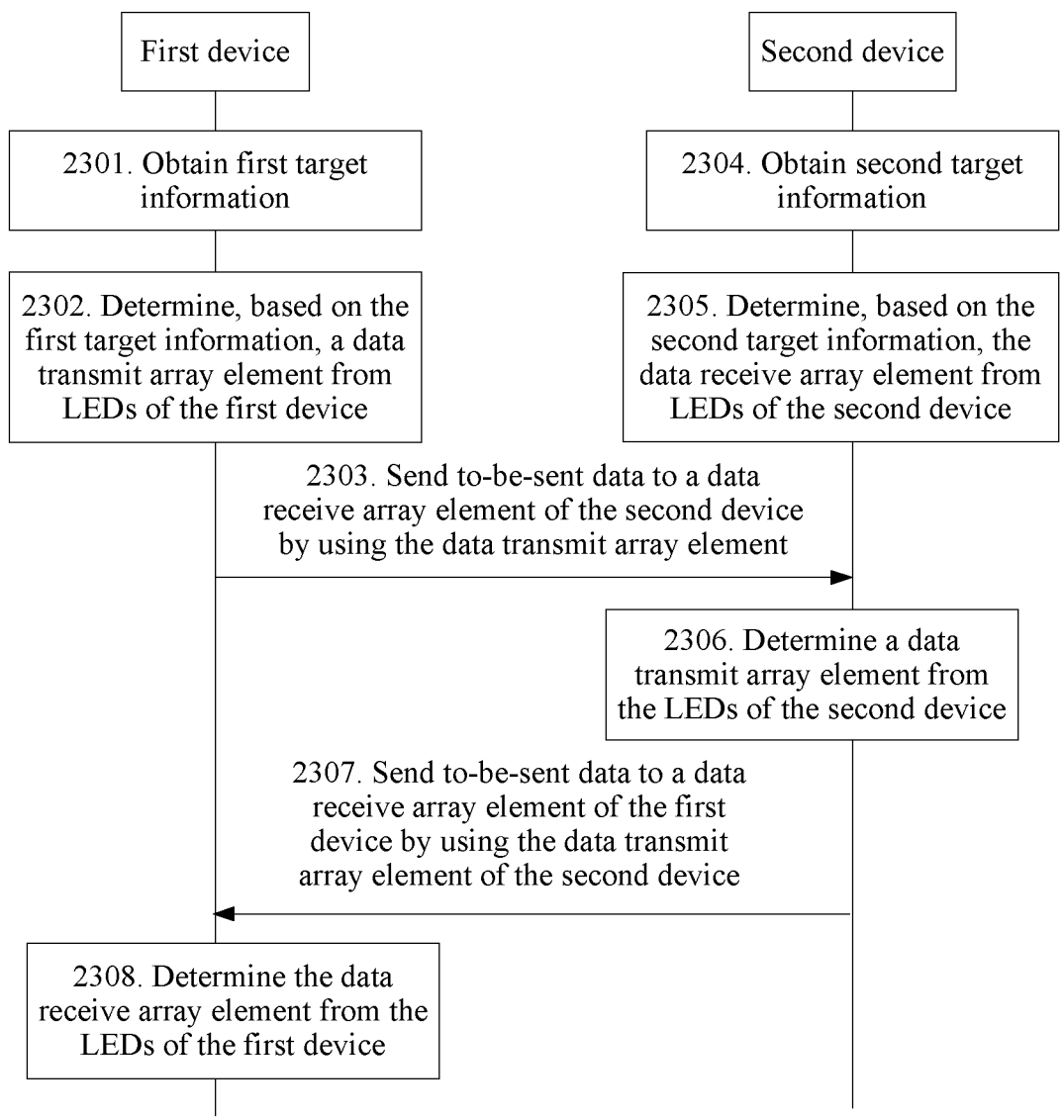
FIG. 23 is a schematic flowchart of a communication method according to an embodiment of this application.

FIG. 23 is a schematic flowchart of another communication method according to an embodiment of this application. As shown in FIG. 23, the communication method includes parts 2301-2308.

2301. A first device obtains first target information.

2302. The first device determines, based on the first target information, a data transmit array element from LEDs of the first device.

2303. The first device sends to-be-sent data to a data receive array element of a second device using the data transmit array element.

2304. The second device obtains second target information.

2305. The second device determines, based on the second target information, the data receive array element from LEDs of the second device.

After the second device determines the data receive array element from the LEDs, the second device may receive data from the data transmit array element of the first device using the data receive array element.

For specific implementations of 2301-2305, refer to the description in the foregoing embodiments. Details are not described herein.

2306. The second device determines a data transmit array element from the LEDs of the second device.

Each data transmit array element of the second device includes at least one LED. There may be one or more determined data transmit array elements.

Specifically, the data transmit array element may be determined from LEDs included in a camera flash. Alternatively, the data transmit array element is determined from LEDs included in a screen. Alternatively, the data transmit array element is determined from other LEDs of the second device.

A principle of determining the data transmit array element by the second device from the LEDs is the same as the principle of determining the data transmit array element by the first device from the LEDs. For details, refer to the corresponding description about determining the data receive array element by the first device from the LEDs. Details are not described herein.

2307. The second device sends to-be-sent data to a data receive array element of the first device using the data transmit array element of the second device.

2308. The first device determines the data receive array element from the LEDs of the first device.

In this embodiment of this application, after the first device determines the data receive array element from the LEDs, the first device may receive data from the data transmit array element of the second device using the data receive array element.

Each data receive array element of the first device includes at least one LED. There may be one or more determined data receive array elements.

Specifically, the data receive array element may be determined from LEDs included in a camera flash. Alternatively, the data receive array element is determined from LEDs included in a screen. Alternatively, the data receive array element is determined from other LEDs of the first device.

A principle of determining the data receive array element by the first device from the LEDs is the same as the principle of determining the data receive array element by the second device from the LEDs. For details, refer to the corresponding description about determining the data receive array element by the second device from the LEDs. Details are not described herein.

It can be learned that, with this implementation implemented, the first device and the second device can receive data using LEDs, and can also transmit data using LEDs.

Optionally, the data transmit array element of the second device includes a third data transmit array element and a fourth data transmit array element, the data receive array element of the first device includes a third data receive array element and a fourth data receive array element, the to-be-sent data sent by the second device includes third data and fourth data, and a specific implementation of sending, by the second device, the to-be-sent data to the data receive array element of the first device using the data transmit array element may be as follows sending, by the second device, the third data to the third data receive array element of the first device using the third data transmit array element, and sending, by the second device, the fourth data to the fourth data receive array element of the first device using the fourth data transmit array element.

Correspondingly, a specific implementation of receiving, by the first device, the data from the transmit array element of the second device using the receive array element may be as follows receiving, by the first device, the third data from the third data transmit array element of the second device using the third data receive array element, and receiving, by the first device, the fourth data from the fourth data transmit array element of the second device using the fourth data receive array element.

In other words, the second device may include at least two data transmit array elements, and the first device may include at least two data receive array elements. The second device may send different data to different data receive array elements of the first device using different data transmit array elements. It can be learned that, with this implementation implemented, MIMO communication can be formed, that is, a plurality of channels of data can be sent in parallel, thereby greatly increasing a communication rate.

Figure 24:
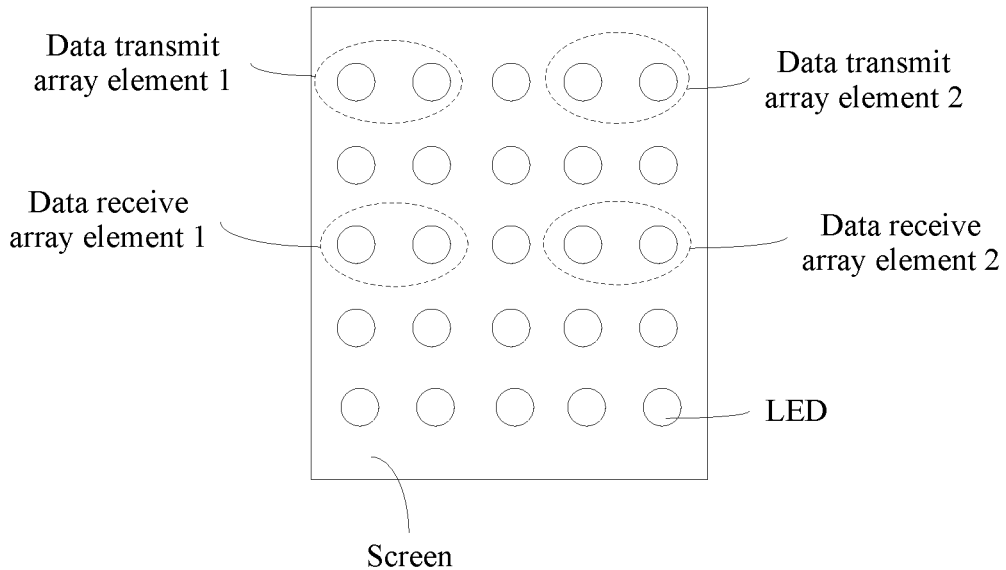
FIG. 24 is a schematic diagram of a layout of data transmit array elements and data receive array elements according to an embodiment of this application.

Optionally, as shown in FIG. 24, LEDs included in a data transmit array element and a data receive array element of the first device do not overlap.

With this implementation implemented, a space division duplex mode can be used to distinguish between the data transmit array element and the data receive array element, to ensure that data sending of the data transmit array element does not collide with data receiving of the data receive array element.

Figure 25:
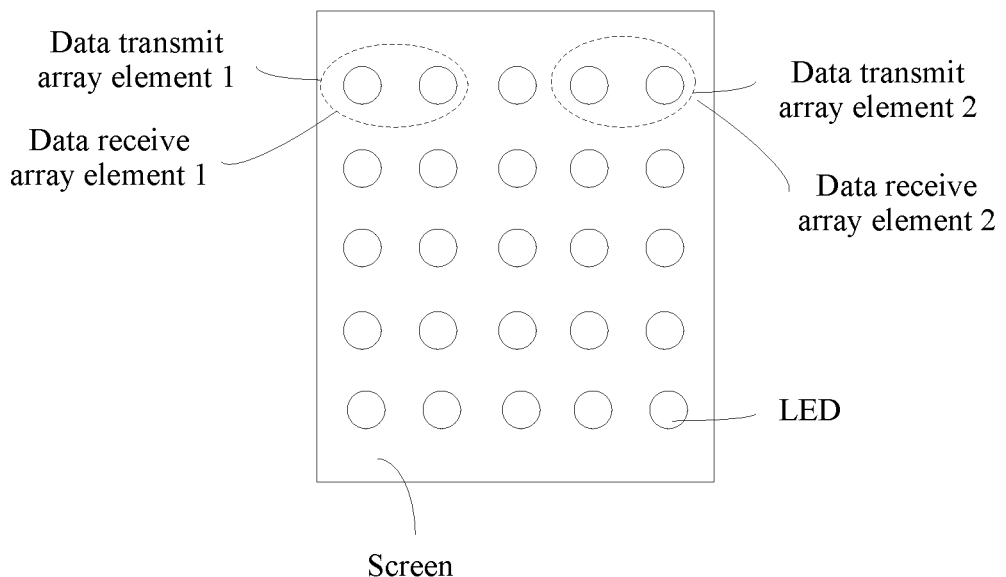
FIG. 25 is a schematic diagram of a layout of data transmit array elements and data receive array elements according to an embodiment of this application.

Optionally, as shown in FIG. 25, the first device has a first data transmit array element and a first data receive array element whose LEDs overlap, and a data sending time of the first data transmit array element does not overlap a data receiving time of the first data receive array element.

In other words, even if the first data transmit array element and the first data receive array element have a same LED, the data sending time of the first data transmit array element is different from the data receiving time of the first data receive array element. It can be learned that, with this implementation implemented, a time division duplex mode can be used to distinguish between a data sending time period of the data transmit array element and a data receiving time period of the data receive array element, to ensure that data sending of the data transmit array element does not collide with data receiving of the data receive array element.

Optionally, the first device has a first data transmit array element and a first data receive array element whose LEDs overlap, and a data sending time of the first data transmit array element overlaps a data receiving time of the first data receive array element.

It is found from research that, an LED can sense light at a reverse bias voltage. In addition, the LED has a relatively weak light sensing capability and a light emitting capability at a relatively low forward bias voltage (for example, 0.7 V-1.1 V). Based on this characteristic, a full-duplex function of the LED for simultaneous sending and receiving can be implemented.

Figure 26:
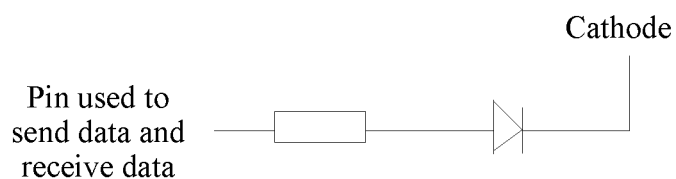
FIG. 26 is a schematic diagram of an LED pin function according to an embodiment of this application.

Optionally, the first device has a first data transmit array element and a first data receive array element whose LEDs overlap, and a data sending time of the first data transmit array element overlaps a data receiving time of the first data receive array element. A target LED is an LED included in both the first data transmit array element and the first data receive array element. As shown in FIG. 26, a pin used to receive data and a pin used to send data that are of the target LED are a same pin. The pin used to receive data and the pin used to send data that are of the target LED may be pins connected to an anode or pins connected to a cathode. An example in which the pin used to receive data and the pin used to send data are pins connected to the anode is used in FIG. 26.

Figure 27:
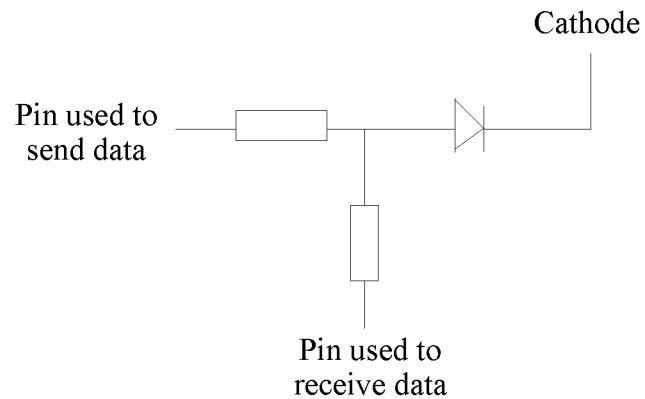
FIG. 27 is a schematic diagram of an LED pin function according to an embodiment of this application.
Figure 28:
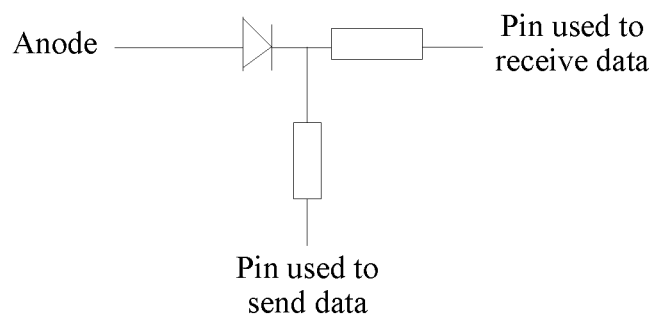
FIG. 28 is a schematic diagram of an LED pin function according to an embodiment of this application.

Optionally, the first device has a first data transmit array element and a first data receive array element whose LEDs overlap, and a data sending time of the first data transmit array element overlaps a data receiving time of the first data receive array element. A target LED is an LED included in both the first data transmit array element and the first data receive array element. As shown in FIG. 27, a pin used to receive data and a pin used to send data that are of the target LED are different pins. In addition, the pin used to receive data and the pin used to send data both are connected to an anode of the target LED. As shown in FIG. 28, a pin used to receive data and a pin used to send data that are of the target LED are different pins. In addition, the pin used to receive data and the pin used to send data both are connected to a cathode of the target LED.

Figure 29:
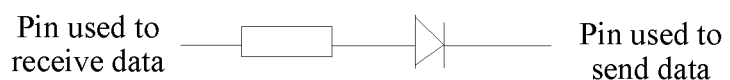
FIG. 29 is a schematic diagram of an LED pin function according to an embodiment of this application.
Figure 30:
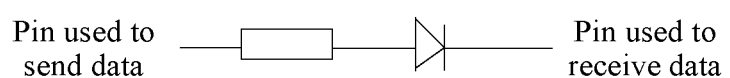
FIG. 30 is a schematic diagram of an LED pin function according to an embodiment of this application.

Optionally, the first device has a first data transmit array element and a first data receive array element whose LEDs overlap, and a data sending time of the first data transmit array element overlaps a data receiving time of the first data receive array element. A target LED is an LED included in both the first data transmit array element and the first data receive array element. As shown in FIG. 29, a pin used to receive data and a pin used to send data that are of the target LED are different pins. The pin used to receive data is connected to an anode of the LED, and the pin used to send data is connected to a cathode of the LED. Alternatively, as shown in FIG. 30, the pin used to receive data is connected to a cathode of the LED, and the pin used to send data is connected to an anode of the LED.

Optionally, the first device has a first data transmit array element and a first data receive array element whose LEDs overlap, and a data sending time of the first data transmit array element overlaps a data receiving time of the first data receive array element. After the first device receives the data from the data transmit array element of the second device using the data receive array element, the first device determines, based on a transmit signal of the first data transmit array element, a signal received by the first data receive array element.

In a full-duplex case, a received signal is affected by a transmit signal, regardless of which pin manner is used. A bias voltage varies with a transmit signal, and different bias voltages cause different light sensing capabilities. Consequently, even if a same optical signal is received, a received signal varies. In addition, the transmit signal directly enters the receiving pin, causing a direct change to the received signal.

Because a device can know its own transmit signal, a received signal r can be calculated based on a relationship among the transmit signal t, the received signal r, and a signal y of a data receiving pin y=f(t, r). A switch keying modulation signal is used as an example. A forward bias voltage is relatively high when information "1" is transmitted. In this case, if an optical signal with information "0" modulated is received, an induced current is relatively weak and is denoted as V10, or if an optical signal with information "1" modulated is received, an induced current is relatively strong and is denoted as V11, where V11>V10. A forward bias voltage is relatively low when information "0" is transmitted. In this case, if an optical signal with information "0" modulated is received, an induced current is relatively weak and is denoted as V00, where V00>V10, or if an optical signal with information "1" modulated is received, an induced current is relatively strong and is denoted as V01, where V01>V00 and V01>V11. Therefore, only two decision thresholds need to be set for receiving. A threshold A is between V11 and V10, and a threshold B is between V01 and V00. A threshold is selected based on transmitted information. The threshold A is selected when information "1" is transmitted, or the threshold B is selected when information "0" is transmitted. When a threshold is exceeded, a decision is "1", otherwise, a decision is "0".

Optionally, as shown in FIG. 24, LEDs included in a data transmit array element and a data receive array element of the second device do not overlap.

With this implementation implemented, a space division duplex mode can be used to distinguish between the data transmit array element and the data receive array element, to ensure that data sending of the data transmit array element does not collide with data receiving of the data receive array element.

Optionally, as shown in FIG. 25, the second device has a first data transmit array element and a first data receive array element whose LEDs overlap, and a data sending time of the first data transmit array element does not overlap a data receiving time of the first data receive array element.

In other words, even if the first data transmit array element and the first data receive array element have a same LED, the data sending time of the first data transmit array element is different from the data receiving time of the first data receive array element. It can be learned that, with this implementation implemented, a time division duplex mode can be used to distinguish between a data sending time period of the data transmit array element and a data receiving time period of the data receive array element, to ensure that data sending of the data transmit array element does not collide with data receiving of the data receive array element.

Optionally, the second device has a first data transmit array element and a first data receive array element whose LEDs overlap, and a data sending time of the first data transmit array element overlaps a data receiving time of the first data receive array element.

It is found from research that, an LED can sense light at a reverse bias voltage. In addition, the LED has a relatively weak light sensing capability and a light emitting capability at a relatively low forward bias voltage (for example, 0.7 V-1.1 V). Based on this characteristic, a full-duplex function of the LED for simultaneous sending and receiving can be implemented.

Optionally, the second device has a first data transmit array element and a first data receive array element whose LEDs overlap, and a data sending time of the first data transmit array element overlaps a data receiving time of the first data receive array element. As shown in FIG. 26, a target LED is an LED included in both the first data transmit array element and the first data receive array element. A pin used to receive data and a pin used to send data that are of the target LED are a same pin. The pin used to receive data and the pin used to send data that are of the target LED may be pins connected to an anode or pins connected to a cathode. An example in which the pin used to receive data and the pin used to send data are pins connected to the anode is used in FIG. 26.

Optionally, the second device has a first data transmit array element and a first data receive array element whose LEDs overlap, and a data sending time of the first data transmit array element overlaps a data receiving time of the first data receive array element. As shown in FIG. 27, a target LED is an LED included in both the first data transmit array element and the first data receive array element. A pin used to receive data and a pin used to send data that are of the target LED are different pins. In addition, the pin used to receive data and the pin used to send data both are connected to an anode of the target LED. As shown in FIG. 28, a pin used to receive data and a pin used to send data that are of the target LED are different pins. In addition, the pin used to receive data and the pin used to send data both are connected to a cathode of the target LED.

Optionally, the second device has a first data transmit array element and a first data receive array element whose LEDs overlap, and a data sending time of the first data transmit array element overlaps a data receiving time of the first data receive array element. As shown in FIG. 29, a target LED is an LED included in both the first data transmit array element and the first data receive array element. A pin used to receive data and a pin used to send data that are of the target LED are different pins. The pin used to receive data is connected to an anode of the LED, and the pin used to send data is connected to a cathode of the LED. Alternatively, as shown in FIG. 30, the pin used to receive data is connected to a cathode of the LED, and the pin used to send data is connected to an anode of the LED.

Optionally, the second device has a first data transmit array element and a first data receive array element whose LEDs overlap, and a data sending time of the first data transmit array element overlaps a data receiving time of the first data receive array element. The second device determines, based on a transmit signal of the first data transmit array element, a signal received by the first data receive array element.

In a full-duplex case, a received signal is affected by a transmit signal, regardless of which pin manner is used. A bias voltage varies with a transmit signal, and different bias voltages cause different light sensing capabilities. Consequently, even if a same optical signal is received, a received signal varies. In addition, the transmit signal directly enters the receiving pin, causing a direct change to the received signal.

In this implementation, a specific implementation principle of determining the received signal by the second device based on the transmit signal of the first data receive array element is the same as the specific implementation principle of determining the received signal by the first device based on the transmit signal of the first data receive array element. For details, refer to the specific implementation principle of determining the received signal by the first device based on the transmit signal of the first data receive array element. Details are not described herein.

Optionally, a second time period includes a second data sending period and a second content display period, the second data sending period is used by the second device to send data, and the second content display period is used by the second device to display content. The second device determines, in the second content display period based on a primary color intensity of the data transmit array element of the second device in the second data sending period and a time ratio of the second content display period to the second data sending period, a primary color intensity for transmitting a display signal.

A specific implementation principle of this implementation is the same as the principle of determining, by the first device based on the primary color intensity of the data transmit array element of the first device in the first data sending period and the time ratio of the first content display period to the first data sending period, the primary color intensity for transmitting a display signal. Details are not described herein. With this implementation implemented, impact caused by data transmission of the data transmit array element to a display color and display brightness can be avoided.

Optionally, when the second device further has a data transmit array element, the second device may further send second time information to the first device, where the second time information includes a start moment of the second time period, duration of the second time period, a start moment of the second data sending period, and duration of the second data sending period, the second time period includes the second data sending period and the second content display period, the second data sending period is used by the second device to send data, and the second content display period is used by the second device to display content.

Correspondingly, when the first device further has a data receive array element, the first device may further receive the second time information sent by the second device. A specific implementation of receiving, by the first device, the data from the data transmit array element of the second device using the data receive array element of the first device may be as follows receiving, by the first device in the second data sending period, the data from the data transmit array element of the second device using the data receive array element of the first device.

For example, the start moment of the second time period is 00:00, the duration of the second time period is 40 milliseconds, the start moment of the second data sending period is 00:00 plus 20 milliseconds, and the duration of the second data sending period is 20 milliseconds. It can be learned that, the first device can calculate, based on the four pieces of time information, a time for sending data by the second device in each period in order to receive, at a corresponding time, the data sent by the second device.

Figure 31:
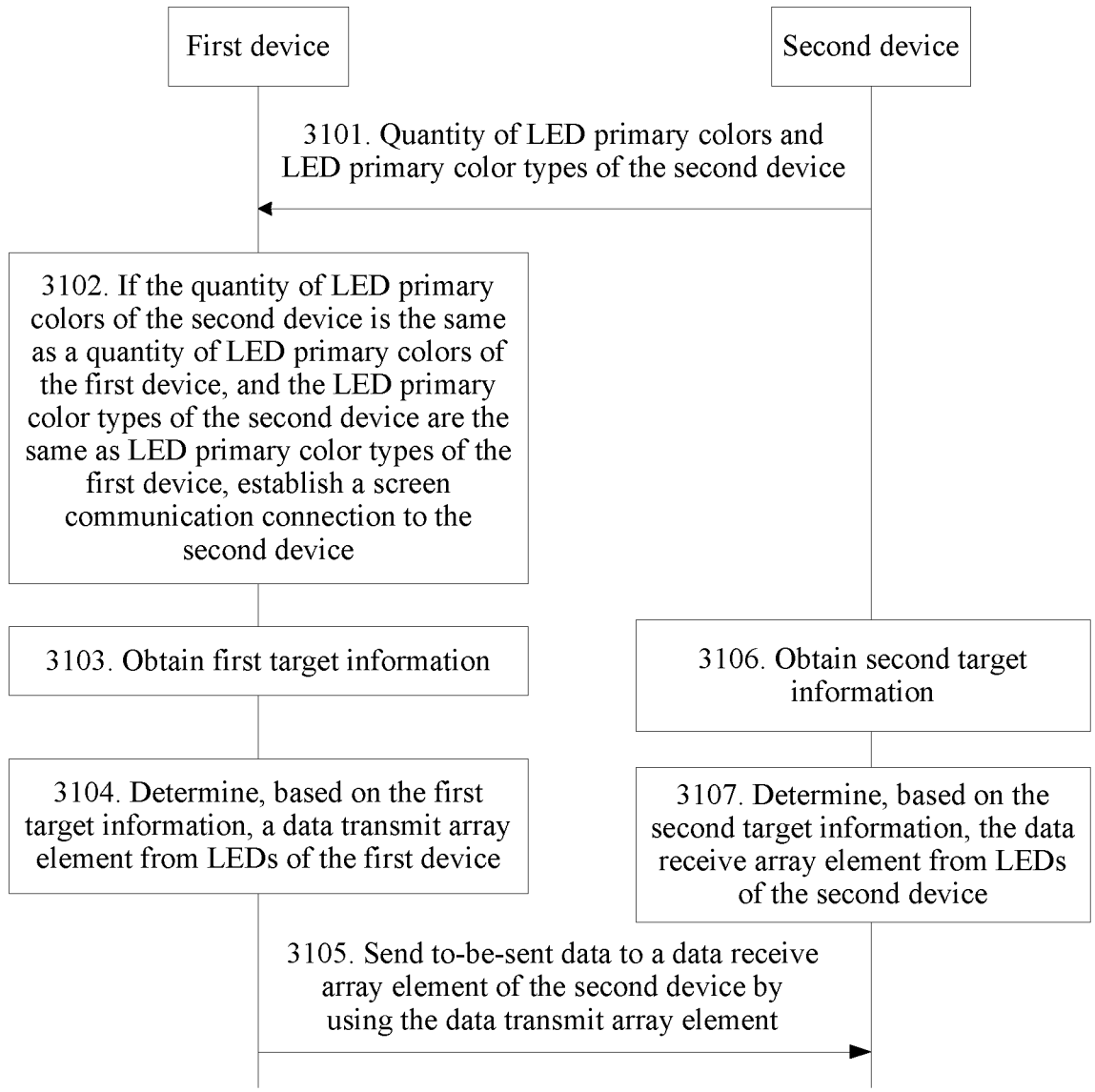
FIG. 31 is a schematic flowchart of a communication method according to an embodiment of this application.

FIG. 31 is a schematic flowchart of another communication method according to an embodiment of this application. As shown in FIG. 31, the communication method includes parts 3101-3107.

3101. A second device sends a quantity of LED primary colors and LED primary color types of the second device to a first device.

3102. If the quantity of LED primary colors of the second device is the same as a quantity of LED primary colors of the first device, and the LED primary color types of the second device are the same as LED primary color types of the first device, the first device establishes a screen communication connection to the second device.

In this embodiment of this application, after receiving the quantity of LED primary colors and the LED primary color types of the second device that are sent by the second device, the first device determines whether the quantity of LED primary colors of the second device is the same as the quantity of LED primary colors of the first device and whether the LED primary color types of the second device are the same as the LED primary color types of the first device. If the quantity of LED primary colors of the second device is the same as the quantity of LED primary colors of the first device, and the LED primary color types of the second device are the same as the LED primary color types of the first device, the first device establishes a screen communication connection to the second device, otherwise, the first device does not establish a screen communication connection to the second device.

If the quantity of LED primary colors of the second device is different from the quantity of LED primary colors of the first device, or the LED primary color types of the second device are different from the LED primary color types of the first device, the first device cannot communicate with the second device using an LED. Therefore, before performing the communication connection, the first device needs to first determine whether the quantity of LED primary colors of the second device is the same as the quantity of LED primary colors of the first device and whether the LED primary color types of the second device are the same as the LED primary color types of the first device.

3103. The first device obtains first target information.

In this embodiment of this application, parts 3103 and 3106 are performed after the first device establishes the screen communication connection to the second device.

3104. The first device determines, based on the first target information, a data transmit array element from LEDs of the first device.

3105. The first device sends to-be-sent data to a data receive array element of the second device using the data transmit array element.

3106. The second device obtains second target information.

3107. The second device determines, based on the second target information, the data receive array element from LEDs of the second device.

In this embodiment of this application, after the second device determines the data receive array element from the LEDs, the second device may receive data from the data transmit array element of the first device using the data receive array element.

Optionally, before the first device establishes the screen communication connection to the second device, the second device may further send beacon information to the first device. The quantity of LED primary colors and the LED primary color types may be included in the beacon information and sent to the first device. Optionally, the second device may periodically send the beacon information. Alternatively, the second device sends the beacon information to the first device after receiving an operation instruction used to send the beacon information. Optionally, the driver type of the second screen and the second time information in the foregoing embodiments may also be included in the beacon information and sent to the first device.

Figure 32:
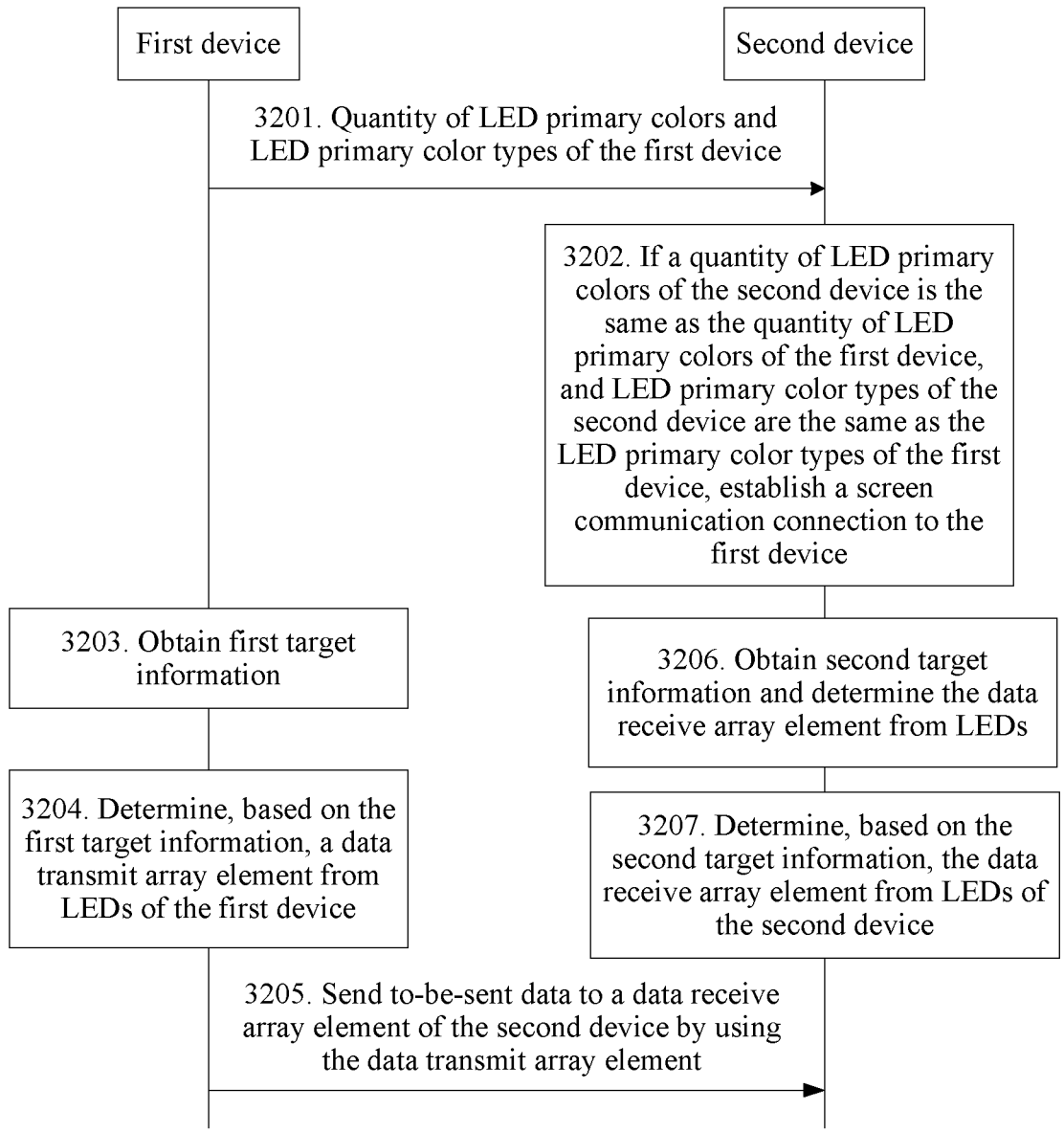
FIG. 32 is a schematic flowchart of a communication method according to an embodiment of this application.

FIG. 32 is a schematic flowchart of another communication method according to an embodiment of this application. As shown in FIG. 32, the communication method includes parts 3201-3207.

3201. A first device sends a quantity of LED primary colors and LED primary color types of the first device to a second device.

3202. If a quantity of LED primary colors of the second device is the same as the quantity of LED primary colors of the first device, and LED primary color types of the second device are the same as the LED primary color types of the first device, the second device establishes a screen communication connection to the first device.

In this embodiment of this application, after receiving the quantity of LED primary colors and the LED primary color types of the first device that are sent by the first device, the second device determines whether the quantity of LED primary colors of the second device is the same as the quantity of LED primary colors of the first device and whether the LED primary color types of the second device are the same as the LED primary color types of the first device. If the quantity of LED primary colors of the second device is the same as the quantity of LED primary colors of the first device, and the LED primary color types of the second device are the same as the LED primary color types of the first device, the second device establishes a screen communication connection to the first device, otherwise, the second device does not establish a screen communication connection to the first device.

3203. The first device obtains first target information.

In this embodiment of this application, parts 3103 and 3106 are performed after the first device establishes the communication connection to the second device.

3204. The first device determines, based on the first target information, a data transmit array element from LEDs of the first device.

3205. The first device sends to-be-sent data to a data receive array element of the second device using the data transmit array element.

3206. The second device obtains second target information.

3207. The second device determines, based on the second target information, the data receive array element from LEDs of the second device.

In this embodiment of this application, after the second device determines the data receive array element from the LEDs, the second device may receive data from the data transmit array element of the first device using the data receive array element.

In other words, the first device may alternatively send the quantity of LED primary colors and the LED primary color types of the first device, and the second device determines, based on the quantities of LED primary colors and the LED primary color types of the first device and the second device, whether to establish the communication connection.

Optionally, before the first device establishes the communication connection to the second device, the second device may further send beacon information to the first device. The quantity of LED primary colors and the LED primary color types may be included in the beacon information and sent to the first device. Optionally, the second device may periodically send the beacon information. Alternatively, the second device sends the beacon information to the first device after receiving an operation instruction used to send the beacon information. Optionally, the driver type of the second screen and the second time information in the foregoing embodiments may also be included in the beacon information and sent to the first device.

In the embodiments of the present disclosure, functional modules of the device may be divided according to the foregoing method examples. For example, functional modules may be divided based on functions, or two or more functions may be integrated in one module. The integrated module may be implemented in a form of hardware, or may be implemented in a form of a software functional module. It should be noted that, in the embodiments of the present disclosure, module division is an example, and is merely logical function division. In actual implementation, another division manner may be used.

Figure 33:
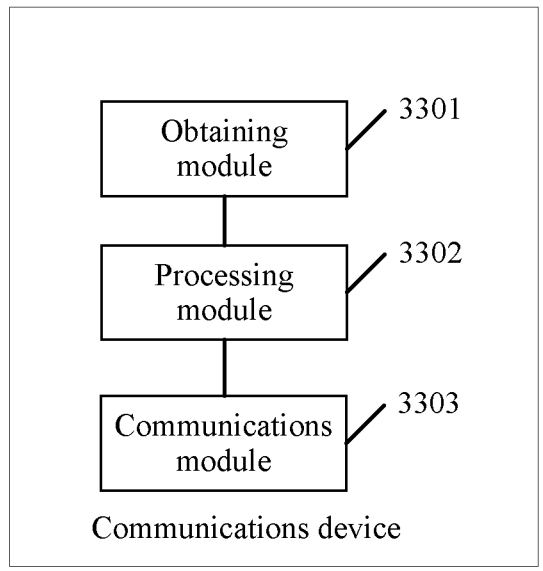
FIG. 33 is a schematic structural diagram of a communications device according to an embodiment of this application.

FIG. 33 shows a communications device according to an embodiment of the present disclosure. The communications device includes an obtaining module 3301, a processing module 3302, and a communications module 3303.

The obtaining module 3301 is configured to obtain first target information.

The processing module 3302 is configured to determine, based on the first target information, a data transmit array element from LEDs of the communications device, where each data transmit array element of the communications device includes at least one LED.

The communications module 3303 is configured to send to-be-sent data to a data receive array element of a second device using the data transmit array element, where each data receive array element of the second device includes at least one LED of the second device.

Optionally, the obtaining module 3301, the processing module 3302, and the communications module 3303 may further perform other functions performed by the first device in the foregoing method embodiments. Details are not described herein again.

Figure 34:
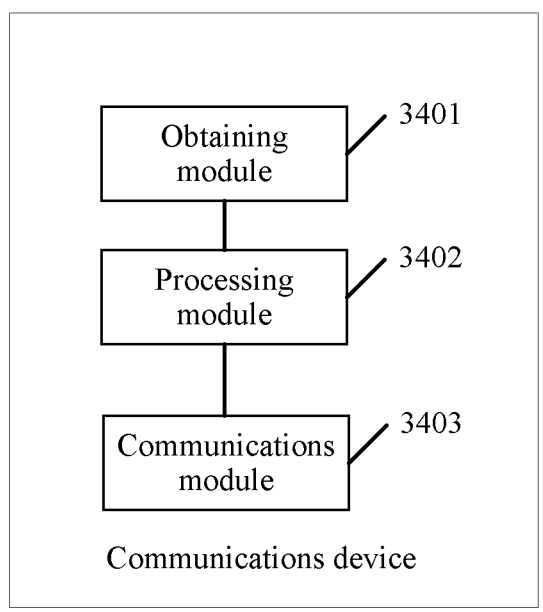
FIG. 34 is a schematic structural diagram of a communications device according to an embodiment of this application.

FIG. 34 shows a communications device according to an embodiment of the present disclosure. The communications device includes an obtaining module 3401, a processing module 3402, and a communications module 3403.

The obtaining module 3401 is configured to obtain second target information.

The processing module 3402 is configured to determine, based on the second target information, a data receive array element from LEDs of the communications device, where each data receive array element of the communications device includes at least one LED.

The communications module 3403 is configured to receive data from a data transmit array element of a first device using the data receive array element, where each data transmit array element of the first device includes at least one LED of the first device.

Optionally, the obtaining module 3401, the processing module 3402, and the communications module 3403 may further perform other functions performed by the second device in the foregoing method embodiments. Details are not described herein again.

Figure 35:
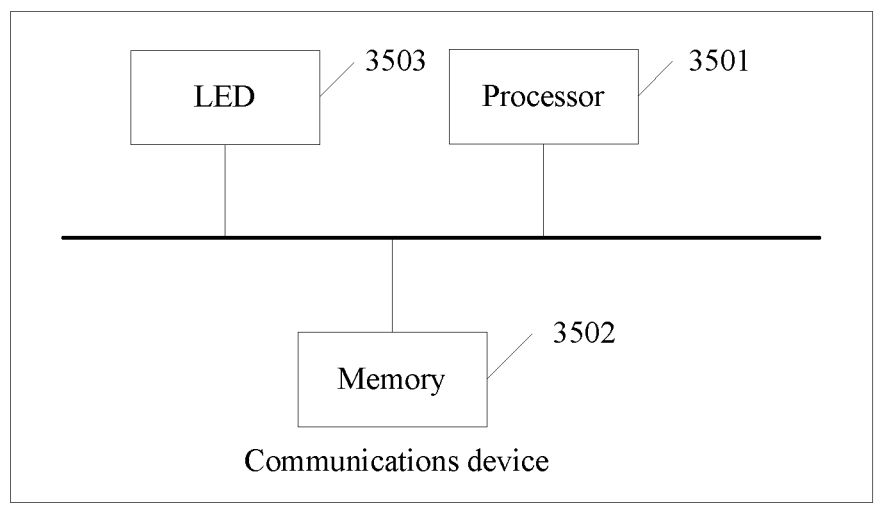
FIG. 35 is a schematic structural diagram of a communications device according to an embodiment of this application.

FIG. 35 is a schematic structural diagram of a communications device disclosed according to an embodiment of this application. As shown in FIG. 35, the communications device 3500 includes a processor 3501, a memory 3502, and an LED 3503. The processor 3501, the memory 3502, and the LED 3503 are connected to each other.

The processor 3501 may be a central processing unit (CPU), a general-purpose processor, a coprocessor, a digital signal processor (DSP), an application-specific integrated circuit (ASIC), a field programmable gate array (FPGA) or another programmable logic device, a transistor logic device, a hardware component, or any combination thereof. Alternatively, the processor 3501 may be a combination of processors implementing a computing function, for example, a combination of one or more microprocessors, or a combination of a DSP and a microprocessor.

The LED 3503 is configured to communicate with another device.

The processor 3501 invokes program code stored in the memory 3502, to perform the steps performed by the first device or the second device in the foregoing method embodiments.

Based on a same concept, problem-resolving principles of the devices provided in the embodiments of this application are similar to those of the method embodiments of this application. Therefore, for implementation of the devices, refer to implementation of the methods. For brevity, details are not described herein again.

In the foregoing embodiments, the description of each embodiment has respective focuses. For a part that is not described in detail in an embodiment, refer to related descriptions in other embodiments.

Finally, it should be noted that the foregoing embodiments are merely intended for describing the technical solutions of this application rather than limiting this application. Although this application is described in detail with reference to the foregoing embodiments, a person of ordinary skill in the art should understand that they may still make modifications to the technical solutions described in the foregoing embodiments or make equivalent replacements to some or all technical features thereof, without departing from the scope of the technical solutions of the embodiments of this application.

What is claimed is:

1. A communication method implemented by a first device, wherein the communication method comprises:
obtaining target information by receiving feedback information from a second device, wherein the feedback information comprises first information or second information, wherein the first information indicates a sequence transmit array element that is not a data transmit array element or indicates the sequence transmit array element that is the data transmit array element, wherein the second information indicates the sequence transmit array element that needs to be combined into the data transmit array element, wherein the feedback information is based on sequence information received after a plurality of sequence transmit array elements of the first device send local sequence information to the second device, and wherein each of a plurality of sequence transmit array elements of the first device comprises at least one light-emitting diode (LED) of the first device;
selecting the data transmit array element from a plurality of LEDs of the first device based on the target information, wherein the data transmit array element comprises at least one LED of the LEDs of the first device; and
sending to-be-sent data to a data receive array element of the second device using the data transmit array element.

2. The communication method of claim 1, wherein the data transmit array element comprises a first data transmit array element and a second data transmit array element, wherein the to-be-sent data comprises first data and second data, wherein the data receive array element comprises a first data receive array element and a second data receive array element, and wherein the communication method further comprises:
sending the first data to the first data receive array element using the first data transmit array element; and
sending the second data to the second data receive array element using the second data transmit array element.

3. The communication method of claim 1, wherein the LEDs are comprised in a first screen of the first device.

4. The communication method of claim 3, wherein the first screen is a first flat screen, wherein the target information comprises a screen distance between the first device and the second device, wherein the screen distance is a shortest distance between a first virtual screen and a second virtual screen, wherein the first virtual screen is the first flat screen, wherein the communication method further comprises:
- obtaining a first array element spacing based on the screen distance and a first power angle of LEDs of the first virtual screen on a first plane, wherein the first array element spacing is a first minimum spacing between two adjacent data transmit array elements in the first virtual screen along a first direction of LED arrangement;
- obtaining a second array element spacing based on the screen distance and a second power angle of LEDs of the first virtual screen on a second plane, wherein the second array element spacing is a second minimum spacing between the two adjacent data transmit array elements in the first virtual screen along a second direction of LED arrangement, wherein the first plane is perpendicular to the second plane, wherein the first plane and the second plane each are perpendicular to the first virtual screen, and wherein the first direction is perpendicular to the second direction;
- selecting the first data transmit array element from the LEDs of the first device comprised in the first virtual screen along the first direction based on a data transmit array element size and the first array element spacing; and
- selecting the second data transmit array element from the LEDs of the first device comprised in the first virtual screen along the second direction based on the data transmit array element size and the second array element spacing.

5. The communication method of claim 3, wherein the first screen is a first curved surface screen, wherein the target information comprises a screen distance between the first device and the second device, wherein the screen distance is a shortest distance between a first virtual screen and a second virtual screen, wherein the first virtual screen is constituted by all projection points of a first vertical projection of the first curved surface screen on an intersecting first target plane, wherein the first curved surface screen has a largest projection area on the first target plane, wherein the communication method further comprises:
- obtaining a first array element spacing based on the screen distance and a first power angle of LEDs of the first virtual screen on a first plane, wherein the first array element spacing is a first minimum spacing between two adjacent data transmit array elements in the first virtual screen along a first direction of LED arrangement;
- obtaining a second array element spacing based on the screen distance and a second power angle of LEDs of the first virtual screen on a second plane, wherein the second array element spacing is a second minimum spacing between the two adjacent data transmit array elements in the first virtual screen along a second direction of LED arrangement, wherein the first plane is perpendicular to the second plane, wherein the first plane and the second plane each are perpendicular to the first virtual screen, and wherein the first direction is perpendicular to the second direction;
- selecting the first data transmit array element from the LEDs of the first device comprised in the first virtual screen along the first direction based on a data transmit array element size and the first array element spacing;
- selecting the second data transmit array element from the LEDs of the first device comprised in the first virtual screen along the second direction based on the data transmit array element size and the second array element spacing; and
- projecting the data transmit array element onto the first curved surface screen to obtain another data transmit array element comprised in the first curved surface screen.

6. The communication method of claim 3, further comprising:
- selecting the data transmit array element from the plurality of sequence transmit array elements based on the feedback information.

7. The communication method of claim 1, wherein before receiving the feedback information from the second device, the communication method further comprises:
- obtaining a preset first target spacing;
- obtaining a sequence transmit array element size;
- selecting the plurality of sequence transmit array elements from the LEDs comprised in the first screen based on the preset first target spacing and the sequence transmit array element size; and
- sending local sequence information to the second device using the plurality of sequence transmit array elements.

8. The communication method of claim 7, wherein before obtaining the preset first target spacing, the communication method further comprises:
- receiving a screen driver type of the second device from the second device; and
- selecting the preset first target spacing from a plurality of preset transmit array element spacings based on the screen driver type of the second device.

9. The communication method of claim 3, wherein a first time period comprises a first data sending period and a first content display period, wherein the to-be-sent data is sent during the first data sending period, wherein the content displays during the first content display period, wherein the communication method further comprises obtaining a primary color intensity for transmitting a display signal in the first content display period based on a primary color intensity of the data transmit array element in the first data sending period and a time ratio of the first content display period to the first data sending period.

10. The communication method of claim 9, further comprising sending first time information to the second device, wherein the first time information comprises a start moment of the first time period, a duration of the first time period, a start moment of the first data sending period, and a duration of the first data sending period.

11. The communication method of claim 1, wherein the first device has a first data transmit array element and a first data receive array element comprising LEDs that overlap, wherein a data sending time of the first data transmit array element overlaps a data receiving time of the first data receive array element, wherein the first data receive array element comprises the at least one LED of the first device.

12. The communication method of claim 11, further comprising obtaining a signal received by the first data receive array element based on a transmit signal of the first data transmit array element.

13. The communication method of claim 1, wherein before obtaining the target information, the communication method further comprises:

receiving a quantity of LED primary colors of the second device from the second device;

receiving LED primary color types of the second device from the second device; and establishing a screen communication connection to the second device, wherein the quantity of LED primary colors of the second device is the same as a first quantity of LED primary colors of the first device, and wherein the LED primary color types of the second device are the same as LED primary color types of the first device.

14. The communication method of claim 1, further comprising selecting the data transmit array element from LEDs comprised in a camera flash of the first device based on the target information.

15. A communication method implemented by a second device, wherein the communication method comprises:

obtaining target information by receiving sequence information using a plurality of sequence receive array elements of the second device after receiving local sequence information from a plurality of sequence transmit array elements of a first device, wherein each of the plurality of sequence receive array elements includes at least one light-emitting diode (LED) of the second device, and wherein each of the plurality of sequence transmit array elements includes at least one LED of the first device;

selecting a data receive array element from a plurality of LEDs of the second device based on the target information, wherein the data receive array element comprises at least one LED of the LEDs of the second device; and receiving data from a data transmit array element of the first device using the data receive array element.

16. The communication method of claim 15, wherein the data receive array element comprises a first data receive array element and a second data receive array element, wherein the data from the data transmit array element comprises first data and second data, wherein the communication method further comprises:

receiving the first data from the first data transmit array element using the first data receive array element; and receiving the second data from the second data transmit array element using the second data receive array element.

17. The communication method of claim 15, further comprising selecting the data receive array element from the LEDs based on the target information, wherein the LEDs are comprised in a screen of the second device.

18. The communication method of claim 17, wherein the screen of the second device is a second flat screen, wherein the target information comprises a screen distance between the first device and the second device, wherein the screen distance is a shortest distance between a first virtual screen and a second virtual screen, wherein the second virtual screen is the second flat screen, wherein the communication method further comprises:

obtaining a first array element spacing based on the screen distance, a first power angle of LEDs of the first virtual screen on a first plane, a data receive array element size, and a first included angle between the first virtual screen and the second virtual screen on the first plane, wherein the first array element spacing is a first minimum spacing between two adjacent data receive array elements in the second virtual screen along a first direction of LED arrangement;

obtaining a second array element spacing based on the screen distance, a second power angle of the LEDs of the first virtual screen on a second plane, the data receive array element size, and a second included angle between the first virtual screen and the second virtual screen on the second plane, wherein the second array element spacing is a second minimum spacing between the two adjacent data receive array elements in the second virtual screen along a second direction of LED arrangement, wherein the first plane is perpendicular to the second plane, wherein the first plane and the second plane each are perpendicular to the first virtual screen, and wherein the first direction is perpendicular to the second direction;

selecting the first data receive array element from the LEDs in the second virtual screen along the first direction based on the data receive array element size and the first array element spacing; and selecting the second data receive array element from the LEDs in the second virtual screen along the second direction based on the data receive array element size and the second array element spacing.

19. The communication method of claim 17, wherein the screen of the second device is a first curved surface screen, wherein the target information comprises a screen distance between the first device and the second device, wherein the screen distance is a shortest distance between a first virtual screen and a second virtual screen, and wherein the first curved surface screen has a largest projection area on a first target plane, wherein the communication method further comprises:

obtaining a first array element spacing based on the screen distance, a first power angle of LEDs of the first virtual screen on a first plane, a data receive array element size, and a first included angle between the first virtual screen and the second virtual screen on the first plane, wherein the first array element spacing is a first minimum spacing between two adjacent data receive array elements in the second virtual screen along a first direction of LED arrangement;

obtaining a second array element spacing based on the screen distance, a second power angle of LEDs of the first virtual screen on a second plane, the data receive array element size, and a second included angle between the first virtual screen and the second virtual screen on the second plane, wherein the second array element spacing is a second minimum spacing between the two adjacent data receive array elements in the second virtual screen along a second direction of LED arrangement, wherein the first plane is perpendicular to the second plane, wherein the first plane and the second plane each are perpendicular to the first virtual screen, and wherein the first direction is perpendicular to the second direction;

selecting the first data receive array element from the LEDs comprised in the second virtual screen along the first direction based on the data receive array element size and the first array element spacing; and selecting the second data receive array element from the LEDs comprised in the second virtual screen along the second direction based on the data receive array element size and the second array element spacing; and projecting the data receive array element onto a second curved surface screen to obtain another data receive array element comprised in the second curved surface screen.

20. A communications device, comprising:
a processor; and
a memory coupled to the processor and storing instructions that, when executed by the processor, cause the communications device to be configured to:
obtain target information by receiving feedback information from a second device, wherein the feedback information comprises first information or second information, wherein the first information indicates a sequence transmit array element that is not a data transmit array element or indicates the sequence transmit array element that is the data transmit array element, wherein the second information is indicates the sequence transmit array element that needs to be combined into the data transmit array element, wherein the feedback information is based on sequence information received after a plurality of sequence transmit array elements of the first device send local sequence information to the second device, and wherein each of a plurality of sequence transmit array elements of the first device comprises the at least one light-emitting diode (LED) of the first device;
select the data transmit array element from a plurality of LEDs of the communications device based on the target information, wherein the data transmit array element comprises at least one LED of the LEDs of the communications device; and
send to-be-sent data to a data receive array element of the second device using the data transmit array element, wherein the data receive array element of the second device comprises at least one LED of the second device.

* * * * *